(12) United States Patent
Cao et al.

(10) Patent No.: US 9,515,310 B2
(45) Date of Patent: Dec. 6, 2016

(54) $V_2O_5$ ELECTRODES WITH HIGH POWER AND ENERGY DENSITIES

(71) Applicant: University of Washington through its Center for Commercialization, Seattle, WA (US)

(72) Inventors: Guozhong Cao, Seattle, WA (US); Yanyi Liu, Seattle, WA (US)

(73) Assignee: University of Washington through its Center for Commercialization, Seattle, WA (US)

(*) Notice: Subject to any disclaimer, the term of this patent is extended or adjusted under 35 U.S.C. 154(b) by 399 days.

(21) Appl. No.: 13/863,066

(22) Filed: Apr. 15, 2013

(65) Prior Publication Data

US 2013/0244115 A1 Sep. 19, 2013

Related U.S. Application Data

(63) Continuation of application No. PCT/US2011/056583, filed on Oct. 17, 2011.

(Continued)

(51) Int. Cl.
*H01M 4/131* (2010.01)
*C25D 9/08* (2006.01)
(Continued)

(52) U.S. Cl.
CPC .............. *H01M 4/0452* (2013.01); *C25D 9/00* (2013.01); *C25D 9/08* (2013.01); *H01M 4/0469* (2013.01);
(Continued)

(58) Field of Classification Search
CPC .. H01M 4/0452; H01M 4/131; H01M 4/1391; H01M 4/0469; C25D 9/08
(Continued)

(56) References Cited

U.S. PATENT DOCUMENTS 5,334,334 A 8/1994 Koksbang
5,674,642 A 10/1997 Le
(Continued)

FOREIGN PATENT DOCUMENTS

CN 1705152 A 12/2005
CN 101391816 A 3/2009
(Continued)

OTHER PUBLICATIONS

Takahashi, Katsunori; Steven J. Limmer and Guozhong Cao. "Template-based growth of V2O5 nanorods by electrodeposition", Proc. SPIE 5224, Nanomaterial and Their Optical Applications, 33 (Nov. 25, 2003); doi:10.1117/12.507364; http://dx.doi.org/10.1117/12.507364.*

(Continued)

*Primary Examiner* — James Lee
(74) *Attorney, Agent, or Firm* — Christensen O'Connor Johnson Kindness

(57) ABSTRACT

Methods are provided for forming films of orthorhombic $V_2O_5$. Additionally provided are the orthorhombic $V_2O_5$ films themselves, as well as batteries incorporating the films as cathode materials. The methods use electrodeposition from a precursor solution to form a $V_2O_5$ sol gel on a substrate. The $V_2O_5$ gel can be annealed to provide an orthorhombic $V_2O_5$ film on the substrate. The $V_2O_5$ film can be freestanding such that it can be removed from the substrate and integrated without binders or conductive filler into a battery as a cathode element. Due to the improved intercalation properties of the orthorhombic $V_2O_5$ films, batteries formed using the $V_2O_5$ films have extraordinarily high energy density, power density, and capacity.

11 Claims, 28 Drawing Sheets

Related U.S. Application Data

(60) Provisional application No. 61/506,831, filed on Jul. 12, 2011, provisional application No. 61/393,780, filed on Oct. 15, 2010.

(51) Int. Cl.
*H01M 4/04* (2006.01)
*H01M 4/38* (2006.01)
*H01M 4/485* (2010.01)
*H01M 10/0525* (2010.01)
*H01M 4/1391* (2010.01)
*C25D 9/00* (2006.01)

(52) U.S. Cl.
CPC ............ *H01M 4/131* (2013.01); *H01M 4/1391* (2013.01); *H01M 4/38* (2013.01); *H01M 4/485* (2013.01); *H01M 10/0525* (2013.01); *Y02E 60/122* (2013.01)

(58) Field of Classification Search
USPC .......................................... 429/231.5; 205/57
See application file for complete search history.

(56) References Cited

U.S. PATENT DOCUMENTS

| | | | |
|---|---|---|---|
| 5,789,110 | A | 8/1998 | Saidi |
| 6,013,391 | A | 1/2000 | Le |
| 6,063,556 | A | 5/2000 | Valsecchi |
| 8,211,572 | B2 | 7/2012 | Cho |
| 8,309,242 | B2 | 11/2012 | Wei |
| 2002/0064497 | A1 | 5/2002 | Horne |
| 2007/0286796 | A1 | 12/2007 | Koper |
| 2009/0117464 | A1 | 5/2009 | Cho |
| 2013/0130115 | A1 | 5/2013 | Park |
| 2013/0163145 | A1 | 6/2013 | Deng |

FOREIGN PATENT DOCUMENTS

| | | |
|---|---|---|
| CN | 101691658 A | 4/2010 |
| EP | 1 460 700 A2 | 9/2004 |
| EP | 1460700 A2 | 9/2004 |
| WO | 2008/021256 A2 | 2/2008 |
| WO | 2012/051619 A2 | 4/2012 |
| WO | 2013/048597 A2 | 4/2013 |

OTHER PUBLICATIONS

Notification of the First Office Action, dated Feb. 4, 2015, issued in Chinese Application No. 201180060088.0, filed Oct. 17, 2011, 15 pages.
Search Report, dated Jan. 26, 2015, issued in Chinese Application No. 201180060088.0, filed Oct. 17, 2011, 7 pages.
Alonso, B., and J. Livage, "Synthesis of Vanadium Oxide Gels From Peroxovanadic Acid Solutions: A $^{51}$V NMR Study," Journal of Solid State Chemistry 148(1): Nov. 16-19, 1999.
Andrukaitis, E., "Lithium Intercalation in Electrodeposited Vanadium Oxide Bronzes," Journal of Power Sources 119-121:205-210, Jun. 2003.
Aricó, A.S., et al., "Nanostructured Materials for Advanced Energy Conversion and Storage Devices," Nature Materials 4(1):366-377, May 2005.
Ban, C., et al., "Electrospun Nano-Vanadium Pentoxide Cathode," Electrochemistry Communications 11(3):522-525, Mar. 2009.
Beke, S., et al., "XRD and XPS Analysis of Laser Treated Vanadium Oxide Thin Films," Applied Surface Science 255(24):9779-9782, Sep. 2009.
Benayad, A., et al., "Vanadium Pentoxide Thin Films Used as Positive Electrode in Lithium Microbatteries: An XPS Study During Cycling," Journal of Physics and Chemistry of Solids 67(5-6):1320-1324, May-Jun. 2006.
Butler, A., et al., "Vanadium Peroxide Complexes," Chemical Reviews 94(3):625-638, May 1994.
Cao, A.-M., et al., "Self-Assembled Vanadium Pentoxide ($V_2O_5$) Hollow Microspheres From Nanorods and Their Application in Lithium-Ion Batteries," Angewandte Chemie International Edition 44(28):4391-4395, Jul. 2005.
Chan, C.K., et al., "Fast, Completely Reversible Li Insertion in Vanadium Pentoxide Nanoribbons," Nano Letters 7(2):490-495, Feb. 2007.
Cocciantelli, J.M., et al., "Crystal Chemistry of Electrochemically Inserted $LixV_2O_5$," Journal of Power Sources 34(2):103-111, Mar. 1991.
Croce, F., et al., "A Novel Concept for the Synthesis of an Improved $LiFePO_4$ Lithium Battery Cathode," Abstract in ChemInform 33(21):4, May 2002.
Cui, C.-J., et al., "A New High-Performance Cathode Material for Rechargeable Lithium-Ion Batteries: Polypyrrole/Vanadium Oxide Nanotubes," Electrochimica Acta Anaesthesiologica Scandinavica 55(28):8870-8875, Dec. 2010.
Delmas, C., et al., "The $LixV_2O_5$ System: An Overview of the Structure Modifications Induced by the Lithium Intercalation," Solid State Ionics 69(3-4):257-264, Aug. 1994.
Delmas, C., et al., "ω-$LixV_2O_5$—A New Electrode Material for Rechargeable Lithium Batteries," Journal of Power Sources 34(2):113-118, Mar. 1991.
Dickens, P.G., et al., "Phase Relationships in the Ambient Temperature $LixV_2O_5$ System (0.1<x<1.0)," Materials Research Bulletin 14(10):1295-1299, Oct. 1979.
Fontenot, C.J., et al., "Vanadia Gel Synthesis Via Peroxovanadate Precursors. 1. In Situ Laser Raman and $^{51}$V NMR Characterization of the Gelation Process," Journal of Physical Chemistry B 104(49):11622-11631, Jan. 2000.
Fontenot, C.J., et al., "Vanadia Gel Synthesis Via Peroxovanadate Precursors. 2. Characterization of the Gels," Journal of Physical Chemistry B 105(43):10496-10504, Nov. 2001.
Gharbi, N., et al., "Mixed-Valence Polyvanadic Acid Gels," Inorganic Chemistry 21(7):2758-2765, Jul. 1982.
Haber, J., "Fifty Years of My Romance With Vanadium Oxide Catalysts," Catalysis Today 142(3-4):100-113, Apr. 2009.
Howarth, O.W., and J.R. Hunt, "Peroxo-Complexes of Vanadium(v); a Vanadium-51 Nuclear Magnetic Resonance Study," Journal of the Chemical Society, Dalton Transactions 9:1388-1391, Jan. 1979.
Hu, Y.-S., et al., "Electrochemical Lithiation Synthesis of Nanoporous Materials With Superior Catalytic and Capacitive Activity," Nature Materials 5(9):713-717, Sep. 2006.
Hub, S., et al., "X-Ray Investigations on Electroformed $LixV_2O_5$ Bronzes," Electrochimica Acta 33(7):997-1002, Jul. 1988.
Im, J.S., et al., "Improved Capacitance Characteristics of Electrospun ACFs by Pore Size Control and Vanadium Catalyst," Journal of Colloid and Interface Science 327(1):115-119, Nov. 2008.
Jiang, R., et al., "A Novel Method to Prepare Nanostructured Manganese Dioxide and Its Electrochemical Properties as a Supercapacitor Electrode," Electrochimica Acta 54(11):3047-3052, Apr. 2009.
Józwiak, P., et al., "The Thermal Stability, Local Structure and Electrical Properties of Lithium-Iron Phosphate Glasses," Materials Science 27(2):307-318, Jun. 2009.
Kim, J.-K., et al., "Enhancement of Electrochemical Performance of Lithium Iron Phosphate by Controlled Sol-Gel Synthesis," Electrochimica Acta 53(38):8258-8264, Nov. 2008.
Kim, Y.-T., et al., "Performance of Electrostatic Spray-Deposited Vanadium Pentoxide in Lithium Secondary Cells," Journal of Power Sources 117(1-2):110-117, May 2003.
Lee, J.-K., et al., "Electrodeposition of Mesoporous $V_2O_5$ With Enhanced Lithium-Ion Intercalation Property," Electrochemistry Communications 11(8):1571-1574, Aug. 2009.
Lee, S.W., et al., "High-Power Lithium Batteries From Functionalized Carbon-Nanotube Electrodes," Nature Nanotechnology 5(7):531-537, Jul. 2010.

(56) References Cited

OTHER PUBLICATIONS

Legendre, J.-J., et al., "Vanadium Pentoxide Gels: II. Structural Study by X-Ray Diffraction," Journal of Colloid and Interface Science 94(1):84-89, Jul. 1983.

Leger, C., et al., "Structural and Electrochemical Properties of ω-Li$_x$V$_2$O$_5$ (0.4 ≤ x ≤ 3) as Rechargeable Cathodic Material for Lithium Batteries," Journal of the Electrochemical Society 152(1):A236-A241, 2005.

Le Van, K., et al., "Amorphous Vanadium Oxide Films Synthesised by ALCVD for Lithium Rechargeable Batteries," Journal of Power Sources 160(1):592-601, Sep. 2006.

Li, X. et al "Hierarchically Porous Bioactive Glass Scaffolds Synthesized With a PUF and P123 Cotemplated Approach," Chemistry of Materials 19(17):4322-4326, Aug. 2007.

Livage, J., "Vanadium Pentoxide Gels," Chemistry of Materials 3(4):578-593, Jul. 1991.

Livage, J., et al., "Vanadium Pentoxide Sol and Gel Mesophases," Journal of Sol-Gel Science and Technology 19(1-3):275-278, Dec. 2000.

Liu, D., and G. Cao, "Engineering Nanostructured Electrodes and Fabrication of Film Electrodes for Efficient Lithium Ion Intercalation," Energy & Environmental Science 3(9):1218-1237, Aug. 2010.

Liu, D., et al., "High Energy Density Lithium Ion Batteries Using Li$_{2-6}$Co$_{0-4}$-xCuxN (Anode) and Cu$_{0-04}$V$_2$O$_5$ (Cathode) Electrode Materials," Materials Letters 62(26):4210-4212, Oct. 2008.

Liu, D., et al., "Hydrous Manganese Dioxide Nanowall Arrays Growth and Their Li• Ions Intercalation Electrochemical Properties," Chemistry of Materials 20(4):1376-1380, Feb. 2008.

Liu, D., et al., "Mesoporous Hydrous Manganese Dioxide Nanowall Arrays With Large Lithium Ion Energy Storage Capacities," Advanced Functional Materials 19(7):1015-1023, Apr. 2009.

Liu, D., et al., "V$_2$O$_5$ Xerogel Electrodes With Much Enhanced Lithium-Ion Intercalation Properties With N$_2$ Annealing," Journal of Materials Chemistry 19(46):8789-8795, Nov. 2009.

Liu, P., et al., "Preparation and Lithium Insertion Properties of Mesoporous Vanadium Oxide," Advanced Materials 14(1):27-30, Jan. 2002.

Liu, Y., et al., "Engineering Nanostructured Electrodes Away From Equilibrium for Lithium-Ion Batteries," Journal of Materials Chemistry 21(27):9969-9983, Jul. 2011.

Liu, Y., et al., "Lithium Iron Phosphate/Carbon Nanocomposite Film Cathodes for High Energy Lithium Ion Batteries," Electrochimica Acta 56(5):2559-2565, Feb. 2011.

Liu, Y., et al., "V$_2$O$_5$ Nano-Electrodes With High Power and Energy Densities for Thin Film Li-Ion Batteries," Advanced Energy Materials 1(2):194-202, Mar. 2011.

Maier, J., "Nanoionics: Ion Transport and Electrochemical Storage in Confined Systems," Nature Materials 4(11):805-815, Nov. 2005.

Meethong, N., et al., "Aliovalent Substitutions in Olivine Lithium Iron Phosphate and Impact on Structure and Properties," Advanced Functional Materials 19(7):1060-1070, Apr. 2009.

Mohan, V.M., et al., "Synthesis, Structural, and Electrochemical Performance of V$_2$O$_5$ Nanotubes as Cathode Material for Lithium Battery," Journal of Applied Electrochemistry 39(10):2001-2006, Oct. 2009.

Oh, S.-M., et al., "High-Performance Carbon-LiMnPO$_4$ Nanocomposite Cathode for Lithium Batteries," Advanced Functional Materials 20(19):3260-3265, Oct. 2010.

Oh, S.-W., et al., "Double Carbon Coating of LiFePO$_4$ as High Rate Electrode for Rechargeable Lithium Batteries," Advanced Materials 22(43):4842-4845, Nov. 2010.

Padhi, A.K., et al., "Phospho-Olivines as Positive-Electrode Materials for Rechargeable Lithium Batteries," Journal of The Electrochemical Society 144(4):1188-1194, Apr. 1997.

Petkov, V., et al., "Structure of V$_2$O$_5$•nH$_2$O Xerogel Solved by the Atomic Pair Distribution Function Technique," Journal of the American Chemical Society 124(34):10157-10162, Aug. 2002.

Potiron, E., et al., "Electrochemically Synthesized Vanadium Oxides as Lithium Insertion Hosts," Electrochimica Acta 45(1-2):197-214, Sep. 1999.

Potiron, E., et al., "e-V$_2$O$_5$: Relationships Between Synthesis Conditions, Material Characteristics and Lithium Intercalation Behavior," Journal of Power Sources 81-82:666-669, Sep. 1999.

Prosini, P.P., et al., "Performance and Capacity Fade of V$_2$O$_5$-Lithium Polymer Batteries at a Moderate-Low Temperature," Electrochimica Acta 46(17):2623-2629, May 2001.

Ren, X., et al., "Preparation and Electrochemical Properties of V$_2$O$_5$ Submicron-Belts Synthesized by a Sol-Gel H$_2$O$_2$ Route," Journal of Sol-Gel Science and Technology 51(2):133-138, Aug. 2009.

Salvi, A.M., et al., "Lithium Intercalation on Amorphous V$_2$O$_5$ Thin Film, Obtained by R.F. Deposition, Using In Situ Sample Transfer for XPS Analysis," Surface and Interface Analysis 35(11):897-905, Nov. 2003.

Sides, C.R., et al., "A High-Rate, Nanocomposite LiFePO$_4$/Carbon Cathode," Electrochemical and Solid-State Letters 8(9):A484-A487, 2005.

Slebodnick, C., and V.L. Pecoraro, "Solvent Effects on $^{51}$V NMR Chemical Shifts: Characterization of Vanadate and Peroxovanadate Complexes in Mixed Water/Acetonitrile Solvent," Inorganica Chimica Acta 283(1):37-43, Dec. 1998.

Światowska-Mrowiecka, J., et al., "XPS Study of Li Ion Intercalation in V$_2$O$_5$ Thin Films Prepared by Thermal Oxidation of Vanadium Metal," Electrochimica Acta 52(18):5644-5653, May 2007.

Takahashi, K., et al., "Ni—V$_2$O•nH$_2$O Core-Shell Nanocable Arrays for Enhanced Electrochemical Intercalation," Journal of Physical Chemistry B 109(1):48-51, Jan. 2005.

Takahashi, K., et al., "Synthesis and Electrochemical Properties of Single-Crystal V$_2$O$_5$ Nanorod Arrays by Template-Based Electrodeposition," Journal of Physical Chemistry B 108(28):9795-9800, Jul. 2004.

Tarascon, J.-M., et al., "Hunting for Better Li-Based Electrode Materials via Low Temperature Inorganic Synthesis," Chemistry of Materials 22(3):724-739, Feb. 2010.

Vivier, V., et al., "Electrochemical Lithium Insertion in Sol-Gel Crystalline Vanadium Pentoxide Thin Films," Electrochimica Acta 44(5):831-839, Oct. 1998.

Wang, B., et al., "Synthesis of Nanosized Vanadium Pentoxide/Carbon Composites by Spray Pyrolysis for Electrochemical Capacitor Application," Electrochimica Acta 54(5):1420-1425, Feb. 2009.

Wang, D., et al., "Self-Assembled TiO$_2$-Graphene Hybrid Nanostructures for Enhanced Li-Ion Insertion," ACS Nano 3(4):907-914, Apr. 2009.

Wang, Y., et al., "The Design of a LiFePO$_4$/Carbon Nanocomposite With a Core-Shell Structure and Its Synthesis by an In Situ Polymerization Restriction Method," Angewandte Chemie International Edition 47(39):7461-7465, Sep. 2008.

Wang, Y., and G. Cao, "Li+-Intercalation Electrochemical/Electrochromic Properties of Vanadium Pentoxide Films by Sol Electrophoretic Deposition," Electrochimica Acta 51(23):4865-4872, Jun. 2006.

Wang, Y., et al., "Nanostructured Vanadium Oxide Electrodes for Enhanced Lithium-Ion Intercalation," Advanced Functional Materials 16(9):1133-1144, Jun. 2006.

West, K., et al., "Vanadium Oxide Xerogels as Electrodes for Lithium Batteries," Electrochimica Acta 38(9)1215-1220, Jun. 1993.

Whittingham, M.S., "Electrical Energy Storage and Intercalation Chemistry," Science 192(4244):1126-1127, Jun. 1976.

Wilcox, J.D., et al., "Factors Influencing the Quality of Carbon Coatings on LiFePO$_4$," Journal of The Electrochemical Society 154(5):A389-A395, 2007.

Wu, Q., et al., "Homogenous LiCoO$_2$ Nanoparticles Prepared Using Surfactant P123 as Template and Its Application to Manufacturing Ultra-Thin-Film Electrode," Materials Chemistry and Physics 91(2-3):463-467, Jun. 2005.

Zhang, H., et al., "Three-Dimensional Bicontinuous Ultrafast-Charge and -Discharge Bulk Battery Electrodes," Nature Nanotechnology 6(5):277-281, May 2011.

(56) References Cited

OTHER PUBLICATIONS

Zhao, D., et al., "Triblock Copolymer Syntheses of Mesoporous Silica With Periodic 50 to 300 Angstrom Pores," Science 279(5350): 548-552, Jan. 1998.

Zhou, Y., et al., "Preparation and Characterization of $V_2O_5$ Macro-Plates," Materials Letters 61(19-20):4073-4075, Aug. 2007.

Yae, S., et al., "Solar to Chemical Conversion Using Metal Nanoparticle Modified Microcrystalline Silicon Thin Film Photoelectrode," Solar Energy Materials and Solar Cells 91(4):224-229, Feb. 2007.

Yan, J., et al., "$V_2O_5$ Loaded on $SnO_2$ Nanowires for High-Rate Li Ion Batteries," Advanced Materials 23(6):746-750, Feb. 2011.

Yin, H., et al., "Porous $V_2O_5$ Micro/Nano-Tubes: Synthesis via a CVD Route, Single-Tube-Based Humidity Sensor and Improved Li-Ion Storage Properties," Journal of Materials Chemistry 22(11):5013-5019, Feb. 2012.

Yoo, M., et al., "Interaction of Poly(vinylidene fluoride) With Graphite Particles. 2. Effect of Solvent Evaporation Kinetics and Chemical Properties of PVDF on the Surface Morphology of a Composite Film and Its Relation to Electrochemical Performance," Chemistry of Materials 16(10):1945-1953, May 2004.

Yoshino, T., et al., "Electrodeposition of Electrochromic $V_2O_5$ Thin Films," Journal of the Surface Science Society of Japan 6(3):198-205, 1985.

Yoshio, M., et al., "Preparation and Properties of LiCoyMnxNi1-x-yO2 as a Cathode for Lithium Ion Batteries," Journal of Power Sources 90(2):176-181, Oct. 2000.

Yu, D., et al., "Effect of Manganese Doping on Li-Ion Intercalation Properties of $V_2O_5$ Films," Journal of Materials Chemistry 20(48):10841-10846, Oct. 2010.

Yu, D., et al., "Mesoporous Vanadium Pentoxide Nanofibers With Significantly Enhanced Li-Ion Storage Properties by Electrospinning," Energy & Environmental Science 4(3):858-861, Mar. 2011.

Yu, H., et al., "Cu Doped $V_2O_5$ Flowers as Cathode Material for High-Performance Lithium Ion Batteries," Nanoscale 5(11):4937-4943, Apr. 2013.

Yu, L., et al. "Ultrasonic Synthesis and Electrochemical Characterization of $V_2O_2$ Mesoporous Carbon Composites," Microporous and Mesoporous Materials 126(1-2):58-64, Nov. 2009.

Zhai, T., et al., "Centimeter-Long $V_2O_5$ Nanowires: From Synthesis to Field-Emission, Electrochemical, Electrical Transport, and Photoconductive Properties," Advanced Materials 22(23):2547-2552, Jun. 2010.

Zhan, S., et al., "Electrochemical Properties of Cr Doped $V_2O_5$ Between 3.8 V and 2.0 V," Solid State Ionics 180(20-22):1198-1203, Aug. 2009.

Zhan, S., et al., "Structural and Electrochemical Properties of $Al^{3+}$•Doped $V_2O_5$ Nanoparticles Prepared by an Oxalic Acid Assisted Soft-Chemical Method," Journal of Alloys and Compounds 502(1):92-96, Jul. 2010.

Zhang, Y.H., et al., "Carbon Monoxide Annealed $TiO_2$ Nanotube Array Electrodes for Efficient Biosensor Applications," Journal of Materials Chemistry 19(7):948-953, Feb. 2009.

Zhitomirsky, I., "Cathodic Electrodeposition of Ceramic and Organoceramic Materials. Fundamental Aspects," Advances in Colloid and Interface Science 97(1-3):297-317, Mar. 2002.

Zhou, J., "Development of China Vanadium Industry," Vanadium International Technical Committee (Vanitec), <http://www.vanitec.org/pages/en/publications/publications.php> [retrieved May 22, 2015], 18 pages.

Zhou, W.-P., et al., "Enhancement in Ethanol Electrooxidation by SnOx Nanoislands Grown on Pt(111): Effect of Metal Oxide—Metal Interface Sites," Journal of Physical Chemistry C 115(33):16467-16473, Jul. 2011.

Zukalová, M., et al., "Pseudocapacitive Lithium Storage in $TiO_2(B)$," Chemistry of Materials 17(5):1248-1255, Feb. 2005.

Wang, Y., and G. Cao, "Li•-Intercalation Electrochemical/Electrochromic Properties of Vanadium Pentoxide Films by Sol Electrophoretic Deposition," Electrochimica Acta 51:23:4865-4872, Jun. 2006.

International Search Report and Written Opinion mailed May 21, 2012, issued in corresponding International Application No. PCT/US2011/056583, filed Oct. 17, 2011, 10 pages.

International Preliminary Report on Patentability mailed Apr. 16, 2013, issued in corresponding International Application No. PCT/US2011/056583, filed Oct. 17, 2011, 7 pages.

Abello, L., et al., "Vibrational-Spectra and Valence Force-Field of Crystalline $V_2O_5$," Spectrochimica Acta Part A: Molecular and Biomolecular Spectroscopy 39(7):641-651, Jul. 1983.

Amatucci, G.G., et al., "Cobalt Dissolution in $LiCoO_2$-Based Non-Aqueous Rechargeable Batteries," Solid State Ionics 83(1-2):167-173, Jan. 1996.

Amatucci, G.G., et al., "$CoO_2$, the End Member of the $LixCoO_2$ Solid Solution," Journal of the Electrochemical Society 143(3):1114-1123, Mar. 1996.

Antolini, E., "$LiCoO_2$: Formation, Structure, Lithium and Oxygen Nonstoichiometry, Electrochemical Behaviour and Transport Properties," Solid State Ionics 170(3-4):159-171, May 2004.

Armand, M., and J.-M. Tarascon, "Building Better Batteries," Nature 451(7179):652-657, Feb. 2008.

Aurbach, D., et al., "Common Electroanalytical Behavior of Li Intercalation Processes Into Graphite and Transition Metal Oxides," Journal of the Electrochemical Society 145(9):3024-3034, Sep. 1998.

Baddour-Hadjean, R., et al., "Raman Microspectrometry Study of Electrochemical Lithium Intercalation Into Sputtered Crystalline $V_2O_5$ Thin Films," Chemistry of Materials 20(5):1916-1923, Mar. 2008.

Baddour-Hadjean, R., et al., "Structural Modifications of $LixV_2O_5$ in a Composite Cathode ($0 \leq x < 2$) Investigated by Raman Microspectrometry," Journal of Raman Spectroscopy 43(1):153-160, Jan. 2012.

Baudry, P., et al., "Electrochromic Window With Lithium Conductive Polymer Electrolyte," Journal of the Electrochemical Society 138(2):460-465, Feb. 1991.

Beke, S., "A Review of the Growth of $V_2O_5$ Films From 1885 to 2010," Thin Solid Films 519(6):1761-1771, Jan. 2011.

Belov, D., and M.-H. Yang, "Investigation of the Kinetic Mechanism in Overcharge Process for Li-Ion Battery," Solid State Ionics 179(27-32):1816-1821, Sep. 2008.

Birks, L.S., and H. Friedman, "Particle Size Determination From X-Ray Line Broadening," Journal of Applied Physics 17(8):687-692, Aug. 1946.

Brinker, C.J., and G.W. Scherer, "Sol-Gel Science: The Physics and Chemistry of Sol-Gel Processing," Academic Press, San Diego, pp. 31-35, 1990.

Bruce, P.G., "Energy Storage Beyond the Horizon: Rechargeable Lithium Batteries," Solid State Ionics 179(21-26):752-760, Sep. 2008.

Bruce, P.G., et al., "Nanomaterials for Rechargeable Lithium Batteries," Angewandte Chemie International Edition 47(16):2930-2946, Apr. 2008.

Cao, G., "Growth of Oxide Nanorod Arrays Through Sol Electrophoretic Deposition," Journal of Physical Chemistry B 108(52):19921-19931, Nov. 2004.

Chen, C.H. et al., "Electrostatic Sol-Spray Deposition (ESSD) and Characterisation of Nanostructured $TiO_2$ Thin Films," Thin Solid Films 342(1-2):35-41, Mar. 1999.

Chen, J., et al., "Synthesis of Hierarchical Mesoporous Nest-Like $Li_4Ti_5O_{12}$ for High-Rate Lithium Ion Batteries," Journal of Power Sources 200:59-66, Feb. 2012.

Cheng, F., and J. Chen, "Transition Metal Vanadium Oxides and Vanadate Materials for Lithium Batteries," Journal of Materials Chemistry 21(27):9841-9848, Feb. 2011.

Chernova, N.A., et al., "Layered Vanadium and Molybdenum Oxides: Batteries and Electrochromics," Journal of Materials Chemistry 19(17):2526-2552, Mar. 2009.

Chiarello, G., et al., "XPS and AFM Characterization of a Vanadium Oxide Film on $TiO_2(100)$ Surface," Applied Surface Science 99(1):15-19, May 1996.

Cho, J., et al., "Novel $LiCoO_2$ Cathode Material With $Al_2O_3$ Coating for a Li Ion Cell," Chemistry of Materials 12(12):3788-3791, Nov. 2000.

(56) References Cited

OTHER PUBLICATIONS

Cho, J., et al., "Zero-Strain Intercalation Cathode for Rechargeable Li-Ion Cell," Angewandte Chemie International Edition 40(18):3367-3369, Sep. 2001.
Choi, N.-S., et al., "Challenges Faacing Lithium Batteries and Electrical Double-Layer Capacitors," Angewandte Chemie International Edition 51(40):9994-10024, Oct. 2012.
Cogan, S.F., et al., "Optical Properties of Electrochromic Vanadium Pentoxide," Journal of Applied Physics 66(3):1333-1337, Aug. 1989.
Converse, A.O., "Renewable Energy in the United States: Is There Enough Land?" Applied Biochemistry and Biotechnology 137-140(1-12):611-624, Apr. 2007.
Croce, F., et al., "A Novel Concept for the Synthesis of an Improved $LiFePO_4$ Lithium Battery Cathode," Electrochemical and Solid-State Letters 5(3):A47-A50, Jan. 2002.
Dahn, J.R., et al., "Structure and Electrochemistry of $Li(1\pm y)NiO_2$ and a New $Li_2NiO_22$ Phase With the $Ni(OH)_2$ Structure," Solid State Ionics 44(1-2):87-97, Dec. 1990.
Deschamps, N., "Advanced Storage Battery Market: From Hybrid/Electric Vehicles to Cell Phones," SBI Energy White Paper, SBI, Rockville, Md., Oct. 2009, 11 pages.
Doh, C.-H., et al., "Thermal and Electrochemical Behaviour of $C/Li(x)CoO_2$ Cell During Safety Test," Journal of Power Sources 175(2):881-885, Jan. 2008.
Etacheri, V., et al., "Challenges in the Development of Advanced Li-Ion Batteries: A Review," Energy & Environmental Science 4(9):3243-3262, Jul. 2011.
Fang, G.J., et al., "Synthesis and Structural, Electrochromic Characterization of Pulsed Laser Deposited Vanadium Oxide Thin Films," Journal of Vacuum Science and Technology A 19(3):887-892, May-Jun. 2001.
Feng, C.Q., et al., "Synthesis of Spherical Porous Vanadium Pentoxide and Its Electrochemical Properties," Journal of Power Sources 184(2):485-488, Oct. 2008.
Fergus, J.W., "Recent Developments in Cathode Materials for Lithium Ion Batteries," Journal of Power Sources 195(4):939-954, Feb. 2010.
Frabetti, E., et al., "X-Ray Absorption Spectroscopy Study of $Cu_0X_{25}V_2O_5$ and $Zn_0X_{25}V_2O_5$ Aerogel-Like Cathodes for Lithium Batteries," Journal of Physical Chemistry B 108(12):3765-3771, Mar. 2004.
Gerssen-Gondelach, S.J., and A.P.C. FAAIJ, "Performance of Batteries for Electric Vehicles on Short and Longer Term," Journal of Power Sources 212:111-129, Aug. 2012.
Giorgetti, M., et al., "Doped $V_2O_5$-Based Cathode Materials: Where Does the Doping Metal Go? An X-Ray Absorption Spectroscopy Study," Chemistry of Materials 19(24):5991-6000, Oct. 2007.
Gross, R., et al., "Progress in Renewable Energy," Environment International 29(1):105-122, Apr. 2003.
Hoffmann, W., "PV Solar Electricity Industry: Market Growth and Perspective," Solar Energy Materials and Solar Cells 90(18-19):3285-3311, Nov. 2006.
Hu, Y.-S., et al., "Synthesis and Electrode Performance of Nanostructured $V_2O_5$ by Using a Carbon Tube-in-Tube as a Nanoreactor and an Efficient Mixed-Conducting Network," Angewandte Chemie International Edition 48(1):210-214, Dec. 2008.
International Search Report and Written Opinion, mailed Jan. 29, 2015, issued in International Application No. PCT/US2013/068561, filed Nov. 5, 2013, 10 pages.
Jiang, C., et al., "Effect of Particle Dispersion on High Rate Performance of Nano-Sized $Li_4Ti_5O_{12}$," Electrochimica Acta 52(23):6470-6475, Jul. 2007.
Jugović, D., and D. Uskoković, "A Review of Recent Developments in the Synthesis Procedures of Lithium Iron Phosphate Powders," Journal of Power Sources 190(2):538-544, May 2009.
Kalyani, P., and N. Kalaiselvi, "Various Aspects of $LiNiO_2$ Chemistry: A Review," Science and Technology of Advanced Materials 6(6):689-703, Sep. 2005.

Kang, K., et al., "Electrodes With High Power and High Capacity for Rechargeable Lithium Batteries," Science 311(5763):977-980, Feb. 2006.
Kim, H.-K., et al., "Fabrication of a Thin Film Battery Using a Rapid-Thermal-Annealed $LiNiO_2$ Cathode," Electrochemical and Solid-State Letters 5(11):A252-A255, Nov. 2002.
Kim, T.-H., et al., "The Current Move of Lithium Ion Batteries Towards the Next Phase," Advanced Energy Materials 2(7):860-872, Jul. 2012.
Kobayashi, H., et al., "Investigation on Lithium De-Intercalation Mechanism for $Li(1-y)Ni(1/3)Mn(1/3)Co(1/3)O(2)$," Journal of Power Sources 146(1-2):640-644, Aug. 2005.
Kumta, P.N., et al., "Synthesis of $LiCoO_2$ Powders for Lithium-Ion Batteries From Precursors Derived by Rotary Evaporation," Journal of Power Sources 72(1):91-98, Mar. 1998.
Kuwata, N., et al., "Thin-Film Lithium-Ion Battery With Amorphous Solid Electrolyte Fabricated by Pulsed Laser Deposition," Electrochemistry Communications 6(4):417-421, Apr. 2004.
Lee, K.T., and J. Cho, "Roles of Nanosize in Lithium Reactive Nanomaterials for Lithium Ion Batteries," Nano Today 6(1):28-41, Feb. 2011.
Levi, M.D., and D. Aurbach, "Impedance of a Single Intercalation Particle and of Non-Homogeneous, Multilayered Porous Composite Electrodes for Li-Ion Batteries," Journal of Physical Chemistry B 108(31):11693-11703, Jul. 2004.
Li, G., et al., "Environmentally Friendly Chemical Route to Vanadium Oxide Single-Crystalline Nanobelts as a Cathode Material for Lithium-Ion Batteries," Journal of Physical Chemistry B 110(19):9383-9386, Apr. 2006.
Li, H., et al., "Research on Advanced Materials for Li-Ion Batteries," Advanced Materials 21(45):4593-4607, Dec. 2009.
Li, S.-R., et al., "Three-Dimensional Porous $Fe_0X_1V_2O_5X_{15}$ Thin Film as a Cathode Material for Lithium Ion Batteries," Electrochimica Acta 64(1):81-86, Mar. 2012.
Li, Y., et al., "Effect of Interlayer Anions on the Electrochemical Performance of Al-Substituted α-Type Nickel Hydroxide Electrodes," International Journal of Hydrogen Energy 35(6):2539-2545, Mar. 2010.
Li, Y., et al., "Leaf-Like $V_2O_5$ Nanosheets Fabricated by a Facile Green Approach as High Energy Cathode Material for Lithium-Ion Batteries," Advanced Energy Materials 3(9):1171-1175, Sep. 2013.
Li, Y., et al., "Sn-Doped $V_2O_5$ Film With Enhanced Lithium-Ion Storage Performance," Journal of Physical Chemistry C 117(45):23507-23514, Oct. 2013.
Li, Y., et al., "Synthesis and Electrochemical Performance of Mixed Phase α/β Nickel Hydroxide," Journal of Power Sources 203:177-183, Apr. 2012.
Limmer, S.J., et al., "Electrophoretic Growth of Lead Zirconate Titanate Nanorods," Advanced Materials 13(16):1269-1272, Aug. 2001.
Limmer, S.J., et al., "Template-Based Growth of Various Oxide Nanorods by Sol-Gel Electrophoresis," Advanced Functional Materials 12(1):59-64, Jan. 2002.
Lindström, H., et al., "Li•Ion Insertion in $TiO_2$ (Anatase). 2. Voltammetry on Nanoporous Films," Journal of Physical Chemistry B 101(39):7717-7722, Sep. 1997.
"Lithium Ion Batteries," Wikipedia, The Free Encyclopedia, May 20, 2015 <http://en.wikipedia.org/wiki/Lithium-ion_battery> [retrieved May 22, 2015], 25 pages.
Liu, C., et al., "Advanced Materials for Energy Storage," Advanced Materials 22(8):E28-E62, Feb. 2010.
Liu, D.W., et al., "Atomic Layer Deposition of $Al_2O_3$ on $V_2O_5$ Xerogel Film for Enhanced Lithium Ion Intercalation," Journal of Vacuum Science and Technology A 30(1):01A123-1-01A123-6, Jan.-Feb. 2012.
Liu, D.W., et al., "Enhanced Lithium-Ion Intercalation of $V_2O_5$ Films With Surface Oxygen Vacancies," Journal of Physical Chemistry C 115(11):4959-4965, Mar. 2011.
Liu, H., et al., "Kinetics of Conventional Carbon Coated-$Li_3V_2(PO_4)_3$ and Nanocomposite $Li_3V_2(PO_4)_3$/Graphene as Cathode Materials for Lithium Ion Batteries," Journal of Materials Chemistry 22(22):11039-11047, Mar. 2012.

(56) References Cited

OTHER PUBLICATIONS

Liu, J., and X.-W. Liu, "Two-Dimensional Nanoarchitectures for Lithium Storage," Advanced Materials 24(30):4097-4111, Aug. 2012.

Liu, J., et al., "Double-Shelled Nanocapsules of $V_2O_5$-Based Composites as High-Performance Anode and Cathode Materials for Li Ion Batteries," Journal of the American Chemical Society 131(34):12086-12087, Aug. 2009.

Liu, J., et al., "Sandwich-Like, Stacked Ultrathin Titanate Nanosheets for Ultrafast Lithium Storage," Advanced Materials 23(8):998-1002, Feb. 2011.

Liu, J., et al., "Template-Free Solvothermal Synthesis of Yolk-Shell $V_2O_5$ Microspheres as Cathode Materials for Li-Ion Batteries," Chemical Communications 47(37):10380-10382, Aug. 2011.

Liu, S.-Q., et al., "Synthesis of Lithium-Ion Battery Cathode Material $Li_3V_2(PO_4)_3$ by Sol-Gel Procedure," Chinese Journal of Inorganic Chemistry 22(4):645-650, Apr. 2006.

Liu, Y., et al., "Porous Nanostructured $V_2O_5$ Film Electrode With Excellent Li-Ion Intercalation Properties," Electrochemistry Communications 13(11):1276-1279, Nov. 2011.

Liu, Z., et al., "Synthesis and Characterization of LiNi(1-x-y)Co(x)Mn(y)O(2) as the Cathode Materials of Secondary Lithium Batteries," Journal of Power Sources 81-82:416-419, Sep. 1999.

Lund, P.D., "Upfront Resource Requirements for Large-Scale Exploitation Schemes of New Renewable Technologies," Renewable Energy 32(3):442-458, Mar. 2007.

Mai, L., et al., "Electrospun Ultralong Hierarchical Vanadium Oxide Nanowires With High Performance for Lithium Ion Batteries," Nano Letters 10(11):4750-4755, Oct. 2010.

Mantoux, A., et al., "Vanadium Oxide Films Synthesized by CVD and Used as Positive Electrodes in Secondary Lithium Batteries," Journal of the Electrochemical Society 151(3):A368-A373, Jan. 2004.

Mao, L.-J., et al., "Template-Free Synthesis of VOx Hierarchical Hollow Spheres," Journal of Materials Chemistry 18(14):1640-1643, Mar. 2008.

Mao, S.S., and X. Chen, "Selected Nanotechnologies for Renewable Energy Applications," International Journal of Energy Research 31(6-7):619-636, May 2007.

Martha, S.K., et al., "A Comparative Study of Electrodes Comprising Nanometric and Submicron Particles of $LiNi_0X_{50}Mn_0X_{50}O_2$, $LiNi_0X_{33}Mn_0X_{33}Co_0X_{33}O_2$, and $LiNi_0X_{40}Mn_0X_{40}Co_0X_{20}O_2$ Layered Compounds," Journal of Power Sources 189(1):248-255, Apr. 2009.

Martha, S.K., et al., "A Short Review on Surface Chemical Aspects of Li Batteries: A Key for a Good Performance," Journal of Power Sources 189(1):288-296, Apr. 2009.

Mizushima, K., et al., "$LixCoO_2$ ($0<x\leq1$): A New Cathode Material for Batteries of High Energy Density," Solid State Ionics 3-4:171-174, Aug. 1981.

Moskalyk, R.R., and A.M. Alfantazi, "Processing of Vanadium: A Review," Minerals Engineering 16(9):793-805, Sep. 2003.

Moss, P.L., et al., "Investigation of Cycle Life of Li—$LixV_2O_5$ Rechargeable Batteries," Journal of Power Sources 124(1):261-265, Oct. 2003.

Muster, J., et al., "Electrical Transport Through Individual Vanadium Pentoxide Nanowires," Advanced Materials 12(6):420-424, Mar. 2000.

Nagase, K., et al., "Electrochromic Properties of Vanadium Pentoxide Thin Films Prepared by New Wet Process," Applied Physics Letters 60(7):802-804, Feb. 1992.

Navone, C., et al., "Electrochemical and Structural Properties of $V_2O_5$ Thin Films Prepared by DC Sputtering," Proceedings of the International Workshop on Advanced Techniques for Energy Sources Investigation and Testing, Sep. 4-9, 2004, Sofia, Bulgaria, pp. L5-1-L5-7.

Nobili, F., et al., "Electronic and Electrochemical Properties of $LixNi(1-y)Co(y)O_2$ Cathodes Studied by Impedance Spectroscopy," Chemistry of Materials 13(5):1642-1646, Apr. 2001.

Odani, A., et al., "Testing Carbon-Coated VOx Prepared via Reaction Under Autogenic Pressure at Elevated Temperature as Li-Insertion Materials," Advanced Materials 18(11):1431-1436, Jun. 2006.

Ohzuku, T., and A. Ueda, "Why Transition-Metal (Di)oxides Are the Most Attractive Materials for Batteries," Solid State Ionics 69(3-4):201-211, Aug. 1994.

Ohzuku, T., et al., "Comparative Study of $LiCoO_2$, $LiNi\frac{1}{2}Co\frac{1}{2}O_2$ and $LiNiO_2$ for 4-Volt Secondary Lithium Cells," Electrochimica Acta 38(9):1159-1167, Jun. 1993.

Ohzuku, T., et al., "Electrochemistry and Structural Chemistry of $LiNiO_2$ (R3m) for 4 Volt Secondary Lithium Cells," Journal of the Electrochemical Society 140(7):1862-1870, Jul. 1993.

Ozawa, K., "Lithium-Ion Rechargeable Batteries With $LiCoO_2$ and Carbon Electrodes: The $LiCoO_2$/C System," Solid State Ionics 69(3-4):212-221, Aug. 1994.

Özer, N., "Electrochemical Properties of Sol-Gel Deposited Vanadium Pentoxide Films," Thin Solid Films 305(1-2):80-87, Aug. 1997.

Pan, A.Q., et al., "Facile Synthesized Nanorod Structured Vanadium Pentoxide for High-Rate Lithium Batteries," Journal of Materials Chemistry 20(41):9193-9199, Sep. 2010.

Park, H.-K., and W.H. Smyrl, "$V_2O_5$ Xerogel Films as Intercalation Hosts for Lithium," Journal of the Electrochemical Society 141(3):L25-L26, Mar. 1994.

Park, H.-K., et al., "$V_2O_5$ Xerogel Films as Intercalation Hosts for Lithium. I. Insertion Stoichiometry, Site Concentration, and Specific Energy," Journal of the Electrochemical Society 142(4):1068-1073, Apr. 1995.

Passerini, S., et al., "Spin-Coated $V_2O_5$ Xerogel Thin Films. 1. Microstructure and Morphology," Chemistry of Materials 7(4):780-785, Apr. 1995.

Pomerantseva, E., et al., "Electrochemical Performance of the Nanostructured Biotemplated $V_2O_5$ Cathode for Lithium-Ion Batteries," Journal of Power Sources 206:282-287, May 2012.

Qu, Q., et al., "Core-Shell Structure of Polypyrrole Grown on $V_2O_5$ Nanoribbon as High Performance Anode Material for Supercapacitors," Advanced Energy Materials 2(8):950-955, Aug. 2012.

Reddy, M.V., et al., "Metal Oxyfluorides $TiOF_2$ and $NbO_2F$ as Anodes for Li-Ion Batteries," Journal of Power Sources 162(2):1312-1321, Nov. 2006.

Reddy, M.V., et al., "Preparation and Characterization of $LiNi_0X_5Co_0X_5O_2$ and $LiNi_0X_5Co_0X_4Al_0X_1O_2$ by Molten Salt Synthesis for Li Ion Batteries," Journal of Physical Chemistry C 111(31):11712-11720, Aug. 2007.

Reddy, R.N., and R.G. Reddy, "Porous Structured Vanadium Oxide Electrode Material for Electrochemical Capacitors," Journal of Power Sources 156(2):700-704, Jun. 2006.

Reimers, J.N., and J.R. Dahn, "Electrochemical and In Situ X-Ray Diffraction Studies of Lithium Intercalation in $Li(x)CoO(2)$," Journal of the Electrochemical Society 139(8):2091-2097, Aug. 1992.

Rougier, A., et al., "Optimization of the Composition of the Li(1-z)Ni(1+z)O(2) Electrode Materials: Structural, Magnetic, and Electrochemical Studies," Journal of the Electrochemical Society 143(4):1168-1175, Apr. 1996.

Sakunthala, A., et al., "Energy Storage Studies of Bare and Doped Vanadium Pentoxide, $(V_1X_{95}M_0X_5)O_5$, M = Nb, Ta, for Lithium Ion Batteries," Energy & Environmental Science 4(5):1712-1725, Apr. 2011.

Sakunthala, A., et al., "Preparation, Characterization, and Electrochemical Performance of Lithium Trivanadate Rods by a Surfactant-Assisted Polymer Precursor Method for Lithium Batteries," Journal of Physical Chemistry C 114(17):8099-8107, Apr. 2010.

Sarkar, P., and P.S. Nicholson, "Electrophoretic Deposition (EPD): Mechanisms, Kinetics, and Application to Ceramics," Journal of the American Ceramic Society 79(8):1987-2002, Aug. 1996.

Sasidharan, M., et al., "$V_2O_5$ Hollow Nanospheres: A Lithium Intercalation Host With Good Rate Capability and Capacity Retention," Journal of the Electrochemical Society 159(5):A618-A621, Mar. 2012.

Scrosati, B., et al., "Lithium-Ion Batteries. A Look Into the Future," Energy & Environmental Science 4(9):3287-3295, Jul. 2011.

(56) References Cited

OTHER PUBLICATIONS

Semenenko, D.A., et al., "Growth of Thin Vanadia Nanobelts With Improved Lithium Storage Capacity in Hydrothermally Aged Vanadia Gels," CrystEngComm 14(5):1561-1567, Mar. 2012.
Shaju, K.M., and P.G. Bruce, "Macroporous Li(Ni⅓Co⅓Mn⅓) $O_2$: A High Power and High-Energy Cathode for Rechargeable Lithium Batteries," Advanced Materials 18(17):2330-2334, Sep. 2006.
Shannon, R.D., "Revised Effective Ionic Radii and Systematic Studies of Interatomic Distances in Halides and Chalcogenides," Acta Crystallographica Section A 32(5):751-767, Sep. 1976.
Shlyakhtin, O.A., and Y.-J. Oh, "Inorganic Cryogels for Energy Saving and Conversion," Journal of Electroceramics 23(2-4):452-461, Oct. 2009.
Shum, K.L., and C. Watanabe, "Photovoltaic Deployment Strategy in Japan and the USA—An Institutional Appraisal," Energy Policy 35(2):1186-1195, Feb. 2007.
Sides, C.R., et al., "Nanoscale Materials for Lithium-Ion Batteries," MRS Bulletin 27(8):604-607, Aug. 2002.
Soudan, P., "Sol-Gel Chromium-Vanadium Mixed Oxides as Lithium Insertion Compounds," Solid State Ionics 135(1-4):291-295, Nov. 2000.
Światowska-Mrowiecka, J., et al., "Ageing of $V_2O_5$ Thin Films Induced by Li Intercalation Multi-Cycling," Journal of Power Sources 170(1):160-172, Jun. 2007.
Swider-Lyons, K.E., et al., "Improved Lithium Capacity of Defective $V_2O_5$ Materials," Solid State Ionics 152-153:99-104, Dec. 2002.
Takahashi, K., et al., "Growth and Electrochemical Properties of Single-Crystalline $V_2O_5$ Nanorod Arrays," Japanese Journal of Applied Physics 44(1B):662-668, Jan. 2005.
Takahashi, K., et al., "Growth and Electrochromic Properties of Single-Crystal $V_2O_5$ Nanorod Arrays," Applied Physics Letters 86(5):053102-1-053102-3, Jan. 2005.
Talledo, A., and C.G. Granqvist, "Electrochromic Vanadium-Pentoxide-Based Films: Structural, Electrochemical, and Optical Properties," Journal of Applied Physics 77(9):4655-4666, May 1995.
Talledo, A., et al., "Structure and Optical Absorption of Li(y)$V_2O_5$ Thin Films," Journal of Applied Physics 69(5):3261-3265, Mar. 1995.
Tang, Y., et al., "Vanadium Pentoxide Cathode Materials for High-Performance Lithium-Ion Batteries Enabled By a Hierarchical Nanoflower Structure via an Electrochemical Process," Journal of Materials Chemistry A 1(1):82-88, Jan. 2013.
Tarascon, J.-M., and M. Armand, "Issues and Challenges Facing Rechargeable Lithium Batteries," Nature 414(6861):359-367, Nov. 2001.
Thackeray, M.M., "Structural Considerations of Layered and Spinel Lithiated Oxides for Lithium Ion Batteries," Journal of the Electrochemical Society 142(8):2558-2563, Aug. 1995.
Thackeray, M.M., et al., "Lithium Insertion Into Manganese Spinels," Materials Research Bulletin 18(4):461-472, Apr. 1983.
Van Der Biest, O.O., and L.J. Vandeperre, "Electrophoretic Deposition of Materials," Annual Review of Materials Science 29:327-352, Aug. 1999.
Varadaraajana, V., et al., "Direct Synthesis of Nanostructured $V_2O_5$ Films Using Solution Plasma Spray Approach for Lithium Battery Applications," Journal of Power Sources 196(24):10704-10711, Dec. 2011.
Wang, C., et al., "Ultrathin $SnO_2$ Nanosheets: Oriented Attachment Mechanism, Nonstoichiometric Defects, and Enhanced Lithium-Ion Battery Performances", Journal of Physical Chemistry C 116(6):4000-4011, Jan. 2012.

Wang, J., et al., "Influences of Treatment Temperature and Water Content on Capacity and Rechargeability of $V_2O_5$ Xerogel Films," Journal of the Electrochemical Society 151(1):A1-A7, Jan. 2004.
Wang, S., et al., "Porous Monodisperse $V_2O_5$ Microspheres as Cathode Materials for Lithium-Ion Batteries," Journal of Materials Chemistry 21(17):6365-6369, Mar. 2011.
Wang, S., et al., "Three-Dimensional Porous $V_2O_5$ Cathode With Ultra High Rate Capability," Energy & Environmental Science 4(8):2854-2857, Jun. 2011.
Wang, W., and X. Wang, "Study of the Electrochemical Properties of a Transition Metallic Ions Modified Electrode in Acidic $VOSO_4$ Solution," Rare Metals 26(2):131-135, Apr. 2007.
Wang, Y., and G. Cao, "Developments in Nanostructured Cathode Materials for High-Performance Lithium-Ion Batteries," Advanced Materials 20(12):2251-2269, Jun. 2008.
Wang, Y., and G.Z. Cao, "Synthesis and Enhanced Intercalation Properties of Nanostructured Vanadium Oxides," Chemistry of Materials 18(12):2787-2804, Jun. 2006.
Wang, Y., et al., "Designed Strategy to Fabricate a Patterned $V_2O_5$ Nanobelt Array as a Superior Electrode for Li-Ion Batteries," Journal of Materials Chemistry 21(7):2362-2368, Feb. 2011.
Wang, Y., et al., "Effects of Thermal Annealing on the Li• Intercalation Properties of $V_2O_5 \cdot nH_2O$ Xerogel Films," Journal of Physical Chemistry B 109(22):11361-11366, May 2005.
Wang, Y., et al., "One Pot Synthesis of Self-Assembled $V_2O_5$ Nanobelt Membrane via Capsule-Like Hydrated Precursor as Improved Cathode for Li-Ion Battery," Journal of Materials Chemistry 21(28):10336-10341, Jun. 2011.
Wang, Z., et al., "Electrochromic Properties of Aqueous Sol-Gel Derived Vanadium Oxide Films With Different Thickness," Thin Solid Films 375(1-2):238-241, Oct. 2000.
Wang, Z.-L., et al., "Facile and Low-Cost Synthesis of Large-Area Pure $V_2O_5$ Nanosheets for High-Capacity and High-Rate Lithium Storage Over a Wide Temperature Range," ChemPlusChem 77(2):124-128, Feb. 2012.
Wei, Y., et al., "Improvement in Electrochemical Performance of $V_2O_5$ by Cu Doping," Journal of Power Sources 165(1):386-392, Feb. 2007.
West, K., et al., "$V_6O_{13}$ as Cathode Material for Lithium Cells," Journal of Power Sources 14(1-3):235-245, Jan.-Mar. 1985.
Whittingham, M.S., "Lithium Batteries and Cathode Materials," Chemical Reviews 104(10):4271-4301, Oct. 2004.
Whittingham, M.S., "Materials Challenges Facing Electrical Energy Storage," MRS Bulletin 33(4):411-419, Apr. 2008.
Winter, M., et al., "Insertion Electrode Materials for Rechargeable Lithium Batteries," Advanced Materials 10(10):725-763, Jul. 1998.
Wu, C., and Y. Xie, "Promising Vanadium Oxide and Hydroxide Nanostructures: From Energy Storage to Energy Saving," Energy & Environmental Science 3(9):1191-1206, Aug. 2010.
Wu, Q.-H., "Electrochemical Potential of Intercalation Phase: Li/$V_2O_5$ System," Applied Surface Science 253(4):1713-1716, Dec. 2006.
Wu, Q.-H., et al., "Photoelectron Spectroscopy Study of Li Intercalation Into $V_2O_5$ Thin Film," Surface Science 578(1-3):203-212, Mar. 2005.
Wu, Q.-H., et al., "Photoelectron Spectroscopy Study of Oxygen Vacancy on Vanadium Oxides Surface," Applied Surface Science 236(1-4):473-478, Sep. 2004.
Notification of the Third Office Action, dated Mar. 15, 2016, issued in Chinese Application No. 201180060088.0, filed Oct. 17, 2011, 12 pages.
Notification of the Second Office Action, dated Aug. 10, 2015, issued in Chinese Application No. 201180060088.0, filed Oct. 17, 2011, 13 pages.

* cited by examiner

$V_2O_5$ ELECTRODES WITH HIGH POWER AND ENERGY DENSITIES

CROSS-REFERENCE TO RELATED APPLICATION

This application is a continuation of International Application No. PCT/US2011/056583, filed Oct. 17, 2011, which claims the benefit of U.S. Provisional Application No. 61/393,780, filed Oct. 15, 2010, and U.S. Provisional Application No. 61/506,831, filed Jul. 12, 2011, each of which is expressly incorporated herein by reference in its entirety.

STATEMENT OF GOVERNMENT LICENSE RIGHTS

This invention was made with Government support under Contract Number CMMI-1030048, awarded by the National Science Foundation, and Grant Number DE-AC05-76RL01830, awarded by the U.S. Department of Energy. The Government has certain rights in the invention.

BACKGROUND

Energy storage technology is incontrovertibly one of the great challenges in the modern society facing environmental and ecological concerns, and the lithium ion battery is regarded as one of the most important energy storage devices due to its extensive applications in many areas including portable electronic devices, electric vehicles and implantable medical devices. As the heart of clean energy devices, the development of energy storage materials holds the key to the new generation of energy storage devices in the $21^{st}$ century. Nanostructured materials have attracted increasing interests in the field of energy materials due to superior electrochemical properties benefited from the unique nanostructure, such as nanoscale dimension, high surface area and large structural freedom which could provide high energy and power density while holding the mechanical integrity and chemical stability after many intercalation/deintercalation cycles.

Vanadium oxide is a multi-functional material which has extensive applications in various fields. Since its first investigation as a battery material for lithium ion batteries over 40 years ago, it has been discovered that during $Li^+$ ions intercalation vanadium pentoxide ($V_2O_5$) possesses high specific electrochemical capacity (theoretical capacity 450 mA h $g^{-1}$) with four phase transitions which involves five successive phases of $Li_xV_2O_5$ (0<x<3): α (x<0.01), ε (0.35<x<0.7), δ (0.9<x≤1), γ (0<x≤2) and the irreversible ω (x>2). Although the Li-ion intercalation voltage is lower than $LiCoO_2$ or $LiMn_2O_4$, $V_2O_5$ has still been regarded as one of the most popular cathode candidates for Li ion batteries due to these advantages: $V_2O_5$ provides higher energy and power density than $LiCoO_2$ and $LiFePO_4$, is easier and more controllable fabrication method than $LiMO_2$ (M=Ni, Mn, Co, Fe), and has higher capacity and better cyclic stability than $LiMn_2O_4$. There are various processing methods to prepare nanostructured vanadium pentoxide with high electrochemical performance for lithium ion batteries: self-assembled $V_2O_5$ hollow microspheres from nanorods; $V_2O_5$ submicro-belts from sol-gel precursor combined with hydrothermal method; Electrospun $V_2O_5$ nanofibers; Electrostatic spray-deposited $V_2O_5$; co-precipitated macro-plates $V_2O_5$ from water/ethanol media and $V_2O_5$ nanowires from chemical vapor transport. These nanostructured vanadium pentoxide materials have shown improved electrochemical performance in comparison with conventional cathode materials for lithium ion batteries, however due to the high cost of fabrication and complicated processing method, the broad industrial applications of such nanomaterials are limited.

Therefore, what is desired is an improved method for forming $V_2O_5$ that provides $V_2O_5$ films with superior properties when incorporated as cathodes in lithium-ion batteries.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method is provided for forming orthorhombic $V_2O_5$. In one embodiment, the method includes the steps of (a) electrodepositing $VO_2$ from a precursor solution onto a substrate that is cathodic, to provide a plurality of $V^{4+}$ nucleation sites on the substrate, wherein the precursor solution comprises $V_2O_5$ and hydrogen peroxide; and (b) depositing $V_2O_5.nH_2O$ gel from the precursor solution through catalyzed gelation at the $V^{4+}$ nucleation sites to provide a mixture of $VO_2$ and $V_2O_5.nH_2O$ on the substrate.

In one aspect, a film is provided. In one embodiment, the film is a $V_2O_5$ film having: (a) orthorhombic structure; and (b) a thickness of from about 10 nm to about 5 mm.

In one aspect, a battery is provided. In one embodiment, the battery includes a cathode comprising a $V_2O_5$ film as provided in the above aspects.

In another aspect, lithium iron phosphate/carbon nanocomposites are provided, along with methods for fabricating the nanocomposites and the use of the nanocomposites as cathodes in high energy lithium ion batteries.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
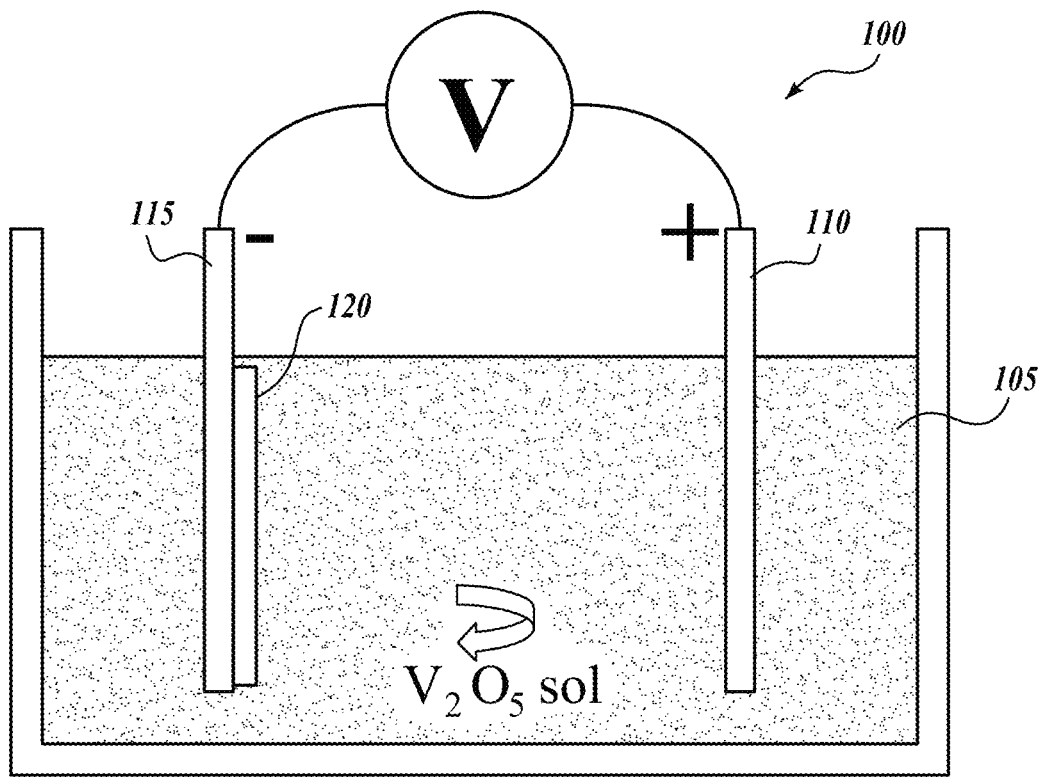
FIG. 1 is a schematic illustration of an apparatus useful for depositing a $V_2O_5$ film in accordance with the embodiments provided herein.

Methods are provided for forming films of orthorhombic $V_2O_5$. Additionally provided are the orthorhombic $V_2O_5$ films themselves, as well as batteries incorporating the films as cathode materials. The methods use electrodeposition from a precursor solution to form a $V_2O_5$ sol gel on a substrate. The $V_2O_5$ gel can be annealed to provide an orthorhombic $V_2O_5$ film on the substrate. The $V_2O_5$ film can be freestanding such that it can be removed from the substrate and integrated, without binders or conductive filler, into a battery as a cathode element. Due to the improved intercalation properties of the orthorhombic $V_2O_5$ films, batteries formed using the $V_2O_5$ films have extraordinarily high energy density, power density, and capacity.

In one aspect, a method is provided for forming orthorhombic $V_2O_5$. In one embodiment, the method includes the steps of (a) electrodepositing VO$_2$ from a precursor solution onto a substrate that is cathodic, to provide a plurality of V$^{4+}$ nucleation sites on the substrate, wherein the precursor solution comprises $V_2O_5$ and hydrogen peroxide; and (b) depositing $V_2O_5 \cdot nH_2O$ gel from the precursor solution through catalyzed gelation at the V$^{4+}$ nucleation sites to provide a mixture of VO$_2$ and $V_2O_5 \cdot nH_2O$ on the substrate.

Exemplary embodiments of the method are provided further below in Examples 1 and 2. The method includes a first step of electrodepositing $VO_2$ from a precursor solution onto a substrate. The electrodeposition is performed using techniques known to those of skill in the art. Specifically, the substrate is a conducting material, such as a metal or a compound conductor such as fluorine-doped tin oxide (FTO) coated onto a glass slide. The substrate is cathodic in order to deposit $VO_2$ and therefore is held at a negative voltage. A representative voltage range is from about −0.5-4.0 volts. The anode can be any anode known to those of skill in the art, for example, a platinum-coated silicon wafer. The electrodes can be spaced apart at any distance that allows for effective electrodeposition of the $VO_2$ film. The deposition time dictates the amount of film grown, with longer deposition times resulting in thicker film growth.

The $VO_2$ film is deposited from a precursor solution. The precursor solution includes both $V_2O_5$ and hydrogen peroxide. The $V_2O_5$ can be provided to the solution in any form, such as a powder or other particulate form. The hydrogen peroxide is in a solution (e.g., aqueous) and the ratio of the moles of $V_2O_5$ to hydrogen peroxide can be varied to produce specific film characteristics, as will be discussed further below. The precursor solution may also include water or other solvents or additives (i.e., contaminants or dopants), as long as the additives do not prevent the $VO_2$ film from forming. Such additives will be discussed in more detail below.

After electrodeposition of $VO_2$ on a substrate, the deposited $VO_2$ forms a plurality of $V^{4+}$ nucleation sites on the substrate.

The second step of the method builds off of the $V^{4+}$ nucleation sites on the substrate to form a $V_2O_5 \cdot nH_2O$ gel. The $V_2O_5 \cdot nH_2O$ gel is formed through catalyzed gelation at the $V^{4+}$ nucleation sites. The result is a film ("mixture") of $VO_2$ and $V_2O_5 \cdot nH_2O$ on the substrate. The specific chemistry of the electrodeposition and gelation is discussed below in Example 1 and chemical equations 1-8. Essentially, the precursor solution forms a $V_2O_5$ sol which nucleates on the $V^{4+}$ nucleation sites on the substrate to form a sol gel of $V_2O_5 \cdot nH_2O$.

Referring to FIG. 1, a representative apparatus 100 for depositing a $V_2O_5 \cdot nH_2O$ gel from a precursor solution is illustrated. In FIG. 1, a $V_2O_5$/hydrogen peroxide precursor solution 105 contacts both an anode 110 and a cathode 115. Upon the cathode 115 is electrodeposited a $V_2O_5 \cdot nH_2O$ film 120 from a $VO_2$ film providing a plurality of $V^{4+}$ nucleation sites.

In one embodiment, the method further comprises a step of annealing the mixture of $VO_2$ and $V_2O_5 \cdot nH_2O$ on the substrate to provide dehydrated orthorhombic $V_2O_5$ on the substrate. Annealing comprises heating to a temperature above room temperature. In one embodiment, annealing comprises heating to a temperature of at least 350° C. In another embodiment, annealing comprises heating to a temperature of at least 500° C. From XRD results, it has been determined that the orthorhombic $V_2O_5$ phase starts to form at 350° C. Superior crystallinity results at 400° C. or greater.

Annealing can be in air or any other environment. Annealing transforms the deposited $VO_2$ and $V_2O_5 \cdot nH_2O$ on the substrate to form a film of orthorhombic $V_2O_5$.

Figure 4:
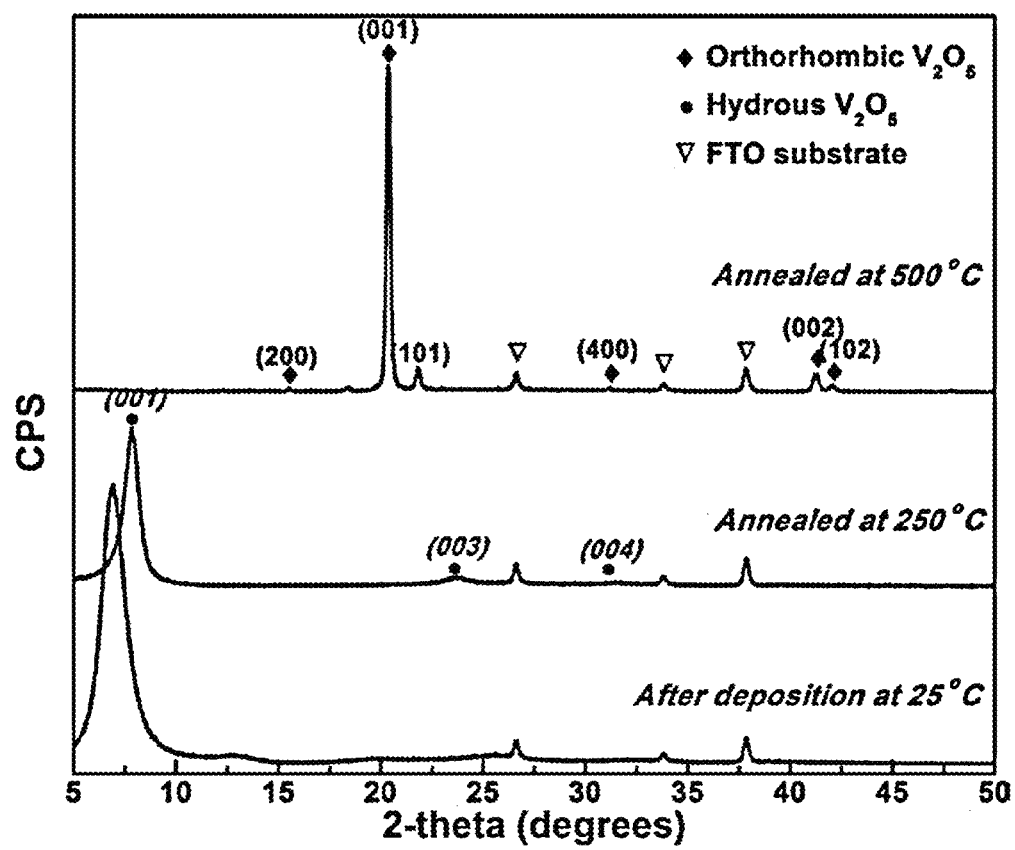
FIG. 4: X-ray diffraction (XRD) pattern of the as-deposited $V_2O_{5-x}.nH_2O$ film, hydrous $V_2O_{5-x}.nH_2O$ films annealed at 250° C. and $V_2O_5$ films annealed at 500° C. in the air.

As illustrated in FIG. 4, wherein the top x-ray diffraction (XRD) pattern is an orthorhombic $V_2O_5$ film annealed at 500° C., the orthorhombic 001 peak appears only in the 500° annealed sample, and is not present in the 250° sample and the as-deposited room temperature sample.

Figure 15:
FIG. 15: is a photograph of a freestanding, continuous, orthorhombic $V_2O_5$ film in accordance with the embodiments provided herein.

In one embodiment, the dehydrated orthorhombic $V_2O_5$ film is a freestanding, continuous film that can be removed from the substrate. Accordingly, in one embodiment, the method further comprises the step of separating the dehydrated orthorhombic $V_2O_5$ from the substrate to provide a freestanding, continuous orthorhombic $V_2O_5$ film. As illustrated in the photograph of FIG. 15, in certain embodiments, the orthorhombic $V_2O_5$ film is continuous and freestanding. Such a film is advantageous, for example, in that it can be integrated into a battery, such as a lithium ion battery, by itself. That is, no backing electrode is required, no binders are required to maintain the structural integrity of the film, and no additional conductive material (e.g., carbon) need be added for the film to function as a cathode. Example 3 provides experimental details of the freestanding orthorhombic $V_2O_5$ films.

As used herein, the term "freestanding" refers to a film that maintains structural integrity when removed from a backing such that the film can be manipulated mechanically (e.g., using tweezers) without fracturing. As used herein, the term "continuous" refers to a film that contains an unbroken path both from one face (surface) of the film to the other, and between any two points on a face of the film.

In certain embodiments, the dehydrated orthorhombic $V_2O_5$ film is a porous $V_2O_5$ film having a plurality of pores. The pores can be formed using a number of techniques, which will be discussed below. The pores range in diameter from about 2 nm to about 5 μm.

In one embodiment, the pores are formed by tuning a deposition characteristic selected from the group consisting of an applied electrodeposition voltage and an applied electrodeposition current density. By varying the voltage and/or current density during electrodeposition, pores can be created in the film, and the characteristics of the pores can be modified. Specifically, by manipulating the voltage of the electrodeposition, both the pore size and the number of pores will change with the externally applied voltage.

With regard to current density, by manipulating the current density of the electrodeposition, both the pore size and the number of pores will change with the current density.

In another embodiment, the pores are formed by tuning the ratio of moles of hydrogen peroxide to moles of $V_2O_5$ of the precursor solution. In one embodiment, the ratio of hydrogen peroxide to $V_2O_5$ (moles) is from about 2:1 to about 16:1. The ratio of the precursor components will affect the size and number of pores. Similarly, precursor concentration can be used to modify the size and number of pores.

In another embodiment, the pores are formed by integrating a plurality of particles, or a surfactant, into the $V_2O_5$ sol gel. By integrating particles or other polymer compositions (such as block copolymers) into the sol gel, the particles are incorporated into the forming $V_2O_5$ gel. If the gel is then annealed to form orthorhombic $V_2O_5$, the annealing will eliminate (e.g., by pyrolysis) the particles so as to provide pores templated on the polymer particles.

Due to the pyrolysis elimination of the particles, some residual carbon, or other byproduct, may remain in the film (e.g., coating the surface of the pores).

The size of the pores formed by this method will be determined by the size of the polymer particles upon which the film is templated. For example, if 100 nm diameter polymer spheres are used, annealing the film to eliminate these spheres will yield pores in the orthorhombic $V_2O_5$ film having a shape similar to that of the polymer particles. That is, the pores will have a diameter of about 100 nm. It will be appreciated that if block copolymers are used, or other particles that have non-spherical shape, these particles for templating are also contemplated by the present disclosure. As long as the particles can be eliminated, either by annealing or some other method that does not disrupt the composition of the orthorhombic $V_2O_5$ film, the particles can be used to template pores.

In one embodiment, the $V_2O_{5-x} \cdot nH_2O$ gel includes a dopant. In one embodiment, the dopant is selected from the group consisting of Mn, Fe, Ni, Co, Cr, Ag, Ti, Zn, Sn, and combinations thereof. Such dopants can be added to the gel so as to improve the performance of the eventual orthorhombic $V_2O_5$ film formed. Dopants may improve the characteristics of the $V_2O_5$ films in a number of ways. First, dopants can improve electrical conductivity, such that doped films have improved Li-ion intercalation properties, such as rate capability and cyclic stability. Second, dopants can serve as nucleation sites that facilitate film formation during electrodeposition. Third, dopants can impede crystallite growth during annealing, such that the crystallite size of doped films can be smaller than undoped films. Fourth, dopants will facilitate the phase transition during lithium ion intercalation and deintercalation, and thus enhance energy storage capacity. Finally, the incorporation of appropriate dopants can improve the cyclic stability.

In one embodiment, the $V_2O_{5-x} \cdot nH_2O$ gel includes one or more impurities. In one embodiment, the impurity is selected from the group consisting of Fe, C, Cr, Na, K, Ca, $VO^{3-}$, $Cl^-$, $V^{3+}$, $V^{4+}$, and combinations thereof. Impurities can be found in the source material (e.g., the $V_2O_5$ can include impurities, the hydrogen peroxide can include impurities, and any other additives may also introduce impurities). Allowing impurities in source materials can greatly reduce processing cost, due to the ability to use less-pure (i.e., less expensive) source materials. Impurities are not intentionally added (as dopants are) during film formation, and they are not included in films by any design or intention. Impurities typically do not affect film fabrication and performance. Some impurities, such as Fe, Cr, and C, may have the same benefits to films as dopants of those materials do.

Dopants are intentionally added during film fabrication. They serve as a functional part in the films, as described in the above comment.

In one embodiment, the substrate upon which the $V_2O_5$ is formed is selected from the group consisting of fluorine-doped tin oxide, titanium, platinum, copper, aluminum, and stainless steel. It will be appreciated that any conductive material can be used; and therefore, the list provided is not meant to be exhaustive.

In one aspect, a film is provided. In one embodiment, the film is a $V_2O_5$ film having: (a) orthorhombic structure; and (b) a thickness of from about 10 nm to about 5 mm.

The $V_2O_5$ film is a thin orthorhombic film. An exemplary method for growing such a film is described above, although it will be appreciated that other methods may be used to form such a film. However, in one embodiment, the orthorhombic $V_2O_5$ film is formed using the two-part electrodeposition process described herein.

The orthorhombic structure and relative thinness of the film provide superior characteristics when the film is used as a cathode in a lithium ion battery. These superior characteristics are discussed further below in Examples 1-3.

In one embodiment, the film is a freestanding, continuous film. The properties and advantages of such a freestanding, continuous film of orthorhombic $V_2O_5$ has been discussed previously above.

In one embodiment, the orthorhombic $V_2O_5$ film has a specific energy density from 400 to 900 W h $kg^{-1}$. In one embodiment, the orthorhombic $V_2O_5$ film has a specific power of from 0.5 to 28 kW $kg^{-1}$. Both the specific energy density and specific power of the orthorhombic $V_2O_5$ films are among the highest reported to date.

In one embodiment, the orthorhombic $V_2O_5$ film is a porous $V_2O_5$ film. In one embodiment, the pores have a diameter of from about 2 nm to about 5 μm.

In one embodiment, the orthorhombic $V_2O_5$ film includes a dopant. In one embodiment, the dopant is selected from the group consisting of Mn, Fe, Ni, Co, Cr, Ag, Ti, Zn, Sn, and combinations thereof.

In one embodiment, the orthorhombic $V_2O_5$ film includes a impurity selected from the group consisting of Fe, C, Cr, Na, K, Ca, $VO_3^-$, $Cl^-$, $V^{3+}$, $V^{4+}$, and combinations thereof.

In one embodiment, the film is on a substrate. Representative substrates include glass, silicon, metals, and conductors deposited on such substrates (e.g., FTO-coated glass slides). The substrate can be used to support the film during fabrication of the film, such as by the methods provided above, or the substrate can be used as a passive or active element in a device into which the $V_2O_5$ film is integrated. For example, if the $V_2O_5$ film is integrated into a battery, a substrate may provide a mechanical support for the $V_2O_5$ film to act as a cathode, or the substrate may be conducting and act as a charge collector into which charge carriers pass after passing through the $V_2O_5$ film acting as a cathode.

Figure 24:
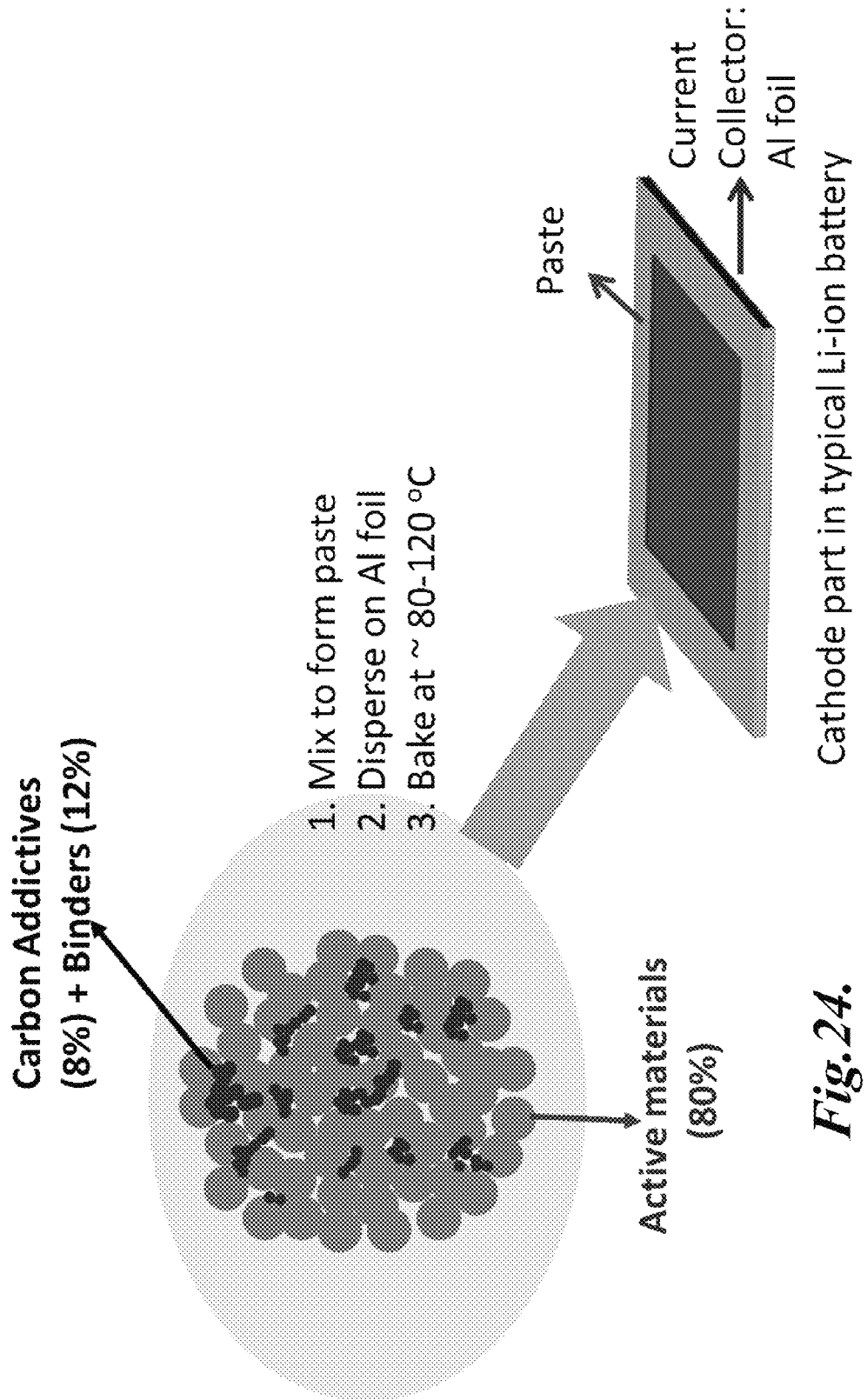
FIG. 24 schematically illustrates a typical method for forming a carbon of a lithium-ion battery.
Figure 25:
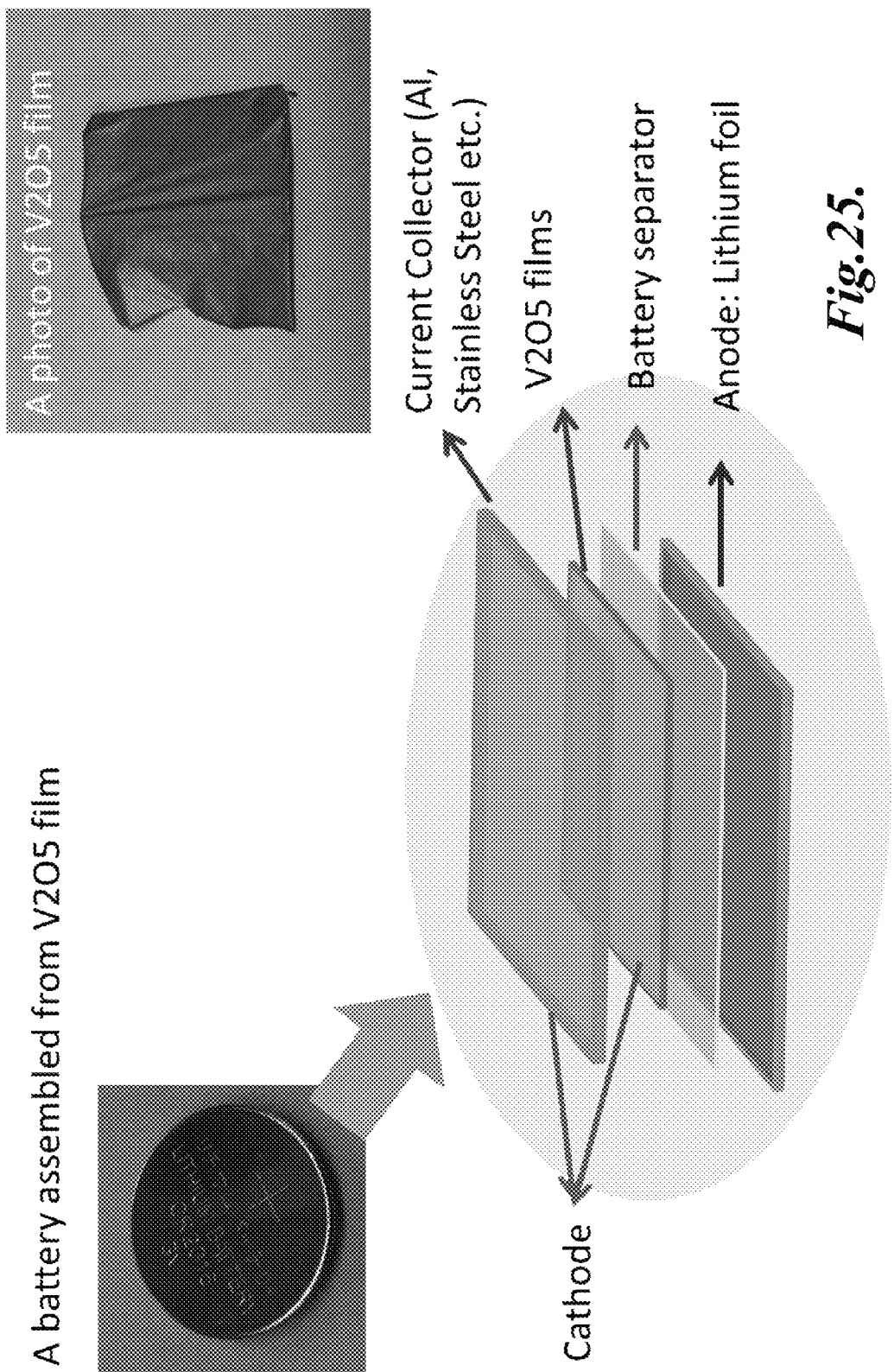
FIG. 25 schematically illustrates a lithium-ion batter formed using a $V_2O_5$ film in accordance with the embodiments provided herein.

In one aspect, a battery is provided. In one embodiment, the battery includes a cathode comprising a $V_2O_5$ film as provided in the above aspects. A typical cathode of a battery (e.g., a lithium-ion battery) includes both the "active material" (i.e., the cathode material) and a binder used to bind the active material into a continuous, cohesive film. Carbon is also added to improve the conductivity of the film. Such a cathode is illustrated in FIG. 24. In the present disclosure, a cathode made entirely of $V_2O_5$ is provided, as illustrated in FIG. 25. If the orthorhombic $V_2O_5$ disclosed herein is used as a cathode, binder and carbon additives are not necessary for the film to act as an efficient cathode (see results in Examples 1-3).

However, in certain embodiments, binder and/or carbon can be added to the $V_2O_5$ film to further improve the characteristics of the cathode. Exemplary binders include 5%~15% (wt) PVDF (Polyvinylidene fluoride) dissolved in NMP (N-Methylpyrrolidone). Exemplary carbon additives are added at about 5%~35% (wt) and include Super P®, graphene, graphite, carbon nanotubes, and acetylene black.

In one embodiment, the battery is a lithium ion battery.

In one embodiment, the cathode of the battery consists of a freestanding, continuous orthorhombic $V_2O_5$ film, as described elsewhere herein. In one embodiment, the cathode does not include a conductive additive in the orthorhombic $V_2O_5$ film. In one embodiment, the cathode does not include a binder in the $V_2O_5$ film.

Particularly with regard to the previous two embodiments, one of the advantages of the freestanding orthorhombic $V_2O_5$ film is the ability to integrate the film monolithically into a lithium ion battery as a cathode. Because the film is freestanding, no binder materials need be added to the film for it to be manipulated (placed) into a battery. Further, no conductive (e.g., carbon) additive is necessary in order for it to act as a cathode.

In another aspect, lithium iron phosphate/carbon nanocomposites are provided, along with methods for fabricating the nanocomposites and the use of the nanocomposites as cathodes in high energy lithium ion batteries. This aspect, and related embodiments are disclosed further below in Example 4.

The following examples are intended to illustrate, and not limit, the embodiments disclosed herein.

Example 1

Orthorhombic V2O5 Films

Experimental Section

Sample Preparation:

The films studied in this research were all prepared by cathodic deposition from diluted vanadium pentoxide solutions which were made according to the recipe reported by Frontenot et al. $V_2O_5$ powders (99.8%, Alfa-AESAR) were added into de-ionized water and $H_2O_2$ (30 wt. % in $H_2O$, Sigma-Aldrich) to form a solution with a $V_2O_5$ concentration ($C_V$) of 0.3M and $n(H_2O_2):n(V)$ of 8.05:1. The resulting solution was stirred for 15 min and sonicated for 15 min respectively while kept in water at a constant temperature for the reactions. It was observed that the yellow slurry started bubbling vigorously and gradually turned into orange in color. After 5 min a transparent solution was formed with ruby red in color. This solution was later diluted into $C_V$=0.06 M and then sonicated for 1 hour until the solution turned into brownish red $V_2O_5$ gel. This gel was further dispersed and diluted to a $C_V$ of 0.0075 M, and stirred in de-ionized water until a brick red colored and transparent solution was formed. The pH value of this solution is measured to be 2.6 and the cathodic deposition was carried out in this final solution.

For the preparation of $V_2O_5$ films, fluorine doped tin oxide (FTO) coated glass was used as the deposition substrates on the negative side, and Pt plate as a counter electrode on the positive side. The distance between these two electrodes was kept constant as 1.5 cm and the deposition voltage was −2.4 V. The depositions were carried out for 3 min, 5 min, 10 min and 20 min separately to investigate the deposition rate using this method. The films were left in air for one day until completely dried to avoid the cracks induced by drastic volume change; then the films were annealed in ambient atmosphere at 500 C for 3 hours followed by a slow cool-down. All the samples were stored in vacuum before characterizations and property measurements.

Sample Characterization:

The thickness of the $V_2O_5$ films deposited for different times was measured by Dektak Profilometer 3030 after deposition at room temperature and annealing at 500 C respectively. The rest of the characterizations were conducted on the films deposited for 3 min at −2.4 V. Thermogravimetric properties of the $V_2O_5$ films were investigated by thermogravimetric analyzer (TGA 7, PerkinElmer) from room temperature to 600 C in air at a heating rate of 2 C $min^{-1}$. The phase and crystallite size of the $V_2O_5$ films were studied using X-Ray Diffraction (XRD, Philips 1820 X-Ray Diffractometer); the surface morphology and roughness of $V_2O_5$ films were detected using scanning electron microscopes (SEM, JEOL, JSM-5200) and atomic force microscopy (AFM, Asylum Research MFP-3D). X-Ray photoelectron spectroscopy (XPS) was used to understand and compare the valence status of vanadium element in $V_2O_5$ films before and after annealing and lithium intercalation. All XPS spectra were taken on a Kratos Axis-Ultra DLD spectrometer.

Electrochemical properties of the $V_2O_5$ thin film electrodes were tested using a standard three-electrode setup with 1M $LiClO_4$ in propylene carbonate (PC) as electrolyte, a Pt plate as the counter electrode, and Ag/AgCl as the reference electrode. Cyclic voltammetric (CV) curves were measured between 0.6 V∼−1.8 V (Vs. $Ag^+$/Ag) with scan rate of 5 mV $5^{-1}$, and the lithium ion intercalation/deintercalation properties and cycling performance were investigated by chronopotentiometric (CP) method in the voltage range of 0.2 V∼−1.6 V (Vs. $Ag^+$/Ag). Both CV and CP tests were performed by electrochemical analyzer (CH Instruments, Model 605B).

Results

After mixing the $V_2O_5$ powders and excessive $H_2O_2$ with DI water according to the composition recorded in the experimental section, the yellow slurry mixture experienced a vigorous bubbling with intense exothermic phenomena, which was accompanied with slight color change into orange. Several parallel or sequential chemical reactions would occur associated with the decomposition of excessive $H_2O_2$ as detailed in literatures:

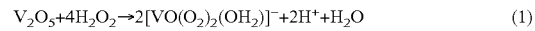

$$V_2O_5 + 4H_2O_2 \rightarrow 2[VO(O_2)_2(OH_2)]^- + 2H^+ + H_2O \qquad (1)$$

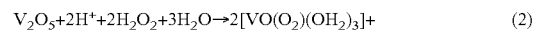

$$V_2O_5 + 2H^+ + 2H_2O_2 + 3H_2O \rightarrow 2[VO(O_2)(OH_2)_3]^+ \qquad (2)$$

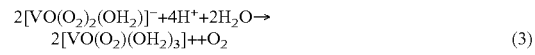

$$2[VO(O_2)_2(OH_2)]^- + 4H^+ + 2H_2O \rightarrow 2[VO(O_2)(OH_2)_3]^+ + O_2 \qquad (3)$$

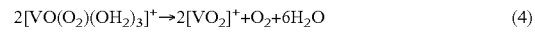

$$2[VO(O_2)(OH_2)_3]^+ \rightarrow 2[VO_2]^+ + O_2 + 6H_2O \qquad (4)$$

$$[VO_2]^+ \rightarrow \text{gelation} \qquad (5)$$

The appearance of yellow-orange color could be ascribed to the formation of diperoxovanadate anion $[VO(O_2)_2(OH_2)]^-$ (Equation 1). After 5 min the slurry transformed into a transparent ruby red solution, which suggests that the main ion species in the solution is the red monoperoxovanadate cation $[VO(O_2)(OH_2)_3]^+$ (Equation 2-3). After adding DI water to dilute the solution into 0.06 M which was followed by an hour of sonication, the solution gradually turned into brownish red with higher viscosity. This could be ascribed to the transformation of ion species into dioxovanadium cation $[VO_2]+$(Equation 4). It should be noted that the vigorous bubbling observed during the mixing of $V_2O_5$ and $H_2O_2$ is the results of releasing of oxygen gas from reactions 3 and 4; each $V_2O_5$ results in the release of $2O_2$. The increased viscosity and formation of brownish red gel suggests the starting of $V_2O_5.nH_2O$ gelation (Equation 5).

After sonication, the brownish red mixture of $V_2O_5.nH_2O$ gel and solution was dispersed into 0.0075 M with pH=2.7 for the deposition. During cathodic deposition, electrons move toward the negative side, therefore the $V^{5+}$ species from $V_2O_5$ colloidal particles and dioxovanadate cations $VO_2+$ get reduced on the surface of fluorine-doped tin oxide coated (FTO) glass at negative side (Equation 6-7):

$$V_2O_5 + 4H^+ \leftrightarrow 2VO_2^+ + 2H_2O \qquad (6)$$

$$VO_2^+ + e^- \rightarrow VO_2 \qquad (7)$$

Upon the deposition of $VO_2$ on the surface of FTO substrates, $VO_2$ (with $V^{4+}$) would serve as a nucleation center that initiates and catalyzes the formation of $V_2O_5.nH_2O$ through low pH condition.

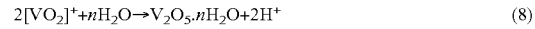

$$2[VO_2]^+ + nH_2O \rightarrow V_2O_5.nH_2O + 2H^+ \qquad (8)$$

Consequently, hydrous vanadium oxide would deposit through a combination of parallel yet sequential cathodic deposition and catalyzed gelation. It should be noted that the gelation (Equation 8) without $V^{4+}$ catalyst typically takes more than 24 hours.

In spite the fact that above chemical reactions have been well studied and documented, the present study is the first effort to deposit films through the combination of cathodic deposition of $VO_2$ and $V^{4+}$ catalyzed gelation to form a mixture film of $VO_2$ and $V_2O_5 \cdot nH_2O$, and this deposited thin films on top of FTO glass substrates could directly be applied as cathodes for thin film Li-ion batteries. Although other deposition methods have been studied for the formation of $V_2O_5$ films, cathodic deposition is unique as $V^{5+}$ is simultaneously reduced to $V^{4+}$ during film fabrication. Consequently the $V_2O_5$ films consist of an appreciable amount of $V^{4+}$ ions that serve three important functions: (1) nucleation centers for phase transition for film deposition, (2) initiators for the sol-gel processing, (3) efficient catalysis for the formation and gelation of hydrous $V_2O_5$ films. The cathodic deposition of $V_2O_5$ thin films is low cost and easy to control.

Figure 2:
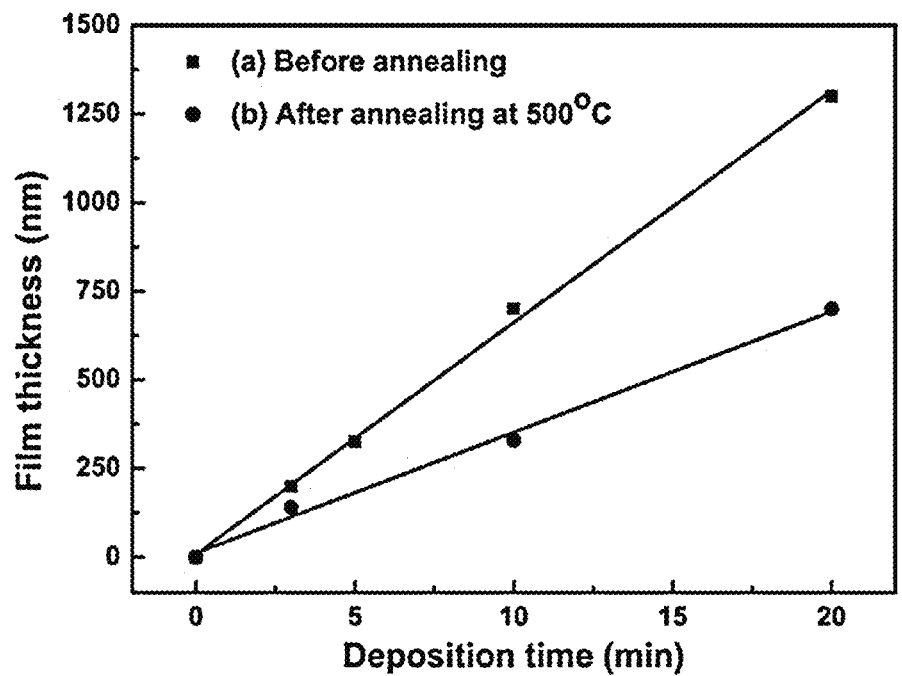
FIG. 2: The relationship of deposition time and thickness of the (a) as-deposited $V_2O_{5-x}.nH_2O$ films and (b) 500° C. annealed $V_2O_5$ films.

FIG. 2 shows the thickness of the film deposited at negative side as a function of deposition time with a constant voltage of −2.4 V: curve (a) showing the deposition rate for the film before treatment, while curve (b) for the film after annealing at 500° C. for 3 hours. The deposition rates are 65 nm/min and 3 nm/min for the films before and after annealing, respectively. The noticeable reduction in films thickness after heat treatment corresponds to the volume shrinkage and can be attributed to (1) the crystal structure change and (2) partial densification. This is in a good agreement with the structural study of $V_2O_5 \cdot nH_2O$ xerogel. Both orthorhombic $V_2O_5$ and $V_2O_5 \cdot nH_2O$ xerogel have layered structures: the structure for the orthorhombic $V_2O_5$ can be described by the packing of $VO_5$ square pyramids with a interlayer distance of ~4.5 Å along c axis of the orthorhombic cell; while the structure for the $V_2O_5 \cdot nH_2O$ xerogel is an assembly of bilayers of single $V_2O_5$ layers with $VO_5$ square pyramids with water molecules residing in between, the distance between each slab is 8 Å-21.6 Å depends on the content of the crystalline water in the $V_2O_5 \cdot nH_2O$ xerogel. $V_2O_5$ has a relatively low melting point and often been used as sintering additives. 500 C is a relatively low temperature for most oxides; however this temperature may allow a noticeable densification for $V_2O_5$. Moreover it can be observed that with the drastic volume change after thermal treatment, these $V_2O_5$ films were well affixed and stayed intact on the FTO glasses, without any macroscopic defects, cracks, pinholes, etc., not even for large-sized films (1 inch by 1.5 inch in area, 500 nm in thickness). This can be ascribed to the well attachment between the films and the substrates induced by the external electrical field, as well as the fine and homogenous films composed of nanocrystallites in tens of nanometers of size formed by cathodic deposition from $V_2O_5$ solution.

Film Characterization

Figure 3:
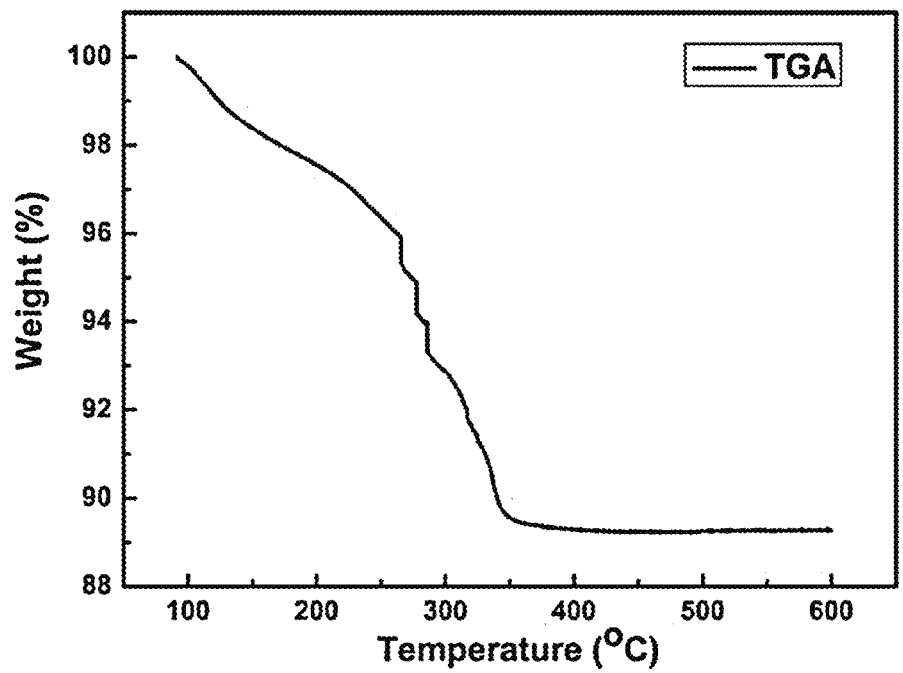
FIG. 3: Thermogravimetric analysis (TGA) curve of as-deposited $V_2O_{5-x}.nH_2O$ film tested in the air from 100° C. to 600° C. with a heating rate of 2° C. $min^{-1}$.

In order to study the crystalline water loss during annealing process, thermogravimetric analysis (TGA) was carried out in flowing air from room temperature up to 600 C with a heating rate of 2 C min$^{-1}$ and the result is shown in FIG. 3. It should be noted that since the $V_2O_{5-x} \cdot nH_2O$ films in this research contains $V^{4+}$ species induced by the cathodic deposition, the films will gain weight from the oxidization reaction when heated up in the air. However the loss of the crystalline water will give a total thermogravimetric trend of weight loss. Therefore in this research, it is inaccurate to use the weight loss from TGA measurement to decide the composition of crystalline water. It can be observed that the TGA curve shows the thermogravimetric change happening in different temperature range in comparison with other references which is due to the various film processing methods applied. In this research the ~3% weight loss below 250 C can be mainly ascribed to the loss of weakly bound water, and the weight loss between 250 C and 340 C generally involves the loss of crystalline water in $V_2O_{5-x} \cdot nH_2O$. Above 340 C the crystallization of $V_2O_5$ occurs. This is consistent with XRD results discussed in the following paragraphs.

FIG. 4 compares the X-Ray Diffraction patterns of the $V_2O_{5-x} \cdot nH_2O$ films after cathodic deposition from $V_2O_5$ resource at room temperature, annealing at 250 C and 500 C respectively in the air. The as-deposited film without any heat treatment shows an intense (001) peak, which indicates the characteristic layered structure of $V_2O_{5-z} \cdot nH_2O$. This is in consistency with other research showing a preferential structure of ribbon stacking for $V_2O_5 \cdot nH_2O$ gel. The crystallite size calculated by Scherrer Equation is 6.2 nm, and the interlayer distance estimated from Bragg's law is 12.77 Å, which indicates the composition of crystalline water in this sample is n>2.

When the $V_2O_{5-x} \cdot nH_2O$ film was heated up to 250 C, the improved crystallinity of layered structural $V_2O_{5-x} \cdot nH_2O$ film can be confirmed by the appearance of (003) and (004) together with (001) peaks. It is obvious that the (001) peak shifts to the higher angle direction, which results in a decrease in the interlayer distance to 11.31 Å (n≈1.5) due to the loss of crystalline water from the heat treatment. The crystallite size grows slightly larger to 10.0 nm calculated from the XRD pattern. The exhibition of a series of (001) harmonics reflects the nature of the turbostratic stacking of $V_2O_5$ ribbons. Moreover the missing peak which is corresponding to the (002) plane suggests the formation of double sheets of $V_2O_5$ for each layer.

After the $V_2O_{5-x} \cdot nH_2O$ film was annealed at 500 C, the sample was completely dehydrated presenting a pure orthorhombic phase with good crystallinity as shown in the XRD pattern. The interlayer distance along c axis is calculated to be 4.36 Å which is in perfect match with the crystalline structure of orthorhombic $V_2O_5$ (JCPDS No. 41-1426). The $V_2O_5$ films have preferred orientation which is evidenced by missing diffraction pattern for (010) plane along b axis. The crystallization temperature of orthorhombic phase at 500 C, and $V_2O_5 \cdot 1.5H_2O$ at 250 C in this study is higher in comparison with other references. The crystallite size of this orthorhombic $V_2O_5$ is calculated to be 35.1 nm from the XRD pattern.

XPS measurements were carried out on the as-deposited $V_2O_{5-x} \cdot nH_2O$ films at room temperature and the $V_2O_5$ films after annealing in the air at 500 C to investigate the oxidation state of the vanadium as well as to estimate the content of reduced vanadium $V^{4+}$ in the films. The $V2p_{3/2}$ core peak spectra for the as-deposited $V_2O_{5-x} \cdot nH_2O$ films (FIG. 5A) is composed of two components which are located at 517.96 eV and 516.65 eV respectively, as shown in the fitting data. These two binding energy values can be associated to two formal oxidation degrees+5 and +4. However for the 500 C annealed $V_2O_5$ films, there is only one $V2p_{3/2}$ core peak locating at 517.86 eV as shown in FIG. 5B, which is associated to the +5 formal degree for vanadium ions. This difference can be explained by the film preparation conditions: the as-deposited films were formed on the substrate placed on the negative side, as discussed in the film preparation part, some of the $V^{5+}$ on the surface of substrate got reduced to $V^{4+}$ which further initiated the gelation hence formed the $V_2O_{5-x} \cdot nH_2O$ films. Therefore there was noticeable $V^{4+}$ existing in the as-deposited films, as detected from XPS. After annealing at 500 C in the air, the introduction of oxygen leads to the oxidation and crystallization of the films and therefore the vanadium ions are presented completely in the highest oxidation degree ($V^{5+}$). The ratio of $V^{4+}/V^{5+}$ is 15/85, which was decided from the area ratio of fitted spectrum of V2p$_{3/2}$ (V$^{5+}$) and V2p$_{3/2}$ (V$^{4+}$) as listed in Table 1. These results could well confirm the films color observed and the cathodic deposition mechanism discussed in the film preparation section.

TABLE 1

Figure 5A:
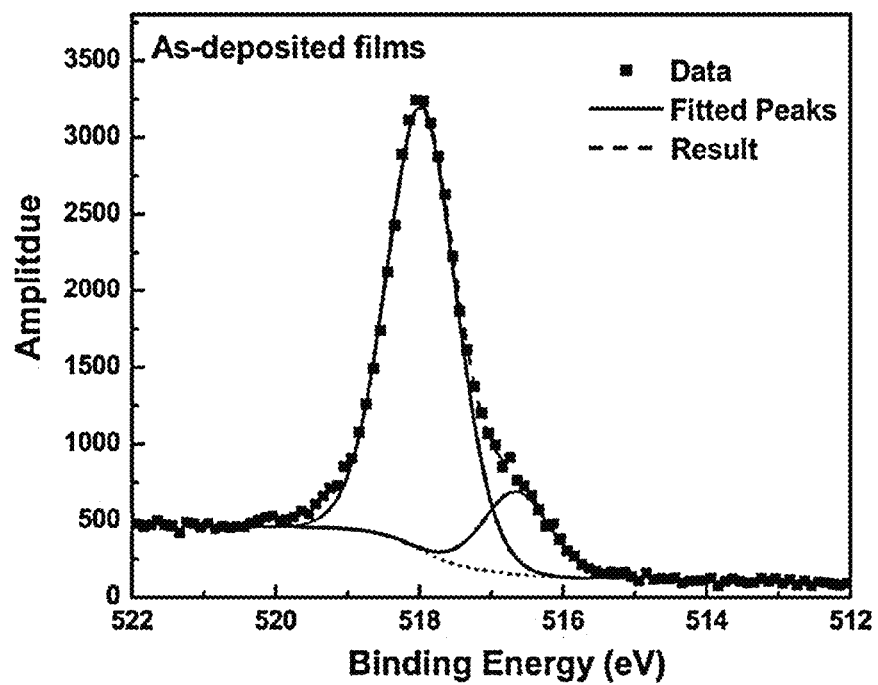
FIG. 5: X-ray photoelectron spectroscopy (XPS) spectrum of high-resolution scan on the $V2p_{3/2}$ core peaks performed on the films. (A) The as-deposited $V_2O_{5-x}.nH_2O$ films at room temperature; (B) The $V_2O_5$ films after annealing at 500° C. in the air.
Figure 5B:
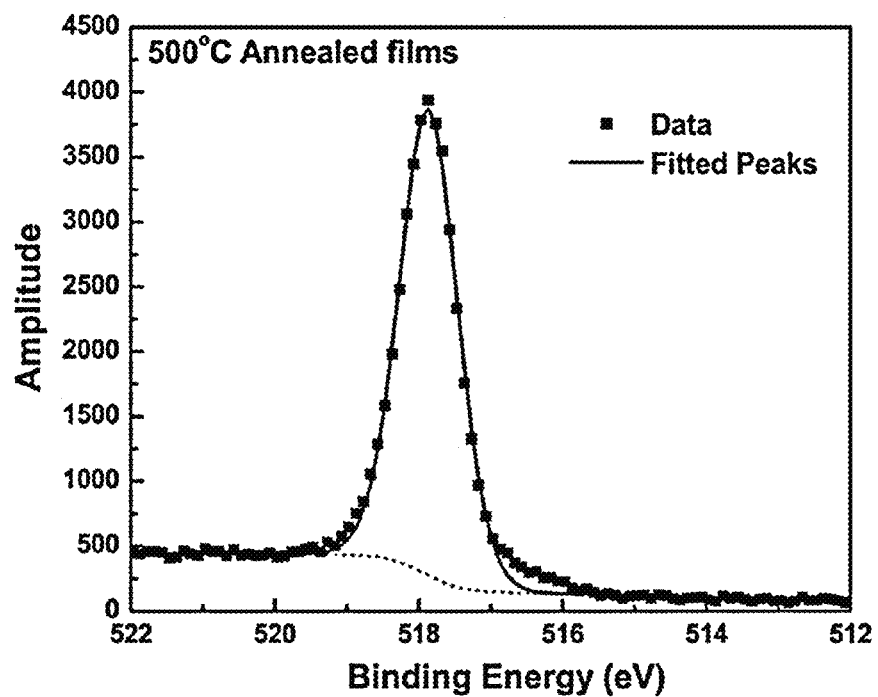

Binding energy (E$_B$) of the V2$_{p2/3}$ core peaks taken from the spectrum in FIGS. 5A and 5B

| Sample | V$^{5+}$ peak area | V$^{4+}$ peak area | V$^{5+}$/V$^{4+}$ | Biding Energy for V$^{5+}$ (eV) | Biding Energy for V$^{4+}$ (eV) |
|---|---|---|---|---|---|
| 5A | 3523.41 | 635.13 | 85/15 | 517.96 | 516.65 |
| 5B | 3624.30 | — | — | 517.86 | — |

Figure 6A:
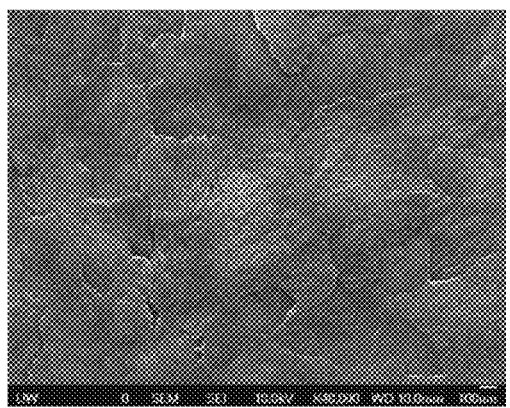
FIG. 6: Scanning electron microscope (SEM) image of the 500° C. annealed $V_2O_5$ film: (A) top view, ×40 K, (B) top view, ×100 K, (C) cross-section view, ×40 K, (D) cross-section view, ×100 K.
Figure 6B:
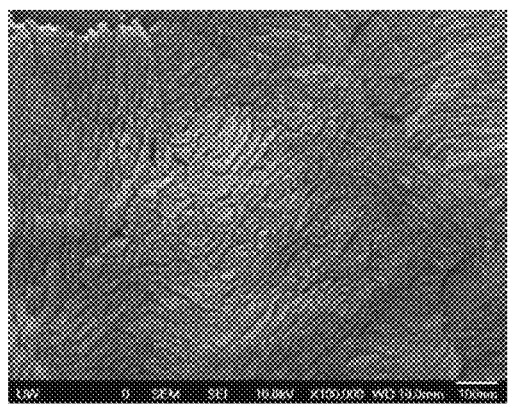
Figure 6C:
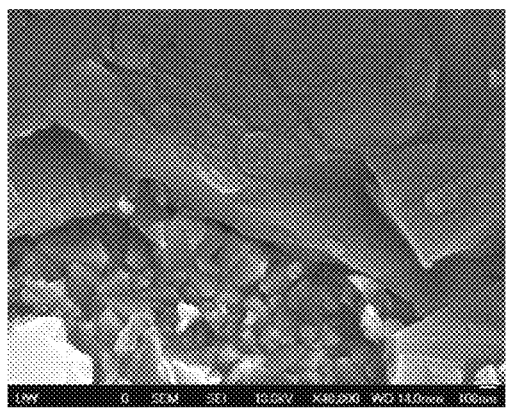
Figure 6D:
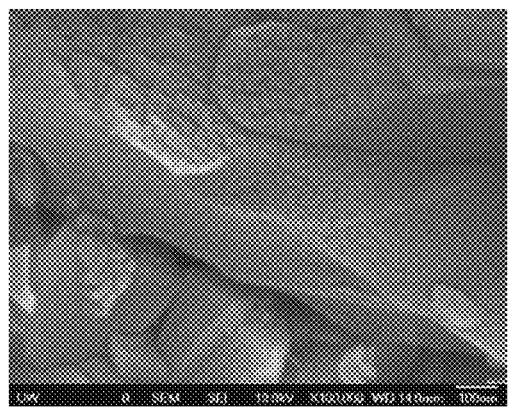
Figure 7:
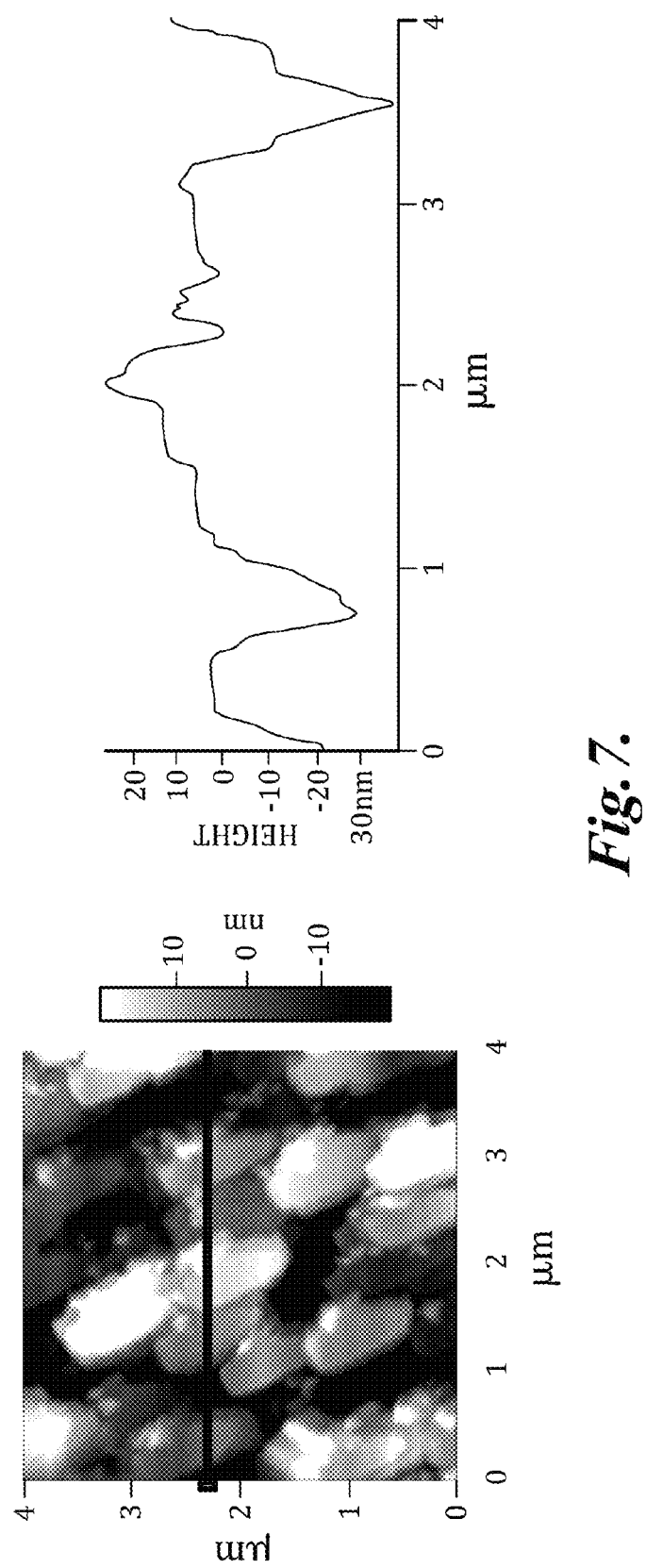
FIG. 7: Surface morphology of the films annealed at 500° C. measured by atomic-force microscopy (AFM) on 4 μm×4 μm area and surface roughness distribution along the red line as shown.

FIG. 6A-D are the SEM images revealing the surface morphology and microstructures of the V$_2$O$_5$ films annealed at 500 C for 3 hours. The top views of annealed V$_2$O$_5$ films (FIG. 6A-B) shows that the uniform film was homogenously deposited, and composed of small "wrinkled" flakes (domain-like) with 0.5-1.5 μm in diameter placing parallel to the substrate. Each flake is composed of smaller particles of 20-30 nm in diameter, which corroborates very well with the crystallite size calculated from the XRD patterns. The cross-section view of the annealed V$_2$O$_5$ films (FIG. 6C-D) shows the similar nanostructures with 20-30 nm nanoparticles, again agrees very well with the crystallite size calculated from the XRD patterns with 10 nm gaps separating adjacent nanoparticles. It is noted that the nanostructures and the size of nanocrystallites remain the same in the surface and inside the film. It should also be noted that such unique nanostructure was not found in V$_2$O$_5$ thin films deposited on anodic substrates The formation of such peculiar domain-nanocrystallite structured thin films may be explained by considering the fact that the film was deposited through a combination of cathodic deposition and catalyzed gelation. The formation of tetravalenced vanadium ions or VO$_2$ by cathodic deposition initiates and catalyzes the formation of gelation of hydrous vanadium pentoxide. Continued reduction and cathodic deposition of vanadium dioxide serves secondary (or new) nucleation, consequently the deposited film consists of many nanoparticles stacking with spaces separating one another. The VO$_2$ could also be regarded as nucleation sites during annealing process, which retards the nanocrystallite growth and suppresses the grain boundary migration (FIG. 6C-D). The AFM image (FIG. 7) on the surface of 500 C annealed V$_2$O$_5$ thin films with an area of 4 μm×4 μm shows that the flake size is about 0.5 μm×1.5 μm in the planar dimension, and the roughness of the film is measured to be +/−20 nm.

Figure 8:
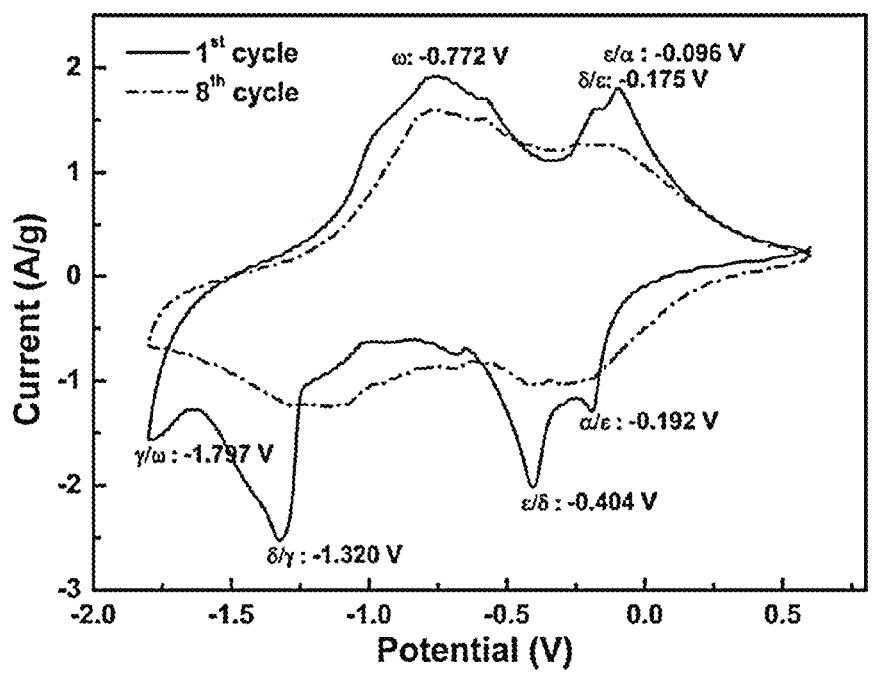
FIG. 8: The cyclic voltammograms of 500° C. annealed $V_2O_5$ films with a scan rate of 5 mV s$^{-1}$ in 1M LiClO$_4$/PC electrolyte solution for the 1$^{st}$ cycle (solid line) and 8$^{th}$ cycle (dash-dot line)

FIG. 8 shows the 1$^{st}$ and 8$^{th}$ cycle of the cyclic voltammogram of 500 C annealed V$_2$O$_5$ thin film electrodes with a thickness within 150-170 nm. It can be clearly observed that there are four cathodic peaks located at −0.192 V, −0.404 V, −1.320 V and −1.797 V respectively, and these four peaks are corresponding to the α/ε, ε/δ, δ/γ, γ/ω phase transitions within the potential range of 0.6 V~−1.8 V (Vs. Ag$^+$/Ag) respectively according to the other research references. The two anodic peaks at −0.096 V and −0.175 V can be ascribed to the reverse phase transitions of ε/α and δ/ε respectively which still leaves a broad peak after 8 cycles. This is different from other studies which show that when there is more than 2.2 mol Li$^+$ being intercalated into Li$^x$V$_2$O$_5$ (x≥2.2) especially at high current densities, there will occur an irreversible phase transition which results in a capacity loss due to the kinetic limitations. However in this research, we were able to observe the partially reversible α/ε, ε/δ phase transitions at a current density of 200 mA g$^{−1}$ (1.3 C) after 8 cycles. This is a proof of facilitated thermodynamics and kinetics of phase transition, which can be ascribed to the unique "wrinkled" nanostructure of 20-30 nm nanocrystallite separated by 10 nm gaps (FIG. 6). The phase transition during lithium ion intercalation/deintercalation could be favored by the nanoscale dimension as well as the accessibility of the intercalation sites. Nanostructured materials possess huge surface area and excessive surface energy, and thus offer more sites for lithium ion insertion and extraction and allow the phase transition that is otherwise difficult for bulk materials. The broad peak at −0.772 V appears during anodic scanning is in good agreement with the irreversible formation of the w phase, which could be further proved by chronopotentiometric curves (FIG. 9).

Figure 9:
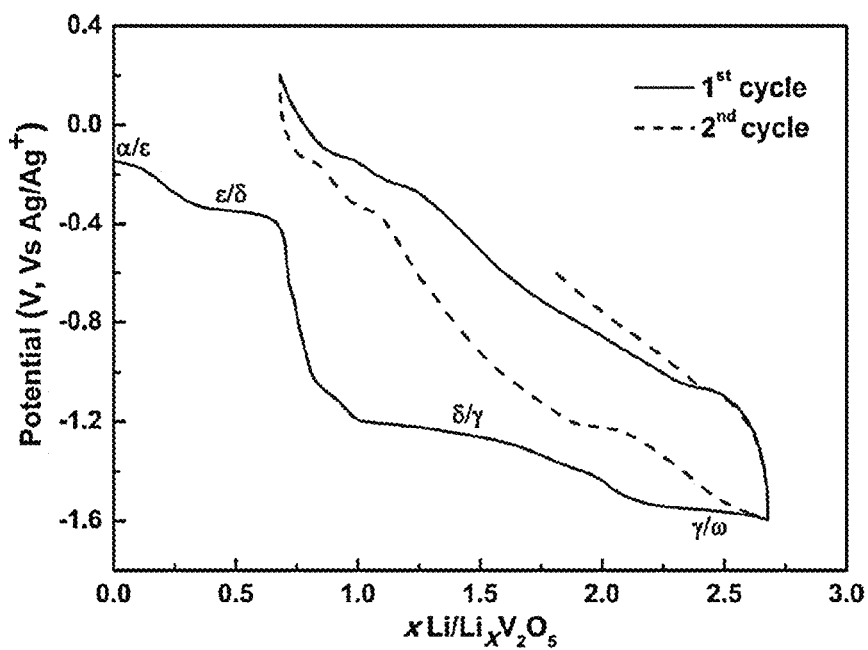
FIG. 9: Chronopotentiometric curves for the first discharge/charge and second discharge cycles of 500° C. annealed $V_2O_5$ thin film cathodes at a current density of 200 mA g$^{-1}$ (1.3 C) in the potential range of −1.6 V–0.2 V (Vs. Ag$^+$/Ag).

FIG. 9 shows the chronopotentiometric curves for the first discharge/charge and second discharge curves of 500 C annealed V$_2$O$_5$ thin film electrodes of 150-170 nm thick at a current density of 200 mA/g (1.3 C) in the potential range of −1.6 V~−0.2 V (Vs. Ag$^+$/Ag). The initial discharge curve presents four noticeable plateaus: −0.16 V, −0.34 V, −1.25 V and −1.55 V, which are corresponding to the successive appearance of two-phase region: α/ε, ε/δ, δ/γ, γ/ω with Li composition for Li$_x$V$_2$O$_5$ in a range of 0<x≤2.68 (related with a capacity of 402 mA h g$^{−1}$). It can be observed that the first charge and second discharge curves maintain noticeable but shorter plateaus at the same potential positions which are related with the above listed phase transitions. These plateaus solidly prove the enhanced reversibility of phase transitions when more than 2 mols of Li$^+$ ions was inserted into the cathodic deposited V$_2$O$_5$ films in this research. Moreover it is noteworthy that, in the first discharge curve, the vertical drop line connecting the two plateaus related with ε/δ, δ/γ phase transitions becomes a slope in the successive first charge and second discharge curves. This slope shape curve is rather related to a solid solution behavior, which can be related to the formation of a new phase: ω—Li$_x$V$_2$O$_5$ (x>2) and it is reported to be irreversible. After the first charge there was 0.68 mol Li$^+$ trapped in the newly formed w phase; however the second discharge achieves a complete intake of the amount of Li$^+$ to form ω—Li$_{2.68}$V$_2$O$_5$. These CP curves are in good agreement with the CV results (FIG. 8) in explaining the phase transitions of V$_2$O$_5$ films.

Figure 10:
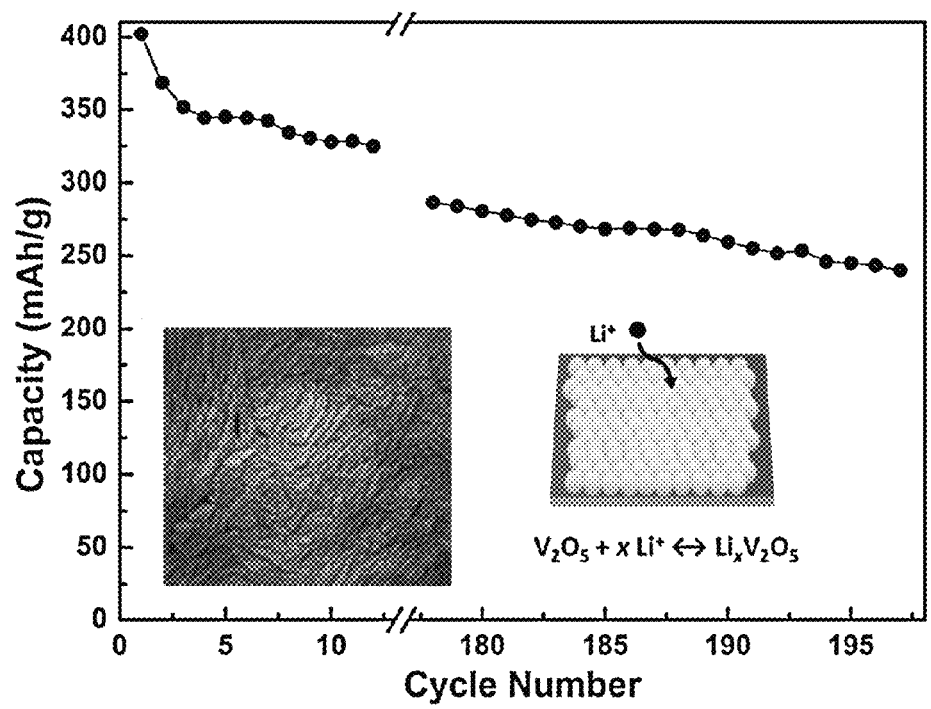
FIG. 10: The cyclic performance of 500° C. annealed $V_2O_5$ thin film cathodes at a current density of 200 mA g$^{-1}$ (1.3 C). (Inset shows the SEM image of the $V_2O_5$ film surface, and a schematic drawing of the enhanced Li$^+$ diffusion in the unique nanostructured $V_2O_5$ film with its high surface area and short diffusion path).
Figure 11:
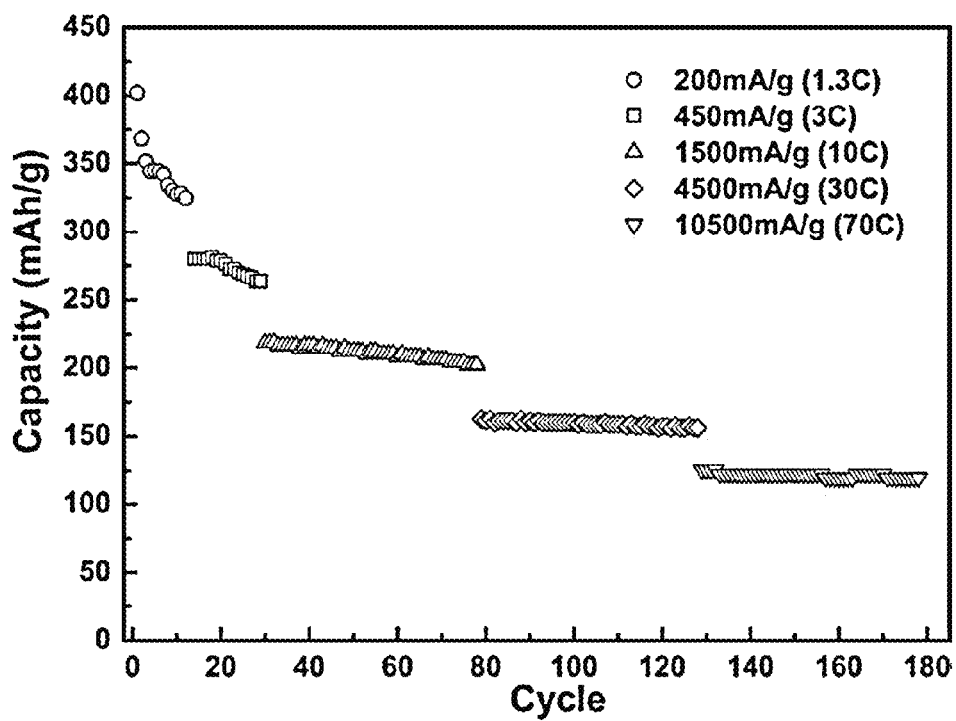
FIG. 11: The cyclic performance of 500° C. annealed $V_2O_5$ thin film cathodes at various current densities from 200 mA g$^{-1}$ (1.3 C) to 12.5 A g$^{-1}$ (70 C) for up to 177 cycles.

The cyclic performance of the V$_2$O$_5$ thin film electrodes annealed at 500 C was investigated. FIG. 10 shows the discharging capacity at a current density of 200 mA g$^{−1}$ (1.3 C) for the first 12 cycles, then followed by 170 cycles of discharge/charge tests at various current densities (which will be further discussed in FIG. 11). The last 20 cycles back at current density of 200 mA g$^{−1}$ (1.3 C) for capacity fading investigation are also shown in FIG. 10. The initial discharge capacity is 402 mA h g$^{−1}$, which is related to Li$_{2.68}$V$_2$O$_5$ before the second charge started. Due to the irreversible phase formation from first charge, the second discharge capacity dropped to 368 mA h g$^{−1}$, and stayed at 325 mA h g$^{−1}$ for the 12$^{th}$ cycle. The coulombic efficiency is 74.6% for the first cycle and 85.8% for the second cycle. After more than 180 cycles tested at different current densities, the discharge capacity was still as high as 240 mA h g$^{−1}$. The specific energy densities were calculated to be 900 W h kg$^{−1}$ for the 1$^{st}$ cycle and 723 W h kg$^{−1}$ for the 180$^{th}$ cycle when discharged at 200 mA g$^{−1}$ (1.3 C). This is higher than the data reported on V$_2$O$_5$ for cathode materials in lithium ion batteries. FIG. 11 shows the cyclic discharge capacity of 500 C annealed V$_2$O$_5$ films performed at various current densities at 200 mA $g^{-1}$ (1.3 C), 450 mA $g^{-1}$ (3 C), 1.5 A $g^{-1}$ (10 C), 4.5 A $g^{-1}$ (30 C) and 10.5 A $g^{-1}$ (70 C). At fairly high current densities which correspond to fast battery discharge/charge cycles, the film electrode retains high lithium ion storage capacities: 160 mA h $g^{-1}$ at 4.5 A $g^{-1}$ (30 C) and 120 mA h $g^{-1}$ at 10.5 A $g^{-1}$ (70 C), or with a high specific power of 28 kW $kg^{-1}$.

The cathodic deposited $V_2O_5$ thin film electrodes show much higher lithium intercalation capacity and energy and power density with better cyclic stability in comparison with other nanostructured $V_2O_5$ cathodes reported recently. The high performance could be ascribed to the unique nanostructure in this research (FIG. 10, inset): the 20-30 nm nanocrystallites provide a shorter diffusion path for $Li^+$ ion intercalation/deintercalation, and the 10 nm wrinkled gaps offers a higher surface area with more accessible intercalation sites which favors the electrolyte penetration and interface reactions. This nanostructure could effectively enhance the phase transition during $Li^+$ ion intercalation/deintercalation, and it essentially benefits from the presence of $V^{4+}$ serving as films initiators and catalysts during cathodic deposition, as well as nucleation sites in the annealing process in air. Since more space freedom is offered by this nanostructure, the film's mechanical integrity and stability during battery test can be well maintained which will result in a good cyclic stability. The external electrical field applied during film deposition helps form a sturdy adhesion to the conductive substrate, which could facilitate a better $Li^+$ ion diffusion and guarantee an excellent energy and power density.

Conclusions

Nanostructured $V_2O_5$ thin film electrodes have been prepared for the first time by cathodic deposition from $V_2O_5$ and $H_2O_2$ followed by annealing at 500 C in air. The mechanisms and reactions for cathodic depositions of $V_2O_5$ thin films are discussed in detail, and the formation of tetravalenced vanadium ions or $VO_2$ by cathodic deposition initiated and catalyzed the formation of gelation of hydrous vanadium pentoxide films. After annealing the as-deposited $V_2O_{5-x} \cdot nH_2O$ films at 500 C in the air, the $V_2O_5$ film shows a preferred oriented orthorhombic phase with a crystallite size of 35.1 nm calculated from XRD patterns. The XPS result reveals that there is 15% $V^{4+}$ out of $V_{total}$ in the as-deposited $V_2O_5$, $nH_2O$ films and they all get oxidized to $V^{5+}$ ions at 500 C. The "wrinkled" nanostructure of $V_2O_5$ films was detected by SEM to be composed of fine nanocrystallites of 20-30 nm separated by 10 nm gaps. The electrochemistry and phase transitions during Li-ion intercalation and de-intercalation of cathodic deposited $V_2O_5$ nanostructured thin films are explicitly discussed in this paper. Electrochemical tests reveal that the nanostructured $V_2O_5$ thin film electrodes possess enhanced phase transition reversibility during $Li^+$ ion intercalation/deintercalation. The high energy density (900 W h $kg^{-1}$ at 200 mA $g^{-1}$) and power density (28 kW $kg^{-1}$ at 10.5 A $g^{-1}$), enhanced phase transitions as well as the good cyclic stability (well functioned over 200 cycles) is ascribed to the unique nanostructure with higher surface area, shorter $Li^+$ ion diffusion path and improved mechanical integrity.

Example 2

Porous Orthorhombic V205 Films

Experimental

The porous structured $V_2O_5$ films were prepared by electrodeposition following the same procedure as in Example 1. $V_2O_5$ powders (99.8%, Alfa-AESAR) were added into de-ionized water and $H_2O_2$ (30 wt. % in $H_2O$, Sigma-Aldrich) at a $V_2O_5$ concentration ($C_V$) of 0.3 M and n($H_2O_2$): n(V) of 8.05:1, and the resulting solution was stirred and sonicated for 15 min successively, followed by being diluted to $C_V$=0.06 M and then sonicated for 1 hour until the solution turned into brownish red $V_2O_5$ gel. The block copolymer Pluronic P123[$(CH_2CH_2O)_{20}$—$(CH_2CH(CH_3)O)_{70}$—$(CH_2CH_2O)_{20}$] was dissolved into de-ionized water to form a transparent 4 wt % solution, and then mixed with the above $V_2O_5$ gel to get the deposition precursor with $C_V$=0.013 M. The $V_2O_5$ films were deposited on the fluorine doped tin oxide (FTO) coated glass at a voltage of −2.4 V. The as-deposited films were ambient dried and then annealed at 500° C. for 1 hour in air.

The surface morphology of porous $V_2O_5$ films was observed using scanning electron microscopes (SEM, JEOL, JSM-5200), and phase and crystallite size were studied using X-Ray Diffraction (XRD, Philips 1820 X-Ray Diffractometer). Surface area was determined by nitrogen adsorption-desorption at 77 K (NOVA 4200e, Brunauer-Emmett-Teller (BET)). Electrochemical properties of the $V_2O_5$ thin film electrodes were tested using a standard three-electrode setup. The cyclic voltammograms (CV) and chronopotentiometric (CP) measurement were performed using electrochemical analyzer (CH Instruments, Model 605B) in the voltage range of 0.6 V~−1.1 V (Vs. Ag/$Ag^+$) with 1M $LiClO_4$ in propylene carbonate (PC) as electrolyte, a Pt plate as the counter electrode, and Ag/AgCl as the reference electrode.

Results and Discussion

Figure 12A:
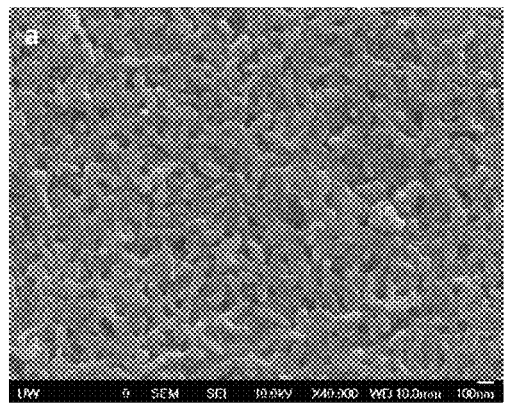
FIGS. 12A and 12B: SEM images of 500 C annealed porous $V_2O_5$ film on fluorine-doped tin oxide (FTO) glasses.
Figure 12B:
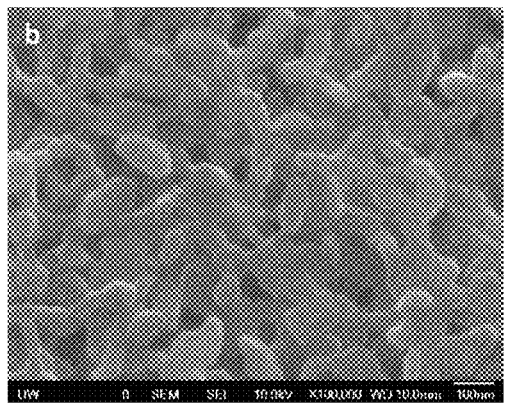

Porous $V_2O_5$ films were successfully fabricated by electrodeposition as shown in the SEM images in FIGS. 12A and B. The porous $V_2O_5$ films compose of homogeneously distributed pores of less than 100 nm in diameter, as well as $V_2O_5$ size of around 100 nm. Previously we have reported electrodeposition of folded $V_2O_5$ film electrodes from $V_2O_5$ sol using the similar method. Block copolymer P123 has been reported as porous structure directing agents due to its amphiphilic properties, and it could also reduce or prevent the aggregation of nanocrystallites as well as impede the crystal coarsening. In this research, P123 is homogeneously mixed with $V_2O_5$ sol, where the vanadium species, e.g., $[VO_2]^+$, $VO_2$, $V_2O_5 \cdot nH_2O$, could be anchored to the surfactant chain on P123 by the combined electrostatic force and hydrogen bonding in a low-pH aqueous solution. After induced gelation and film formation by applying an external electrical voltage, the P123-templated vanadium oxide films could be homogenesouly deposited onto FTO substrates. P123 was then removed by annealing the film in the air at 500 C for 1 hours. The specific surface area of the porous nanostructured $V_2O_5$ films was found to be ~40 $m^2$/g as determined by nitrogen sorption isotherms, which is larger than the surface area of porous structured $V_2O_5$ electrodes reported recently. The macropores and ~100 nm $V_2O_5$ discernible from SEM images could not solely account for such a large surface area; in fact the surface area could mainly come from mesopores with pore size distribution centered at a diameter of 3.68 nm from BET result.

Figure 12C:
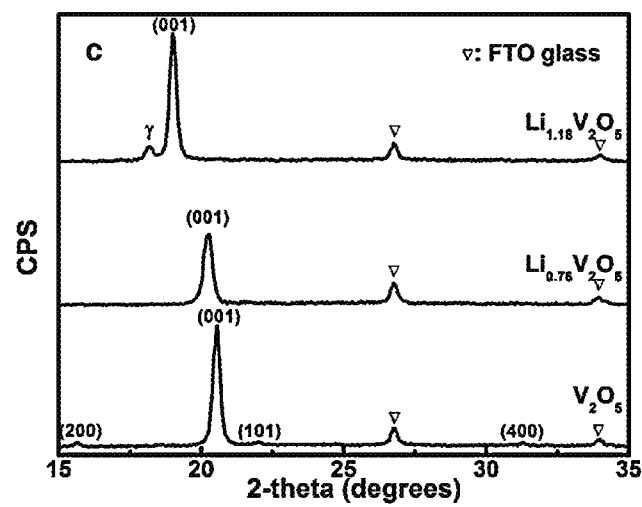
FIG. 12C XRD patterns of porous $V_2O_5$ film before and after Li$^+$ intercalation. The crystallite size (26.9 nm) calculated from XRD peak is smaller than the $V_2O_5$ size (~100 nm) observed from SEM images, it is likely that SEM shows a secondary aggregated/stacked structure of small crystallites. In combination with BET results, the surface of small crystallites are accessible, therefore it is possible that electrolyte could penetrate through macropores and mesopores, resulting in more intercalation sites at the interface between electrolyte and electrode.

FIG. 12C shows the XRD patterns for the pristine porous $V_2O_5$ film and after the films intercalated with 0.76 mol and 1.18 mol $Li^+$, respectively. The porous $V_2O_5$ film annealed at 500 C shows pure orthorhombic phase and the crystallite size is calculated to be 26.9 nm from the (001) peak based on Scherrer's equation, which is 8.2 nm smaller than the crystallite size of 35.1 nm in the folded structured $V_2O_5$ film electrodeposited from P123-free precursor. The reduced crystallite size could be ascribed to the presence of P123 during film deposition and annealing, where it could effectively impede the crystal growth. The lattice constant along c-axis has also been calculated from (001) peaks in XRD patterns to be 4.32 Å, 4.39 Å and 4.67 Å for $V_2O_5$, $Li_{0.76}V_2O_5$ and $Li_{1.18}V_2O_5$ respectively. During $Li^+$ insertion/extraction in $V_2O_5$, $Li^+$ travels along the b-direction between $V_2O_5$ layers, which induces the buckled $V_2O_5$ planes, and reduces a and b-constants due to the reduction in repulsive Coulumbic force along the ab-plane. In the meantime, c-constant increases as the result of expansion of interlayer distance. The change in c-constant in this study is in good consistency with previous literatures.

Figure 13A:
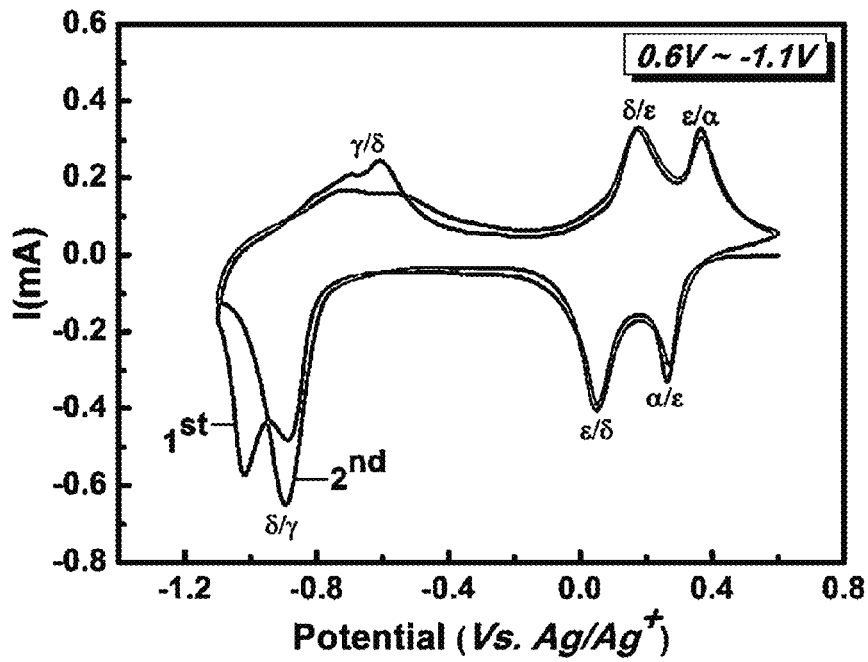
FIG. 13A: The cyclic voltammograms of 150 nm thick porous $V_2O_5$ films at 0.6 V~−1.1 V (Vs. Ag$^+$/Ag) (scan rate: 2 mV/s) and FIG. 13B chronopotentiometric curves for discharge and charge process of 150 nm thick porous $V_2O_5$ film cathodes at 0.6 V~−1.1 V (Vs. Ag$^+$/Ag) (current density: 180 mA/g).
Figure 13B:
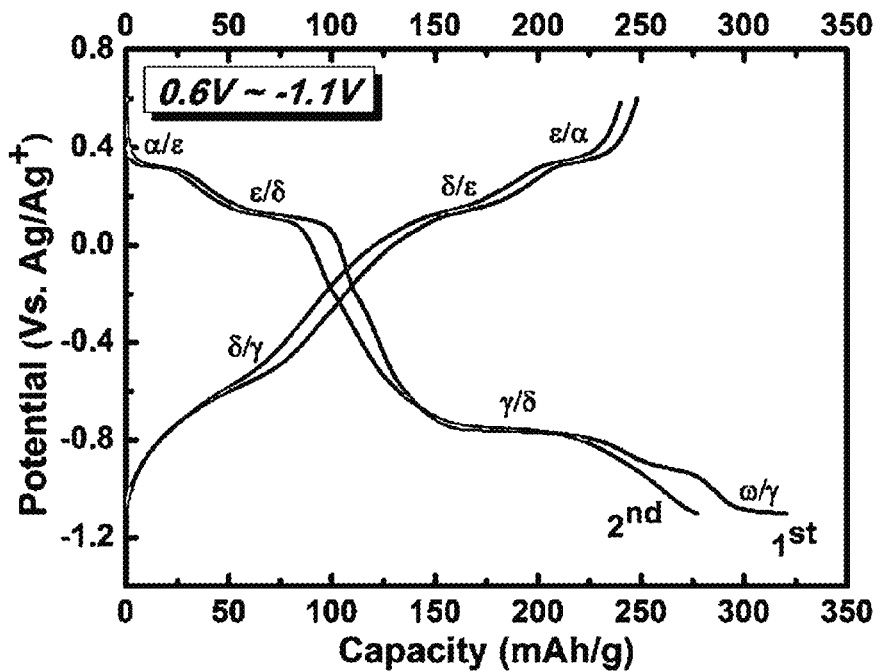

FIG. 13A shows the first 2 cycles of the cyclic votammogram (CV) of porous nanostructured $V_2O_5$ film electrodes when tested in 0.6 V~–1.1 V (Vs. $Ag/Ag^+$). The three pairs of redox peaks in FIG. 13A correspond to the reversible phase transitions among the following four $Li^+$ intercalated phases $Li_xV_2O_5$: α (x<0.1), ε (0.35<x<0.7), δ (0.9<x<1) and γ (1<x<2). Those successive phase transitions were also exemplified in the chronopotentiometric (CP) curves by the presence of three consecutive plateaus in FIG. 13B. It can be calculated that the discharge capacity loss between the first and second cycle was 43 mAh/g, which could be mainly due to the existence of partial phase transition from γ phase to ω phase as marked in FIG. 13B. From both the CV diagrams and CP curves, it can be concluded that the porous $V_2O_5$ films show a good reversibility when discharged and charged at 0.6 V~–1.1 V (Vs. $Ag/Ag^+$).

Figure 14A:
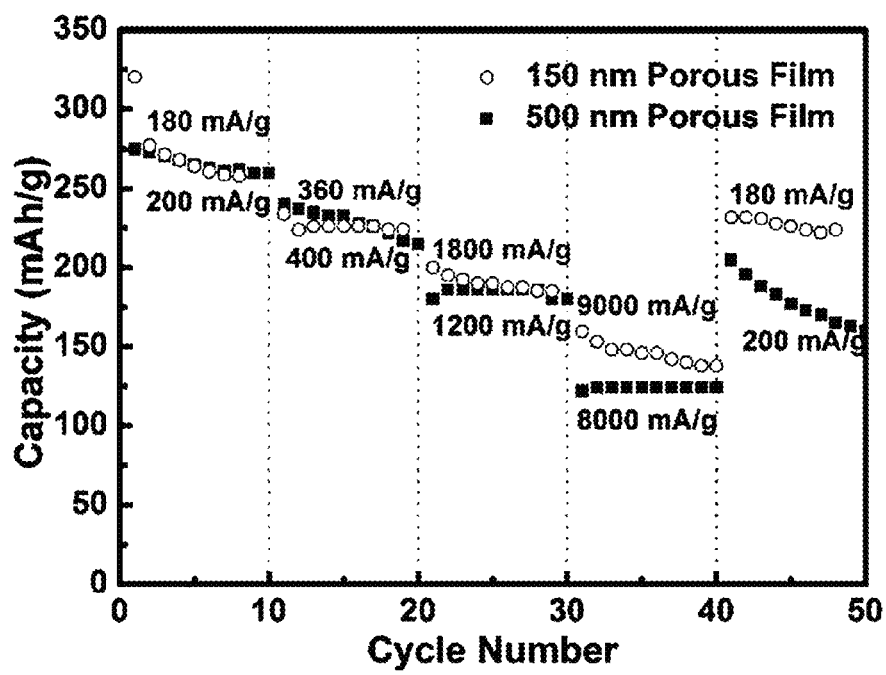
FIG. 14A: The rate performance of 150 nm and 500 nm thick porous $V_2O_5$ film cathodes at various current densities.
Figure 14B:
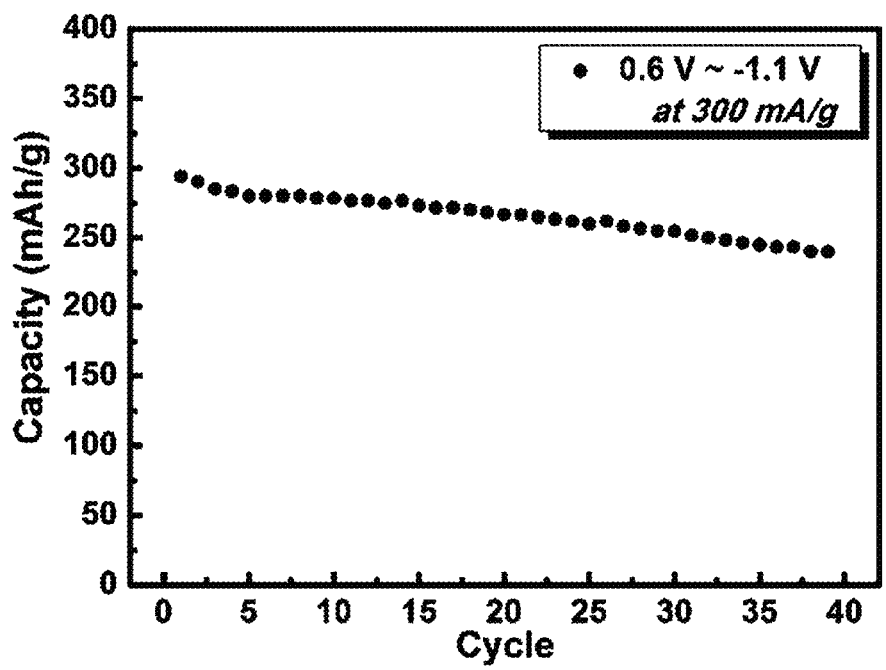
FIG. 14B The cyclic performance of 150 nm porous $V_2O_5$ thin film cathodes at a current density of 300 mA/g for 40 cycles.
Figure 14C:
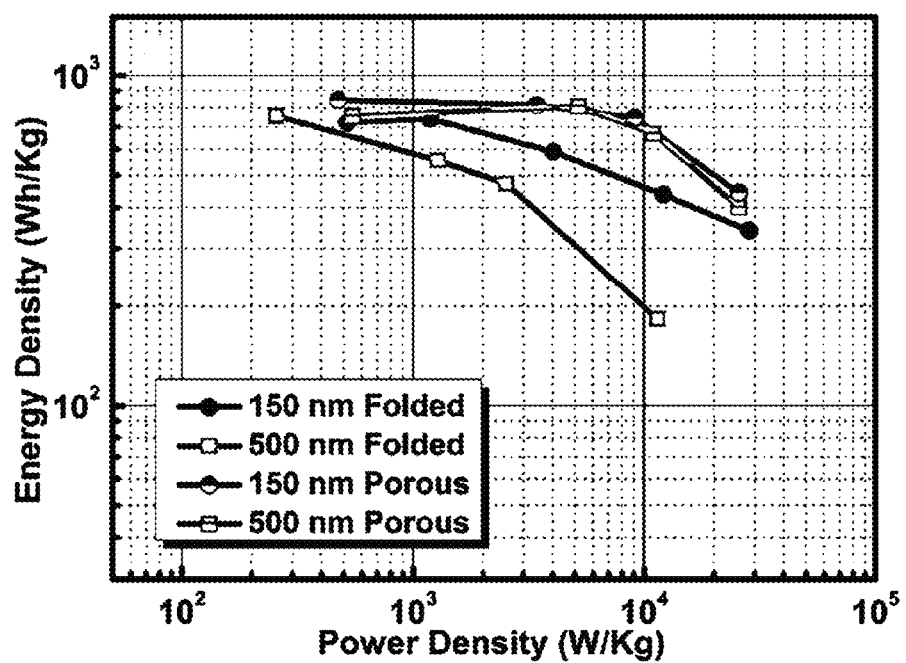
FIG. 14C Ragone Plots comparing the energy densities and power densities of porous and folded structured films with different thickness.

FIG. 14A compares the discharge capacities of porous $V_2O_5$ films with different thickness when discharged consecutively at various discharge/charge rates. The 150 nm porous $V_2O_5$ film delivers a high discharge capacity of over 300 mAh/g in the initial cycle. At the $27^{th}$ cycle, when a high current density of 9 A/g was applied, the discharge capacity maintains high as 160 mAh/g. When increase the thickness of the porous $V_2O_5$ film to 500 nm, it still keeps an excellent rate capability with a discharge capacity of 124 mAh/g at 8 A/g as shown in FIG. 14A. FIG. 14B shows the cyclic stability test at a constant current density of 300 m A/g for 40 cycles for porous $V_2O_5$ film with 150 nm in thickness. The initial discharge capacity was measured to be 294 m Ah/g, and it stays as high as 240 mAh/g at the $40^{th}$ cycle. The porous structure with $V_2O_5$ nanocrystallites together could offer a benign micro-environment with sufficient flexblity to accommodate volume change during $Li^+$ insertion and extraction, so that a good electrochemical stability and mechanical integrity could be guaranteed after many cycles. FIG. 14C are the Ragone Plots comparing the power densities and energy densities of the porous and folded structured $V_2O_5$ films. The 150 nm and 500 nm porous films show high energy density of 843 Wh/kg and 755 Wh/kg respectively, and high power density both of 25.6 kW/kg. The 500 nm folded film shows the worst properties both as in low energy density and power density. The difference of battery performance in altered film structures with various thicknesses could be ascribed to the following rationales. The unique structure in porous films could guarantee a large surface area with sufficient contact between electrode materials and electrolyte, which provides adequate intercalation sites for efficient $Li^+$ intercalation simultaneously. The presence of block copolymer P123 can delay the solid state diffusion and impede fine $V_2O_5$ nanocrystallites from agglomeration and coarsening during film formation and growth, therefore a short and fast $Li^+$ diffusion channel during phase propagation could be guaranteed. Whereas for the folded structured films, they could possess large surface area for efficient $Li^+$ intercalation when the films are as thin as 150 nm. However for the thicker folded films, they could become denser, partially losing the features of highly folded nanostructure and also the $V_2O_5$ particles could grow larger. The denser films are not able to offer sufficient penetration for electrolyte into all $V_2O_5$ particles, thus the $Li^+$ intercalation into thick $V_2O_5$ films would rely on and be bottlenecked by slow solid state $Li^+$ diffusion within large $V_2O_5$ particles during battery discharge. Similar phenomena of electrochemical performance degradation with increasing film thickness have also been reported in other literatures.

Conclusion

The porous nanostructured $V_2O_5$ films have been fabricated via a simple and low-cost electrode position approach from block copolymer P123 containing $V_2O_5$ precursor. P123 is believed to promote the formation of porous structure during film formation. Such $V_2O_5$ films demonstrated excellent electrochemical properties because porous $V_2O_5$ nanocrystallites possess (1) high surface area permitting enhanced charge transfer kinetics at the interface, (2) efficient $Li^+$ diffusion (3) good electrochemical stability and mechanical integrity.

Example 3

Freestanding Orthorhombic $V_2O_5$ Films

Freestanding, self-supported, continuous, orthorhombic $V_2O_5$ films were fabricated by the electrodeposition method provided in Examples 1 and 2 from a precursor solution having a hydrogen peroxide to $V_2O_5$ ratio of 4:1 and 2:1. The concentration of the $V_2O_5$ in the precursor solution was 0.1M. The films were deposited on titanium foil, and the sol gel formed by electrodeposition was annealed at 450° C. in air.

The $V_2O_5$ films after annealing were orthorhombic and could be easily peeled off from the titanium foil. FIG. 15 is a photograph of a $V_2O_5$ film peeled off of titanium foil after annealing.

The freestanding film can be readily inserted into an assembly of a lithium ion battery as the cathode. No polymer binder or carbon additive was used.

In the exemplary battery described herein, the $V_2O_5$ film was used as a cathode, and stainless steel was used as the cathode current collector. In the exemplary battery, the anode is metallic lithium. The electrolyte is 1 mol/L $LiPF_6$ in EC/DMC=1:1 (volume ratio). The separator is a Celgard 2400 microporous film.

Figure 16A:
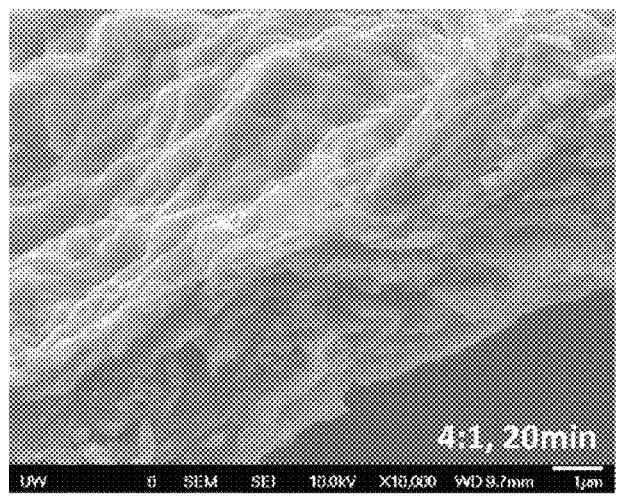
FIGS. 16A-16C are scanning electron micrograph (SEM) images of representative freestanding $V_2O_5$ films in accordance with the embodiments provided herein.
Figure 16B:
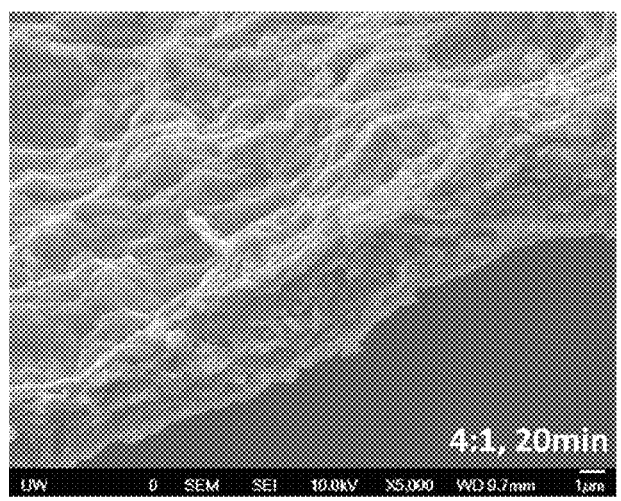
Figure 16C:
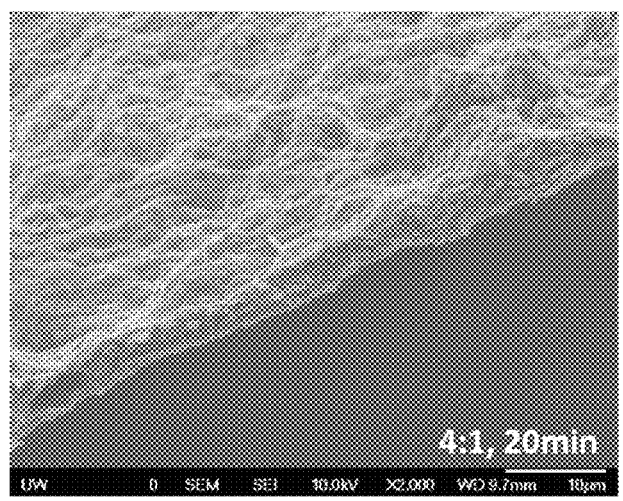

FIGS. 16A-16C are SEM micrographs of a $V_2O_5$ film formed using a 4:1 ratio of hydrogen peroxide to $V_2O_5$ and electrodeposition for 20 minutes using the electrodeposition method described above in Example 1.

Figure 17A:
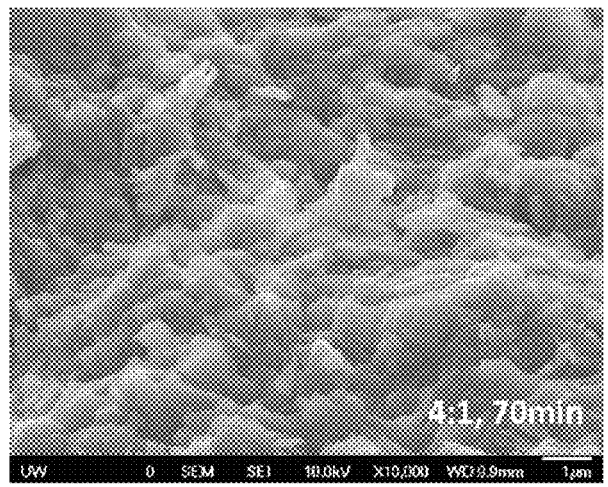
FIGS. 17A-17C are scanning electron micrograph (SEM) images of representative freestanding $V_2O_5$ films in accordance with the embodiments provided herein.
Figure 17B:
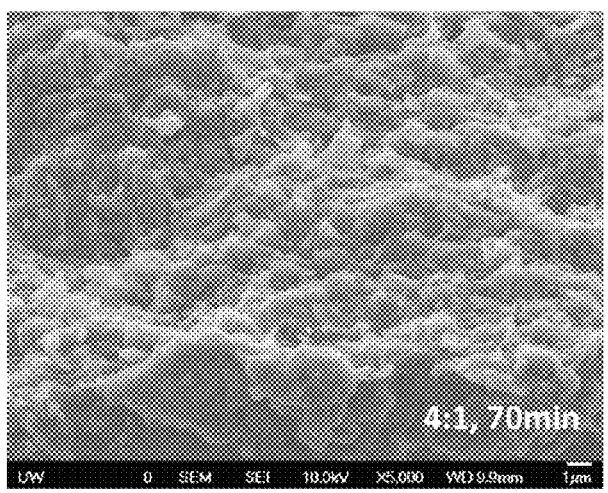
Figure 17C:
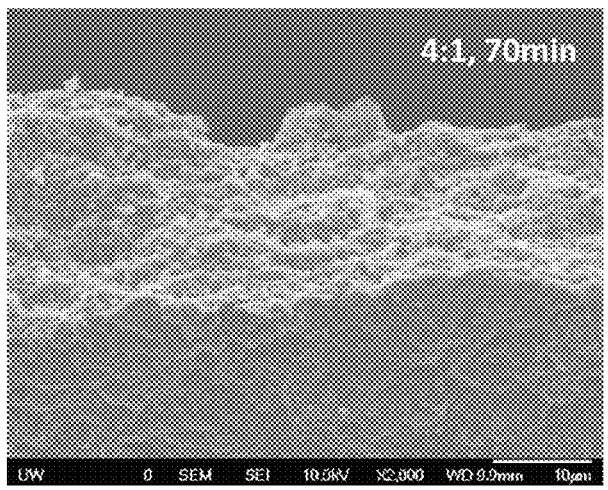

FIGS. 17A-17C are SEM micrographs of a $V_2O_5$ film formed using a 4:1 ratio of hydrogen peroxide to $V_2O_5$ and electrodeposition for 70 minutes using the electrodeposition method described above in Example 1.

Figure 18A:
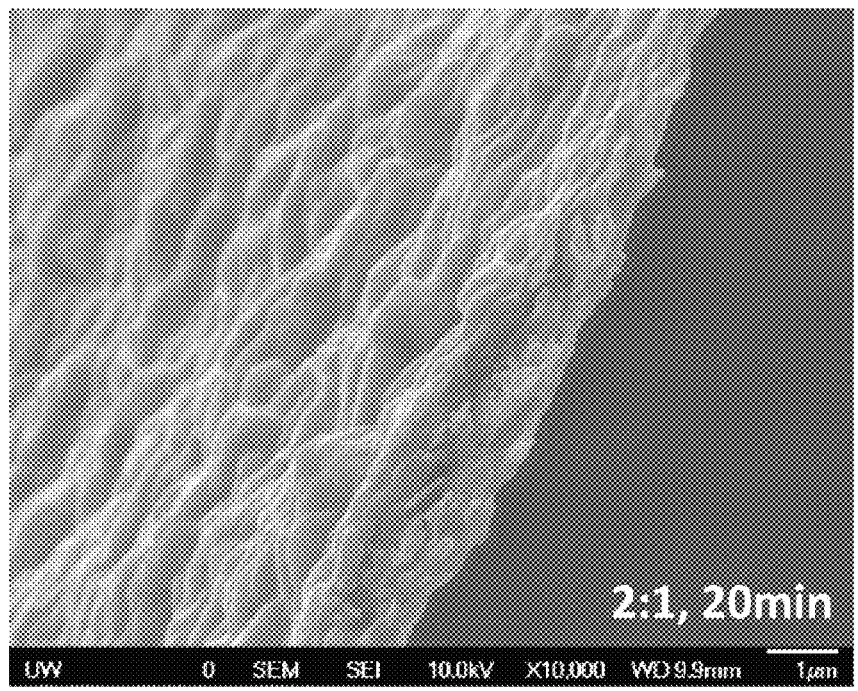
FIGS. 18A and 18B are scanning electron micrograph (SEM) images of representative freestanding $V_2O_5$ films in accordance with the embodiments provided herein.
Figure 18B:
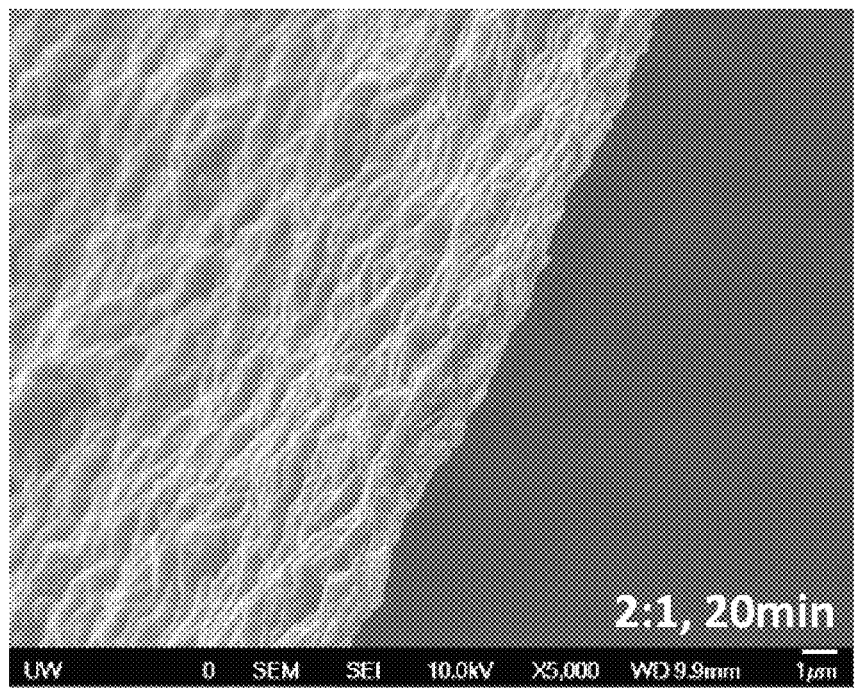

FIGS. 18A and 18B SEM micrographs of a $V_2O_5$ film formed using a 2:1 ratio of hydrogen peroxide to $V_2O_5$ and electrodeposition for 20 minutes using the electrodeposition method described above in Example 1.

Figure 19A:
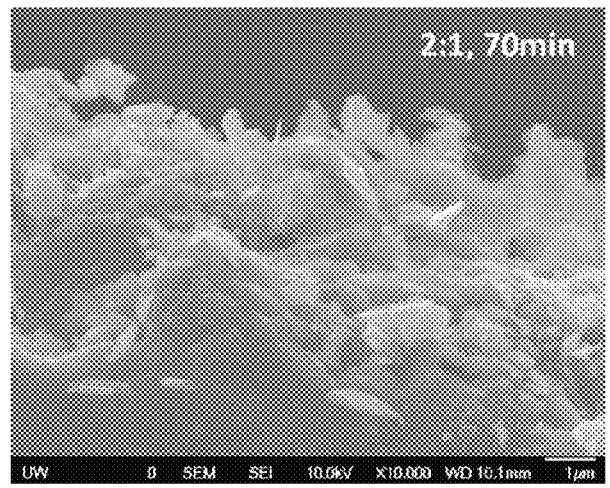
FIGS. 19A-19C are scanning electron micrograph (SEM) images of representative freestanding $V_2O_5$ films in accordance with the embodiments provided herein.
Figure 19B:
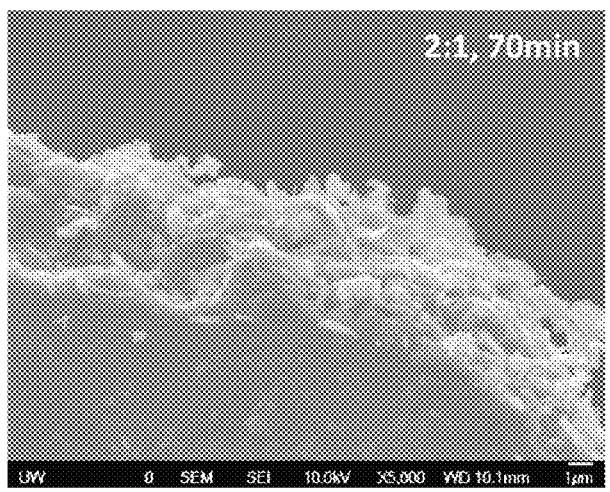
Figure 19C:
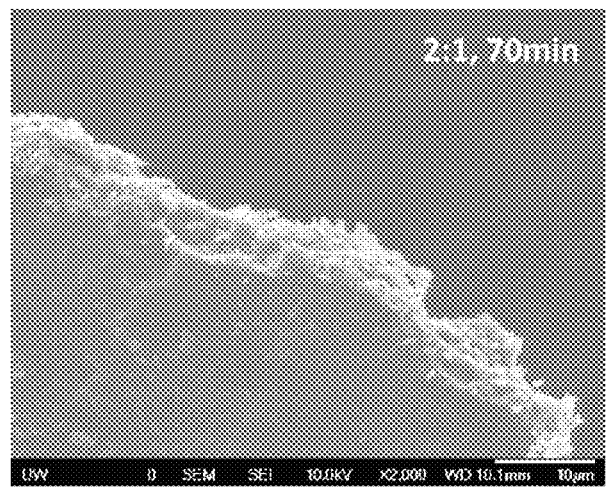

FIGS. 19A-19C SEM micrographs of a $V_2O_5$ film formed using a 2:1 ratio of hydrogen peroxide to $V_2O_5$ and electrodeposition for 70 minutes using the electrodeposition method described above in Example 1.

As illustrated in the SEM images of FIGS. 16A-19C, films fabricated with different conditions have different characteristics. Particularly, films formed from a 4:1 precursor (hydrogen peroxide to $V_2O_5$) illustrated in FIGS. 16A-17C have a higher film-formation efficiency compared to films formed from a precursor solution having a ratio of 2:1, as illustrated in FIGS. 18A-19C. Additionally, films formed from a 4:1 precursor solution are less dense than films formed from a 2:1 precursor solution.

Figure 20:
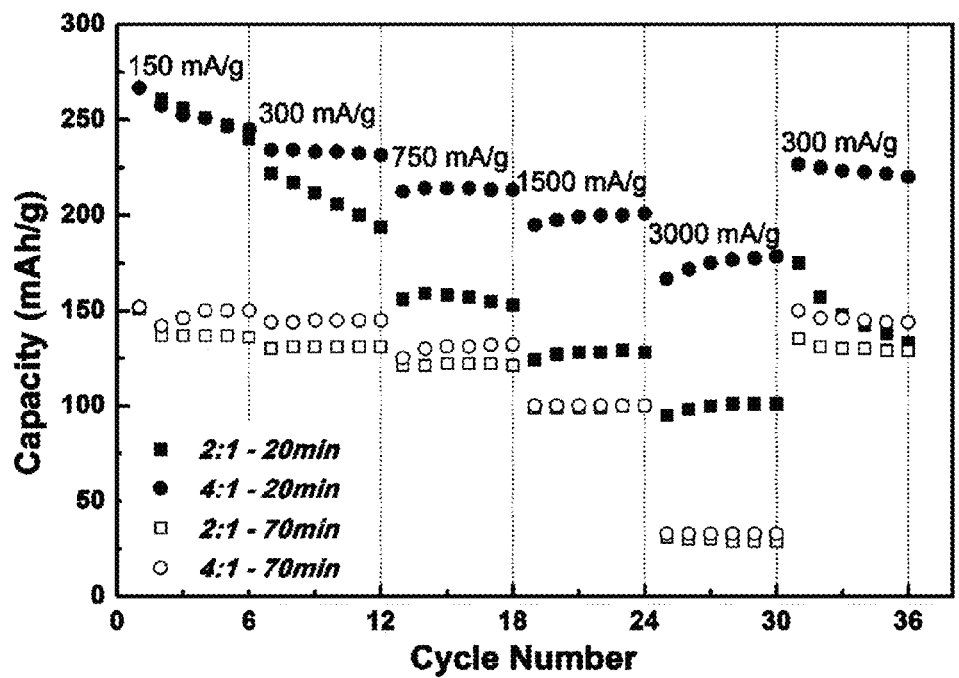
FIG. 20 is a capacity comparison chart of battery performance for batteries assembled from freestanding $V_2O_5$ films in accordance with the embodiments provided herein.

FIG. 20 graphically illustrates the capacity of "coin cell" batteries assembled using various $V_2O_5$ films. Particularly, the films of FIGS. 16A-19C are integrated into batteries and tested. The highest capacity batteries are those that are the thinnest (i.e., grown for the shortest amount of time-20 minutes). Additionally, the 4:1 (hydrogen peroxide to $V_2O_5$) precursor solution yields capacity characteristics of the battery superior to the 2:1 film. The estimated thickness of the 20-minute films is 2 μm, and the estimated thickness of the 70-minute films is 10 μm. It will be appreciated that the time of the deposition is related to the thickness of the film, such that a longer deposition time will yield a thicker film. However, the thicker the $V_2O_5$ film, the more difficult lithium ion intercalation becomes. As illustrated by FIG. 20, thinner films produce improved battery performance, which is related to the intercalation properties.

Figure 21:
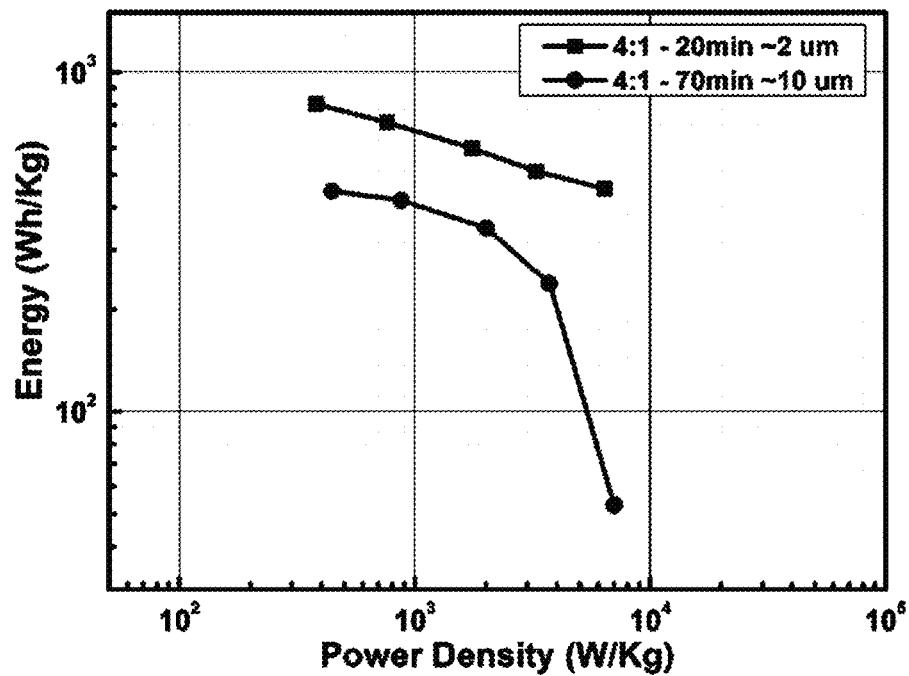
FIG. 21 is a Ragone Plot of a representative battery formed using freestanding $V_2O_5$ films in accordance with the embodiments provided herein.

FIG. 21 is a Ragone plot of the 4:1 films grown at 20 and 70 minutes. As illustrated in FIG. 21, the 20-minute (2 μm) films have superior energy and power density compared to the thicker films.

Porous Freestanding $V_2O_5$ films

Additionally, porous freestanding $V_2O_5$ films have been fabricated using a modified electrodeposition method as provided above in Example 2. Specifically, a 0.1M precursor solution of 4:1 (hydrogen peroxide to $V_2O_5$) was used for the electrodeposition. Block copolymer P123 was added to create a porous nanostructure. The film was grown for about 70 minutes so as to provide a 10 μm film thickness. The films were deposited on titanium foil followed by annealing at 450° C. in air.

The porous $V_2O_5$ films were orthorhombic and were removed from the titanium foil as continuous freestanding films. The freestanding films were directly assembled into a "coin cell" to test the film as a cathode material for a battery.

Figure 22A:
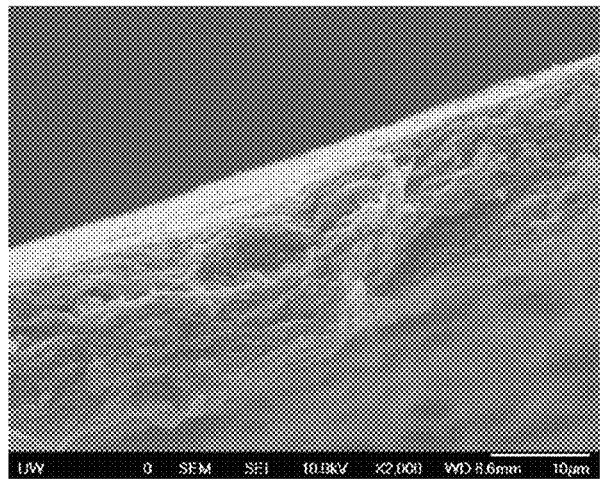
FIGS. 22A-22C are SEM images of porous freestanding $V_2O_5$ films templated on a block copolymer in accordance with the embodiments provided herein.
Figure 22B:
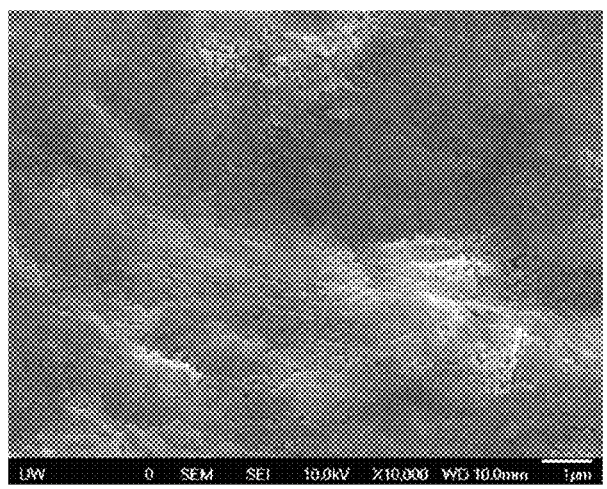
Figure 22C:
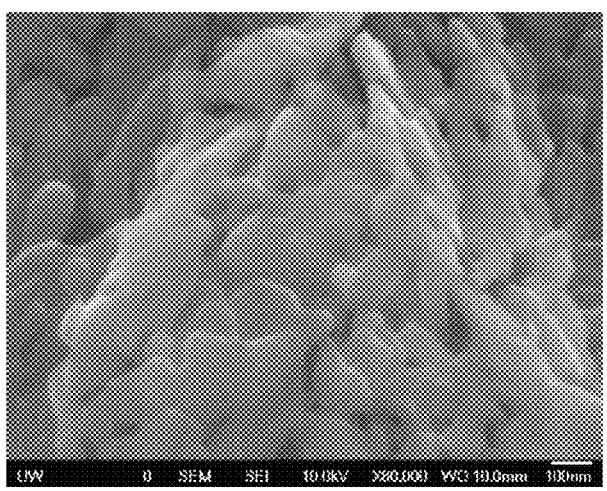

FIGS. 22A-22C are SEM micrographs of the freestanding porous $V_2O_5$ films.

Figure 23:
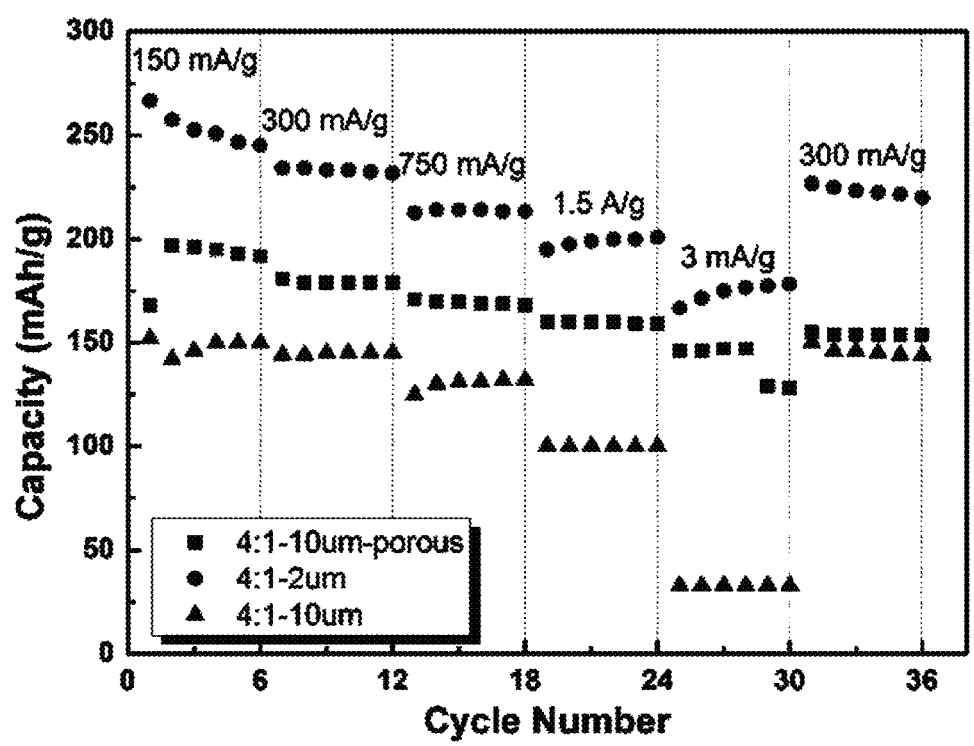
FIG. 23 is a capacity comparison chart of representative freestanding $V_2O_5$ films in accordance with the embodiments provided herein.

FIG. 23 graphically illustrates the capacity of coin cell batteries having the freestanding $V_2O_5$ films as cathode materials. As illustrated in FIG. 23, the porous, 10 μm thick films have superior performance to the non-porous 10 μm thick films. However, the 2 μm films exhibit superior performance to both porous and non-porous 10 μm films. From FIG. 23, it can be determined that introducing pores into the $V_2O_5$ films improves storage capacity, although only for films of similar thickness. That is, thinner films have superior performance than thicker, yet porous, films.

Example 4

Lithium Iron Phosphate/Carbon Nanocomposite Film Cathodes for High Energy Lithium Ion Batteries Introduction Recent increases in demand for oil, with the associated environmental sustainable issues are continuing to exert pressure on an already stretched and strained world energy infrastructure. Significant progress has been made in the development of both renewable energy harvesting and storage technologies, such as solar cells, bio-fuels, fuel cells and batteries. As one of the most promising clean technology for energy storage, lithium-ion batteries are rapidly gaining the market of batteries, and are attracting significant attention from both research and industry communities, due to its highest energy density and environmentally friendly nature. Due to the fact that the energy storage performance of lithium ion batteries is largely limited by the performance of the cathodic materials, more research has been focused on cathodic materials, such as $LiCoO_2$, $LiMn_2O_4$ and transitional metal oxides. Since the first report by Goodenough and his co-workers in 1997 on $LiFePO_4$ applied as cathode materials for lithium ion batteries, it has been attracting much interest both in research and industrial fields because of its high theoretical capacity of 170 mAh/g, flat voltage at ~3.4V, and good thermal and chemical stability. Moreover it offers economic and environmental advantages being low cost and less toxic material. Goodenough and his co-workers showed the possibility of chemically removing lithium from the olivine structure of $LiFePO_4$ thus leaving a new phase $FePO_4$, with a subtle structural change between $LiFePO_4$ and $FePO_4$ leaving the 1D channels for $Li^+$-ion motion intact.

Since the limited electronic conductivity of $LiFePO_4$, carbon coating, metal particles dispersion, or aliovalent cations doping have been explored to accelerate the $Li^+$ diffusion and intercalation. For example, Huang et al. prepared $LiFePO_4$ and conductive carbon nanocomposites with a particle size of 100-200 nm reaching 90% theoretical discharge capacity at a charge rate of C/2, and they concluded that both particle size minimization and intimate carbon contact are necessary for the optimization of electrochemical redox reaction in batteries. Sides et al. used templates to fabricate nanocomposite fibers of $LiFePO_4$—C with the diameter of 350 nm, the unique structure allows a high capacity as 100% of the theoretical value at 3 C, and 36% at a higher discharge rate of 65 C. It was argued that the unique nanostructure improves the lithium ions diffusion in the solid state and the carbon matrix enhances the electronic conductivity. Huang et al. used 7 wt. % of polypyrrole (PPy) as the conductive additives, and electrochemically deposited Carbon coated $LiFePO_4$ (C-LFP)/PPy composite cathodes on stainless steel substrate with a particle size of 2-5 μm. The composite cathodes demonstrated 92% of the capacity charged at 0.1 C when rapidly discharged at 10 C (within 6 min), which was attributed to the good electrical contact between carbon coated $LiFePO_4$ and PPy, as well as between the particles and the current collector.

In this example, $LiFePO_4$/C nanocomposite film cathodes were fabricated through sol-gel processing followed with annealing and pyrolysis in nitrogen at elevated temperatures. Poor crystallinity, nanostructures together with uniform distribution of carbon on electrochemical performances of these nanocomposite films were characterized and discussed.

Experimental

The $LiFePO_4$ sol was prepared from lithium hydroxide monohydrate $LiOH.H_2O$ (≥99.0%, Fluka), ferric nitrate $Fe(NO_3)_3.9H_2O$ (A.C.S. Reagent, Baker Analyzed) and phosphoric acid $H_3PO_4$ (A.C.S. Reagent, min. 85%, Spectrum). In order to reduce $Fe^{3+}$ to $Fe^{2+}$ during the preparation and form a complex with the iron ions, L-ascorbic acid $C_6H_8O_6$ (≥99.0%, Sigma) was added to the solution with the molar ratios of 4:1 to the total metal ($Li^+$ and $Fe^{2+}$). Ascorbic acid also plays the role of providing carbon for the $LiFePO_4$/C nanocomposite films after pyrolysis. The overall molar ratio of Li:Fe:P:ascorbic acid was 1:1:1:4. $H_3PO_4$ and $Fe(NO_3)_3.9H_2O$ were first mixed and dissolved in deionized water to form a 1 mol/l solution. $LiOH.H_2O$ was then dissolved in the above solution, followed by slowly adding $C_6H_8O_6$ under constant stirring at room temperature. The obtained mixture was stirred at 60° C. for 1 hour until the solution turned into dark brownish transparent sol, which was then diluted with more deionized water from 1 mol/l to 0.01 mol/l for the film preparation. It is very crucial to follow the above sequence for the chemical reaction, so that the sol will not become unstable and form precipitations during storage at room temperature.

The LiFePO$_4$/C nanocomposite films were prepared by drop-casting 50 μl of 0.01 mol/l sol onto Pt coated Si wafer and they have a geometric area of approximate 0.2 cm$^2$. The samples were then dried in ambient conditions overnight and then annealed at various temperatures (500° C., 600° C., 700° C., and 800° C.) in N$_2$ atmosphere for 3 hours.

The un-diluted 1 mol/l sol was poured into a Petri-dish and dried under ambient conditions for 24 hours, and then the residues were collected and ground into fine powders for thermal analysis and X-Ray Diffraction (XRD) measurement. Thermochemical properties of the LiFePO$_4$/C composite powders were investigated by gravimetric analyzer (TGA) and differential thermal analysis (DTA) (PerkinElmer instruments) with the temperature range from room temperature to 800° C. in N$_2$ atmosphere at a heating rate of 2° C./min. The XRD (D8 Diffractometer) method was used to detect the phase of the LiFePO$_4$/C composite powders derived from 800° C. The scanning electron microscopy (SEM) (JEOL JSM-5200) was used to characterize the morphology of LiFePO$_4$/C nanocomposite films after annealed at various temperatures from 500° C. to 800° C.

Electrochemical properties of the LiFePO$_4$/C nanocomposite films on Pt coated Si wafers were investigated using a standard three-electrode cell setup. 1 mol/l LiClO$_4$ solution in propylene carbonate was used as the electrolyte, a Pt foil as the counter electrode and Ag/AgCl as standard reference electrode respectively. Cyclic voltammetric (CV) and chronopotentiometric measurements (CP) of the LiFePO$_4$/C nanocomposite film cathodes were performed by using an electrochemical analyzer (CH Instruments, Model 605B).

Results and Discussion

Figure 26:
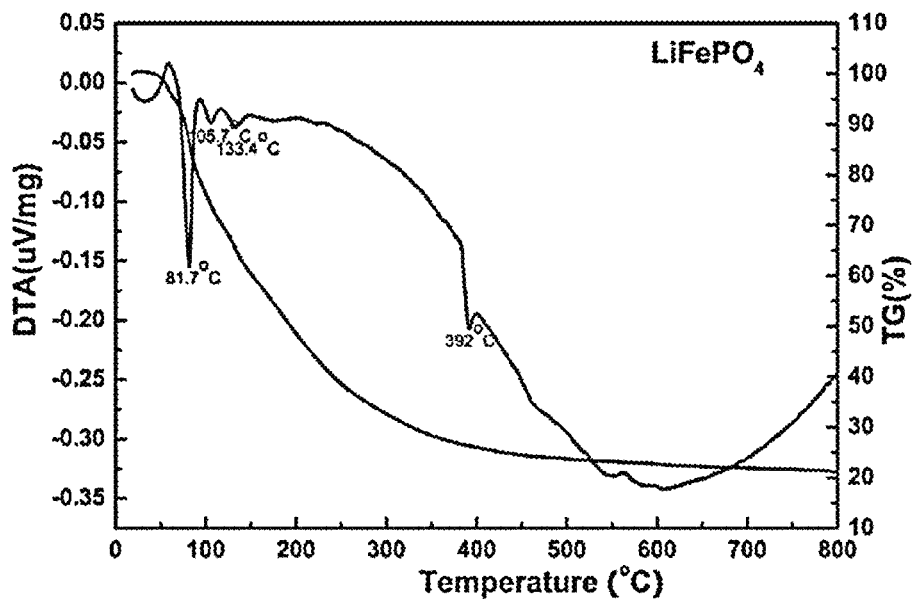
FIG. 26: Thermogravimetric analysis and differential thermal analysis curve of LiFePO$_4$/C composite powders from room temperature to 800° C. at a heating rate of 2° C./min in nitrogen atmosphere.

Thermogravimetric analysis (TGA) and differential thermal analysis (DTA) of the LiFePO$_4$/C composite powders which were heated from room temperature to 800° C. at a rate of 2° C./min in flowing nitrogen is shown in FIG. 26. About 75% weight loss is observed during the temperature sweep to 400° C., and from 400° C. to 800° C., the change of weight loss is 5%. The weight loss can be ascribed to the removal of residual solvent, dehydration, decomposition of ascorbic acid and nitrates and possibly the reduction of some remaining $Fe^{3+}$ to $Fe^{2+}$. It can be observed that the first three endothermic peaks between 81.7° C. and 133.4° C. are due to the removal of residual solvent and dehydration of crystalline water; while the endothermic peak at 392° C. shows the pyrolysis of ascorbic acid from the precursor.

Figure 27:
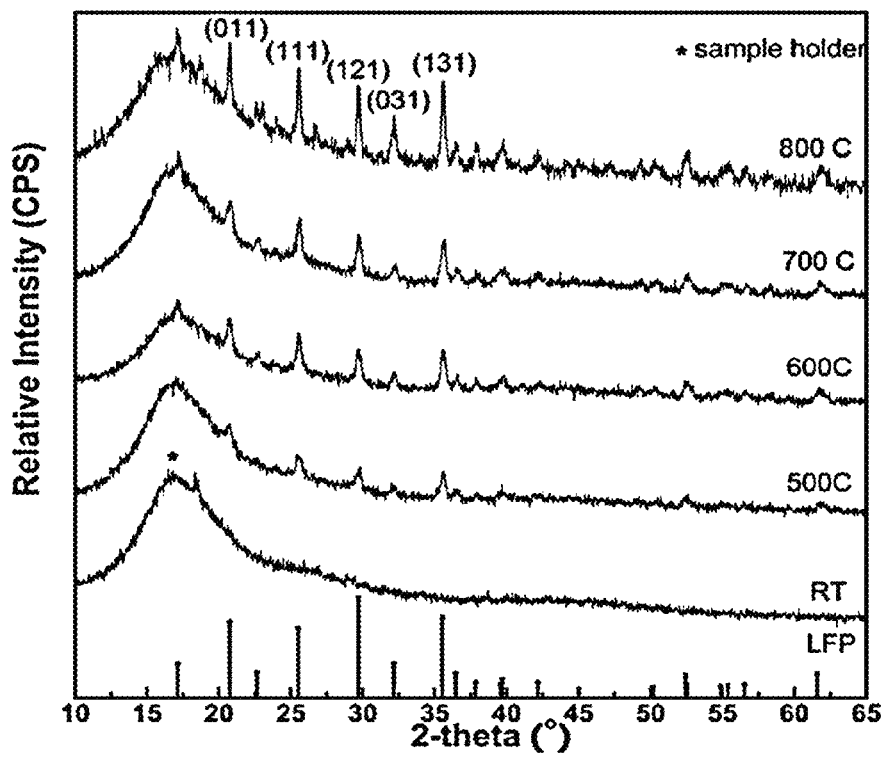
FIG. 27: X-Ray Diffraction patterns of sol-gel derived LiFePO$_4$/C composite powders at room temperature and heat treated at 500° C., 600° C., 700° C. and 800° C.

FIG. 27 presents XRD patterns of LiFePO$_4$/C composite powders dried from sol at ambient condition, and then annealed at 500° C., 600° C., 700° C., and 800° C., respectively. The powders without annealing showed no detectable peaks, suggesting the amorphous nature. The patterns of powders annealed at 500° C., 600° C., 700° C., and 800° C. clearly showed the evidence of olivine LiFePO$_4$ phase. Among all these XRD patterns, no evidence of diffraction peaks for crystalline carbon (graphite) appeared throughout the temperature range, which indicates that the carbon generated from ascorbic acid is amorphous and its presence does not have detectable influences on the crystal structure of LiFePO$_4$. The comparison of XRD patterns also revealed that, the samples annealed at different temperatures are in the same phase, except that the peaks are gradually sharpened and intensity increases. This suggests an increase in crystallinity, ordering of olivine LiFePO$_4$ phase, growth of grain size as well as release of lattice strain at higher annealing temperature.

The crystallite sizes of LiFePO$_4$ in the nano-composite powders treated at different temperatures were calculated using Scherrer's equation and the results are shown in Table 2. The crystallite sizes are below or around 20 nm in samples annealed at 500° C. to 700° C., and grow up to 30.8 nm when annealed at 800° C. The finer LiFePO$_4$ crystallite size compared to the larger crystallite size derived from conventional solid-state synthesis can be ascribed to the sol-gel method applied in this work and the inhibition effect of crystal growth by the presence of carbon nano-coating generated from ascorbic acid intimately mixed in the LiFePO$_4$ sol. This nanostructure with crystallite size under 20 nm could greatly enhance the phase transition during Li-ion intercalation/deintercalation due to the high surface energy, and favored kinetic processes including a short transport pathway and a high and effective contact area with electrolyte.

Figure 28A:
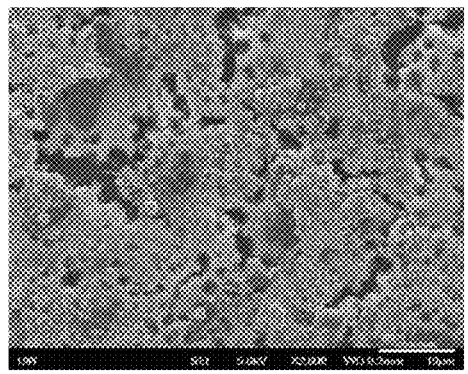
FIG. 28: Scanning Electronic Microscopy (SEM) pictures of LiFePO$_4$/C nanocomposite films annealed at 500° C. (A-B), 600° C. (C-D) and 700° C. (E-F).
Figure 28B:
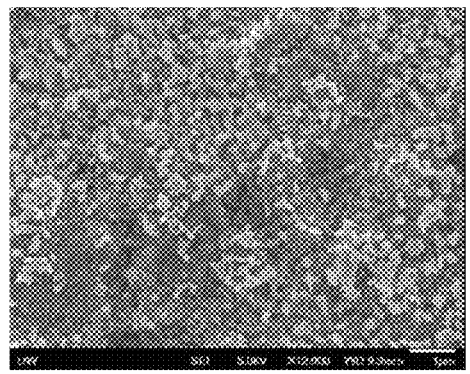
Figure 28C:
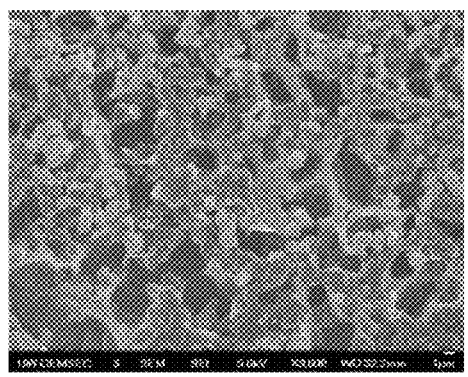
Figure 28D:
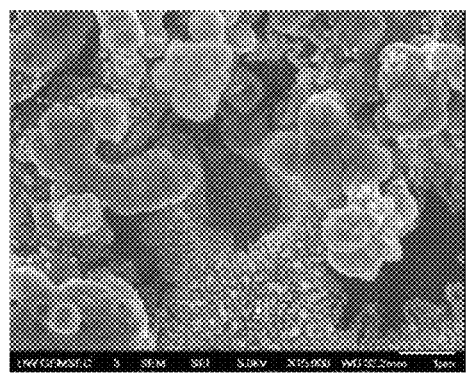
Figure 28E:
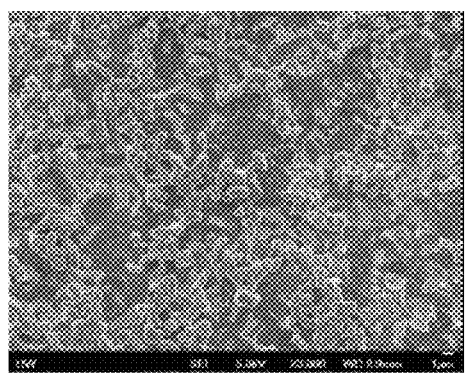
Figure 28F:
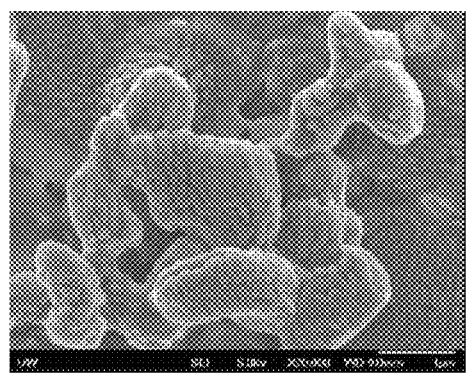

Since ascorbic acid was introduced during the sol preparation as a reducing agent of the iron ions, upon gelation and pyrolysis at elevated temperatures, the carbon residues are intimately and homogeneously dispersed in the nanocomposites and might be coated onto the LiFePO$_4$ particle surfaces. The thermal annealing effect on the particle size and morphology is evident from the SEM images (FIGS. 28A-F). It can be observed from FIG. 28 that with the increase of annealing temperature from 500° C. to 700° C., a denser film, and better crystallinity with larger particle size are derived. FIGS. 28A-B are the images under both low and high magnifications of LiFePO$_4$/C nanocomposite films annealed at 500° C. It can be observed that small particles with loose structures are obtained at 500° C., and lower crystallinity is derived at this temperature which is in consistent with XRD results. FIGS. 28C-D show SEM pictures of 600° C. heat treated films, which composes of two distinct phases with different particle sizes. An energy-dispersive X-ray spectroscopy (EDAX) check of each phase shows that small particles are carbon phase while large particles are carbon coated LiFePO$_4$ phase. It can also be seen from FIG. 28D that, the carbon particles are homogeneously distributed in the films and some are coated on the surface of LiFePO$_4$ particles, which well guarantees the effective conductive network in the whole film thus improve the electrochemical performance of LiFePO$_4$/C nanocomposite films. The surface carbon could also exist as surface defect which serves as nucleation sites to promote phase transition. The three-phase interface of LiFePO$_4$—C-electrolyte could offer a lower nucleation activation energy, therefore the phase transition during Li-ion intercalation/deintercalation is greatly enhanced. Further increase the annealing temperature to 700° C., the morphology of films was examined and shown in FIGS. 28E-F. It can be observed that a denser film with better crystallinity and trace of carbon was attained at this temperature. It is also found that both LiFePO$_4$ and carbon particles grow larger and show distinct crystallites morphology when the annealing temperature increases.

Figure 29:
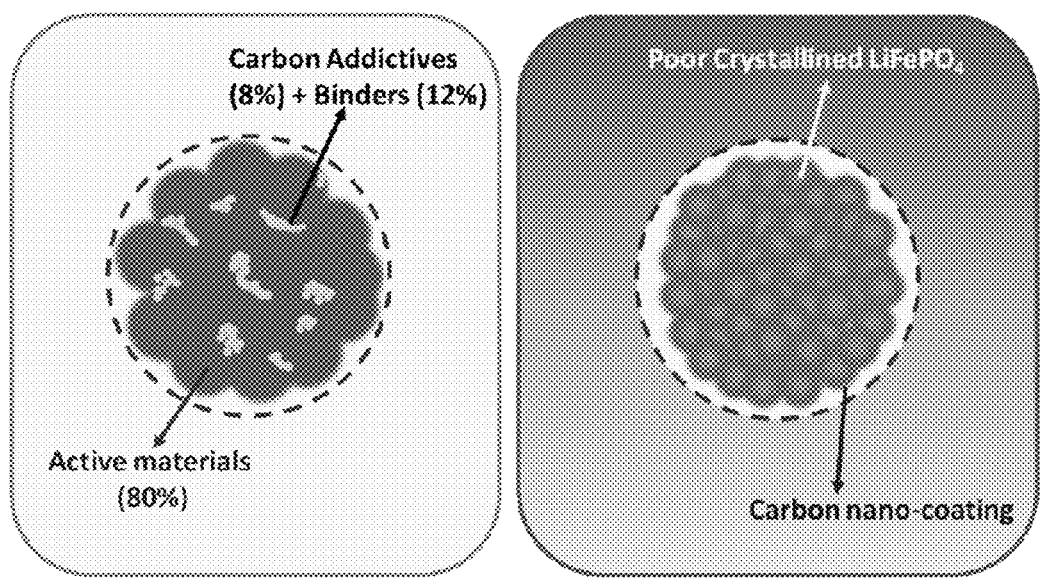
FIG. 29: Traditional electrode composed of active materials, conductive additives and binders (left); sol-gel derived LiFePO$_4$/C nanocomposite cathode films in this study, with LiFePO$_4$ nanocrystallites and carbon nanocoating (right).

A schematic (shown as FIG. 29) demonstrating the distribution and co-existence of carbon with LiFePO$_4$ is proposed based on the XRD, SEM and EDS results discussed above. The carbon residue from ascorbic acid forms an amorphous nano-network in LiFePO$_4$/C nanocomposite films, connecting the individual LiFePO$_4$ particles; the carbon may also wrap around the LiFePO$_4$ particles, and act as both nano-coating to improve the electrical conductivity and surface defect to enhance the lithium ion diffusions. There is also a possibility that porous carbon webs can reside in the interior of the particles, as reported by Chung et al. The conventional electrode process adds 15-20 wt % of conductive additives (carbon black etc.) and binder (PVdF etc.) to the active materials with particles size of micrometer scale, which often gives an inadequate contact between particles thus impedes the lithium ion from diffusing effectively in certain areas. In addition, the additives and binders bring in noticeable mass which further results in a low specific energy and power density counted for the whole electrode. In contrast to the conventional configuration, the carbon network and nanocoating introduced by sol-gel chemistry in this work guarantees a better electrical conductivity, enhanced lithium ion diffusion and higher electrochemical performance as discussed below.

Figure 30A:
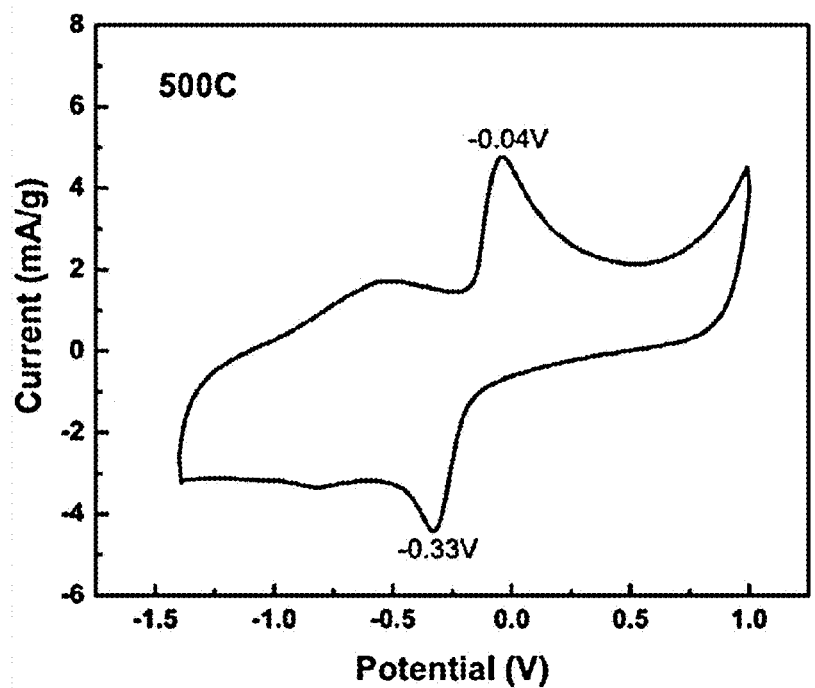
FIG. 30: Cyclic voltammetric (CV) curves of LiFePO$_4$/C nanocomposite films derived from (A) 500° C., (B) 600° C., (C) 700° C., (D) 800° C. (Room temperature, 10 mV/s, voltage range: −1.4V~1.0V (vs. Ag/Ag$^+$)).
Figure 30B:
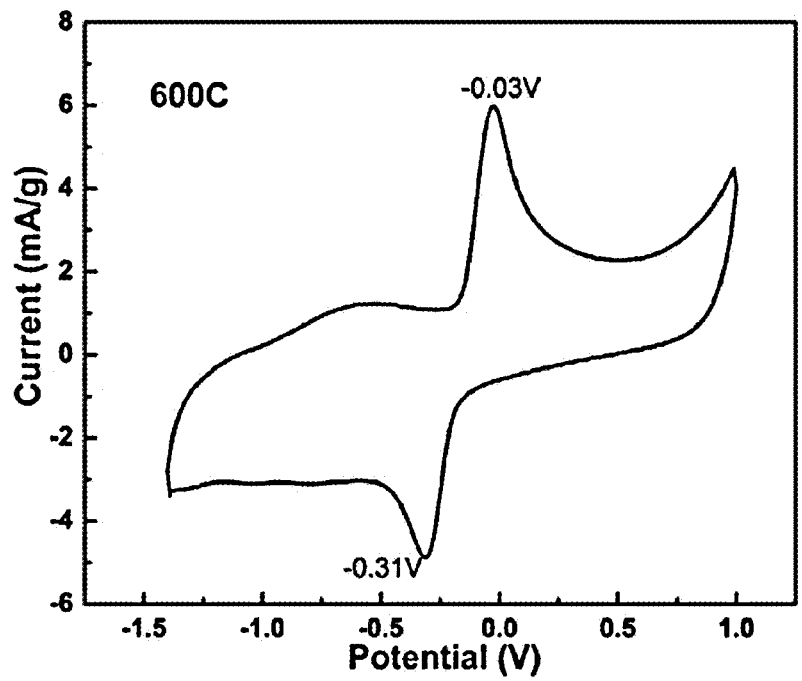
Figure 30C:
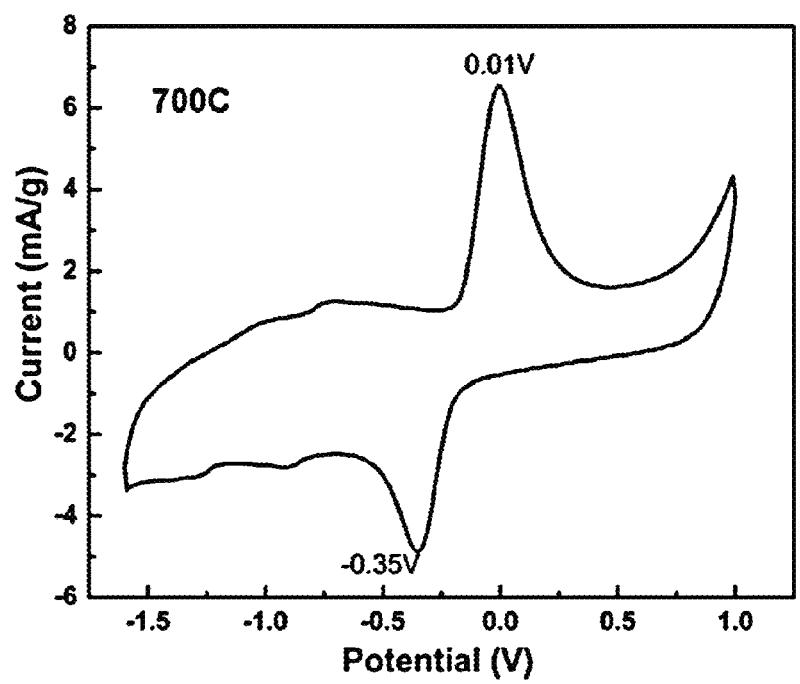
Figure 30D:
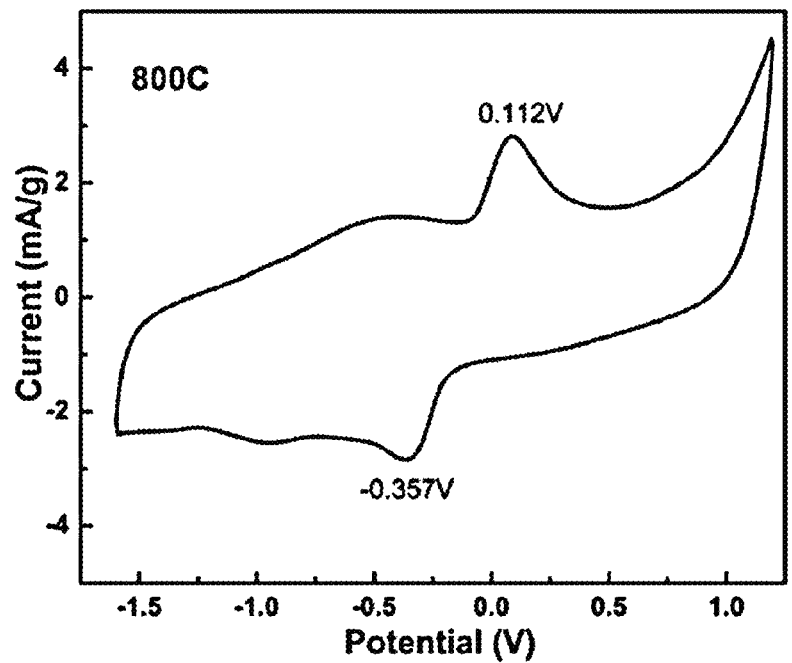

The cyclic voltammetric (CV) curves of LiFePO$_4$/C nanocomposite film cathodes annealed at different temperatures from 500° C. to 800° C. are shown in FIGS. 30A-D, which shows distinct redox peaks for intercalation/de-intercalation of lithium ions corresponding to the two-phase charge/discharge reaction of Fe$^{2+}$/Fe$^{3+}$ redox couple. The anodic oxidation peak for sample that annealed at 500° C. as shown in FIG. 30A appears at −0.04V vs. Ag/Ag$^+$ and cathodic reduction peak at −0.33V, and the peaks are −0.03V and −0.31V for sample that was treated at 600° C. For the films treated at 700° C. and 800° C., the CV curves show a wider gap between redox peaks. It was argued by Kim et al. that the smaller gap between redox peaks is more efficient for redox reactions. It is likely that the LiFePO$_4$/C nanocomposite films annealed at 600° C. has more desirable crystallinity as well as nano and micro structure that facilitates redox reactions at the interface and affects the kinetics of transport processes. This result is in consistent with the chronopotentiometric results analyzed in the next paragraphs.

Figure 31:
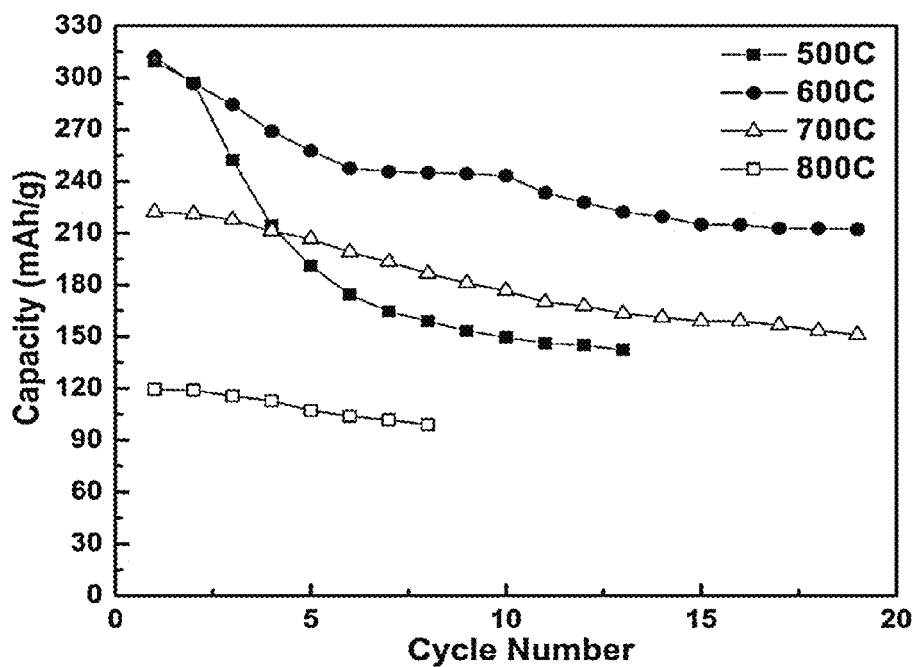
FIG. 31: Discharge capacities of sol-gel derived LiFePO$_4$/c nanocomposite cathode films annealed at 500-800° C. at a discharge rate of 200 mA/g.

The charge-discharge performances of LiFePO$_4$/C nanocomposite film cathodes derived at different temperatures (500-800° C.) at 200 mA/g are summarized and compared in FIG. 31. The film annealed at 600° C. shows better capacity and cycle stability, as it delivers higher discharge capacity as 312 mAh/g for the initial cycle, and stays 218 mAh/g after 20 cycles. This prominent electrochemical property of LiFePO$_4$/C nanocomposite films treated at 600° C. could be explained by the SEM pictures (FIGS. 28C-D) and XRD results (FIG. 27 and Table 2): the poor crystalline LiFePO$_4$ phase is less compact and more disordering in comparison with well crystallized phase, thus it provides a more flexible structure which could accommodate more lithium ions and facilitate the diffusion within this structure. The LiFePO$_4$ nanocrystallites below 20 nm could also favor the kinetics of phase transition during Li-ion intercalation/deintercalation. Moreover the carbon residing on the surface of LiFePO$_4$ particles could perform as surface defect and buffer material, thereby enhancing the electrochemical capacity and improving cyclic stability.

TABLE 2

Crystallite size of LiFePO$_4$/C composite powders treated at various temperatures calculated using Scherrer's equation.

| Temperature(° C.) | Crystallite Size (nm) |
| --- | --- |
| 500 | 16.1 |
| 600 | 19.4 |
| 700 | 21.1 |
| 800 | 30.8 |

For the film annealed at 500° C., the initial discharge capacity is similarly high as 600° C. sample, which could be ascribed to the amorphous LiFePO$_4$ phase with carbon surface coating that exists in this low temperature treated sample. However a drastic drop of the discharge capacity and poor cyclic performance are detected in this 500° C. film, which shows 139 mAh/g after 13 cycles. This poor cyclic property could be due to the loosely packed microstructure annealed at low temperatures; with increased cycles, the structure may experience irreversible change or loose contact with current collector—similar observations in samples annealed at low temperatures are often found in literature.

The initial discharge capacities for 700° C. and 800° C. films are 228 mAh/g and 120 mAh/g, which decrease to 148 mAh/g and 99 mAh/g after 20 cycles. The SEM pictures (FIGS. 28E-F) and XRD patterns (FIG. 27) show that more compact and well crystallized structures are obtained in higher temperature annealed films, which gives less freedom and open space for lithium ion diffusion, thus lower discharge capacities are measured from this research. The poorer electrochemical performances at higher annealing temperatures could also be ascribed to the enlarged particle size with the increase of temperature. Since charge transfer resistance is related to the difference of particle size. A decrease in particle size will decrease the polarization associated with electronic and/or ionic resistance, thus improve the reversible capacity. The larger particles present as transport limitation both for lithium ions and electron diffusion, which results in capacity loss.

Figure 32:
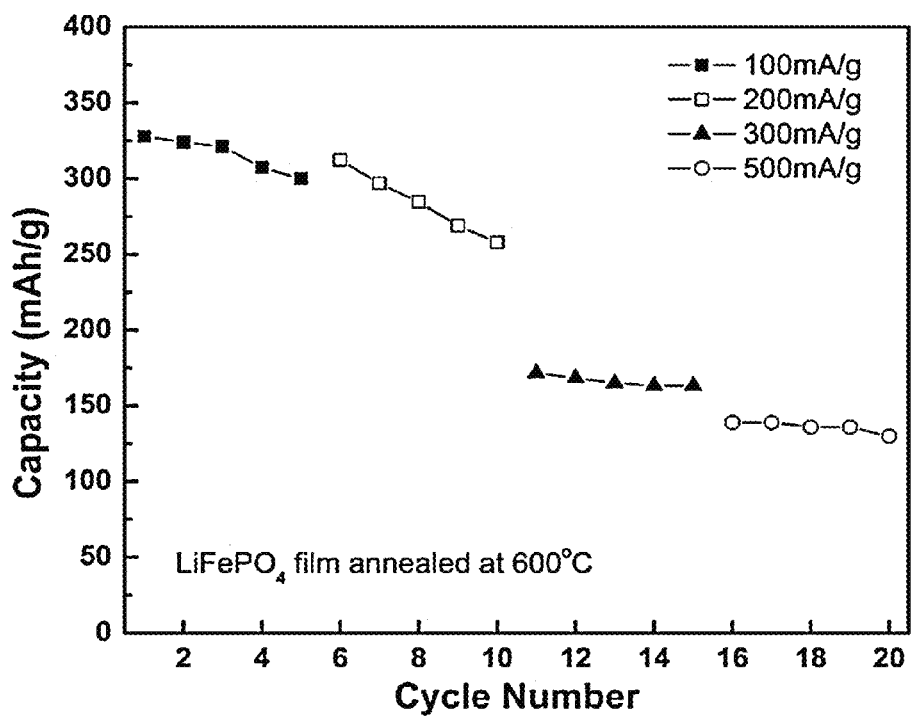
FIG. 32: Lithium ion intercalation capacities of sol-gel derived LiFePO$_4$/C nanocomposite cathode films annealed at 600° C. as a function of cycles under different discharge rates.

The charge-discharge performance at different charging rate of LiFePO$_4$/C nanocomposite film cathodes annealed at 600° C. is shown in FIG. 32. In this experiment, we conducted the intercalation and deintercalation at the same rate for a specific sample and all samples were measured between −1.6 V~1.0 V (Vs Ag/Ag$^+$). The as-prepared LiFePO$_4$/C nanocomposite film cathodes demonstrate a high initial specific discharge capacity of 327 mAh/g at the current density of 100 mA/g (0.6 C). When the current density is 200 mA/g (1.2 C), the initial capacity is 312 mAh/g, and the initial capacities show 171 mAh/g and 139 mAh/g at higher rate of 300 mA/g (1.8 C) and 500 mA/g (3 C) respectively. This high discharge capacity at a high rate could be ascribed to the surface defect and enhanced electronic conductivity due to the carbon nano-coating at the LiFePO$_4$ particle surface. This carbon coating can well provide a better connecting network for electron diffusion. Moreover the shortened transportation path as well as the enhanced phase transition kinetics of lithium ion intercalation/de-intercalation could be ascribed to the nanoscaled structure.

Figure 33:
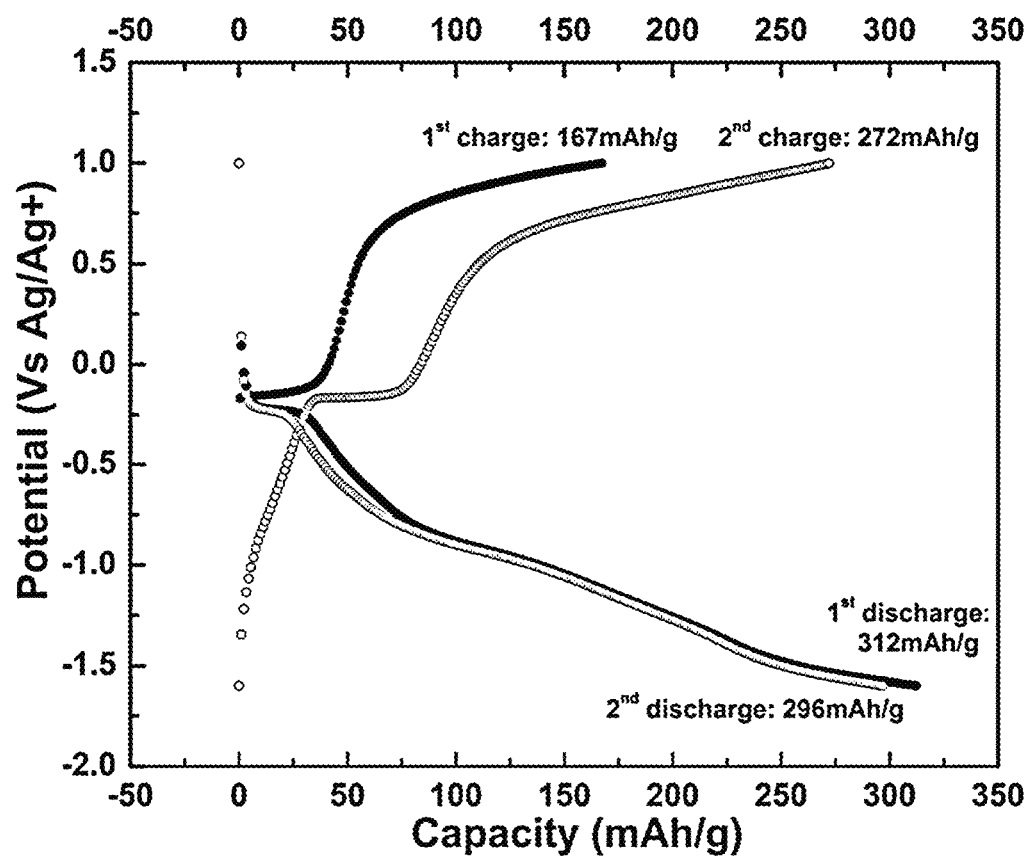
FIG. 33: The first and second charge/discharge curves of sol-gel derived LiFePO$_4$/C nanocomposite cathode films annealed at 600° C. at a discharge rate of 200 mA/g.

The sol-gel derived LiFePO$_4$/C nanocomposite film cathodes demonstrated a discharge capacity of over 300 mAh/g, exceeding the theoretical value of 170 mAh/g reported in literature. FIG. 33 presents the first charge and discharge curve at a rate of 200 mA/g, and it could be observed that the charge capacity of the first cycle is 167 mAh/g, which almost equals theoretical value of well crystallized bulk LiFePO$_4$, indicating that the initial sol-gel derived LiFePO$_4$/C nanocomposite films consist of stoichiometric chemical composition with an atomic ratio of Li$^+$:Fe$^{2+}$:PO$_4^{3+}$=1:1:1 as it was designed in the sol processing and sample preparation. This result is in good agreement with the XRD patterns as shown in FIG. 27, and it also validates that during the first charge step, all the Li$^+$ ions extracted from the LiFePO$_4$/C nanocomposite films, as was measured to be 168 mAh/g in capacity. However at the subsequent discharge process, a capacity of 312 mAh/g was measured, which shows that the amount of Li ions that intercalate into the film exceeds the theoretical value for a stoichiometric crystalline LiFePO$_4$. Although there is a gradual degradation of the electrochemical performances with increase cycles, the capacity of LiFePO$_4$/C nanocomposite films stays above the theoretical limit within the number of cycles conducted in this study. The lack of well-defined plateau for the discharge curve in FIG. 33 in comparison with other work on LiFePO$_4$ could also be an indication of the poor crystallinity at high discharge rate of 1.2 C. This experimental result has shown its reproducibility and all the measurements conditions are carefully verified.

The exact explanation for such a high lithium ion intercalation capacity is not known and a number of experiments are underway to get insights for a fundamental understanding, however, capacities higher than theoretical limit observed in other nanostructured electrode materials have also been reported in literatures by other authors. For example, it has been observed that the VOTPP-based VO$_R$ nanotubes exhibited remarkable charge capacities of 437 mAh/g, which exceeds the reported theoretical value of 240 mAh/g, and they believe that it is the increased volumetric density of nanotubes for ion intercalation and shorter diffusion paths which provide better freedom for dimensional change that occurs during intercalation and de-intercalation reactions. Some have fabricated TiO$_2$-graphne hybrid nanostructured materials and tested them as anode materials for Li-ion batteries. It was observed high Li-ion intercalation capacities of ~200 mAh/g at C/5 for rutile TiO$_2$-0.5 wt % graphene, and ~200 mAh/g at 1 C for rutile TiO$_2$-10 wt % graphene hybrid materials during the first 10 cycles, which exceeds the theoretical capacity of 168 mAh/g for bulk rutile TiO$_2$ materials. They believed that the high intercalation properties and enhanced kinetics in TiO$_2$-graphene hybrid materials can be attributed to the improved conductivity with the incorporation of highly conducting graphene, and this self-assembled hybrid materials are more effective compared with the conventional electrodes fabricated with conductive additives and binders. Some have observed high Li-ion storage capability, high rate performance and cyclability in nanometer-sized rutile TiO$_2$ electrode, with ~378 mAh/g of Li-ion intercalation capacity for the initial cycle, which is corresponding to more than 1 Li$^+$ being inserted into TiO$_2$. For rutile TiO$_2$, Li-ion diffusion occurs mainly through c channels and the sluggish Li diffusion in the a-b planes is the bottleneck for further Li-ion insertion. It is believed that the limit of Li-ion diffusion in a-b planes was weakened in nanometer-sized rutile TiO$_2$, which means that more thermodynamically stable octahedral sites in a-b planes can be reached by Li ions, providing more pronounced intercalation sites for Li-ions. It has been reported that the mesoporous hydrous manganese dioxide nanowall arrays achieved a stable high intercalation capacity of 256 mAh/g, exceeding the theoretical limit of 150 mAh/g for manganese dioxide bulk film. They argued that such high capacity is ascribed to the hierarchically structured macro- and mesoporosity of MnO$_2$.0.5H$_2$O nanowall arrays, which provides a large surface to volume ratio favoring interface Faradaic reactions, short solid-state diffusion paths, and freedom to permit volume change during lithium ion intercalation and de-intercalation. Based on quantum theory, It has been proposed that there is no noticeable net charge change of the oxidation state of a transition metal in a crystal lattice changes associated with lithium ion intercalation, and instead the intercalation is due to the change of hybridization as a result of the change of its energy level relative to the surrounding atoms (e.g., oxygen in transition metal oxides). Therefore the irrelevant relationship between static charges of transition metal and its oxidation status change upon removal or addition of electrons could bring a re-examination of the theoretical capacity value to electrode materials for lithium ion batteries. The excellent performance of the sol-gel derived LiFePO$_4$/C nanocomposite cathode films observed in this study may be attributed to the relatively poor crystallinity of LiFePO$_4$ nanocrystallites offering more available sites for Li-ion intercalations, as well as the intimate contact of carbon to LiFePO$_4$ crystallites, serving as both surface defects and electronic conductive coatings and networks, which effectively enhances the conductivity of composite film electrodes. This unique nanocomposite structure could result in an enhanced electrochemical performance with much improved transport properties and storage capacity through facilitating the phase transition during Li-ion intercalation/deintercalation processes.

Conclusions

LiFePO$_4$/carbon nanocomposite film cathodes are readily fabricated by sol-gel processing with excessive polymer additive followed with annealing and pyrolysis in an inert gas at elevated temperatures for lithium ion batteries, with carbon serving as both defects and conductive nanocoating on the surface of LiFePO$_4$ particles. Crystal, nano and microstructure of the LiFePO$_4$/C nanocomposite films can be tuned through controlling the subsequent annealing process. High electrochemical performance with initial discharge capacity of 312 mAh/g and good cyclic stability (218 mAh/g after 20 cycles) were observed for LiFePO$_4$/C nanocomposite film cathodes annealed at 600° C. when tested within 1.0 V~-1.6 V (Vs. Ag$^+$/Ag). The exceptionally high electrochemical performances could be ascribed to the LiFePO$_4$ nanocrystallites with large surface to volume ratio and possible surface defects, and the relatively poor crystallinity which provides a less packed structure to accommodate more lithium ions. Furthermore, the carbon surface defects and conductive While illustrative embodiments have been illustrated and described, it will be appreciated that various changes can be made therein without departing from the spirit and scope of the invention.

The invention claimed is:

1. A method of forming orthorhombic V$_2$O$_5$ comprising the steps of:
   (a) cathodically electrodepositing VO$_2$ from a precursor solution onto a substrate that is cathodic, to provide a plurality of V$^{4+}$ nucleation sites on the substrate, wherein the precursor solution comprises V$_2$O$_5$ and hydrogen peroxide;
   (b) depositing V$_2$O$_5$.nH$_2$O gel from the precursor solution through catalyzed gelation at the V$^{4+}$ nucleation sites to provide a mixture of VO$_2$ and V$_2$O$_5$.nH$_2$O on the substrate.

2. The method of claim 1 further comprising annealing the mixture of VO$_2$ and V$_2$O$_5$.nH$_2$O on the substrate to provide dehydrated orthorhombic V$_2$O$_5$ on the substrate.

3. The method of claim 2, wherein the dehydrated orthorhombic $V_2O_5$ is a freestanding, continuous film that can be removed from the substrate.

4. The method of claim 2 further comprising separating the dehydrated orthorhombic $V_2O_5$ from the substrate to provide a freestanding, continuous orthorhombic $V_2O_5$ film.

5. The method of claim 2, wherein annealing comprises heating to a temperature of at least 350° C.

6. The method of claim 2, wherein the dehydrated orthorhombic $V_2O_5$ on the substrate is a porous $V_2O_5$ film having a plurality of pores formed by tuning a deposition characteristic selected from the group consisting of an applied electrodeposition voltage and an applied electrodeposition current density.

7. The method of claim 2, wherein the dehydrated orthorhombic $V_2O_5$ on the substrate is a porous $V_2O_5$ film having a plurality of pores formed by tuning a ratio of moles of hydrogen peroxide to $V_2O_5$ of the precursor solution.

8. The method of claim 1, wherein the $V_2O_5.nH_2O$ gel comprises a plurality of particles mixed homogeneously within the $V_2O_5.nH_2O$ gel, wherein the method further comprises a step of annealing the $V_2O_5.nH_2O$ gel containing the plurality of particles at a temperature sufficient to remove the plurality of particles to provide a porous $V_2O_5$ film.

9. The method of claim 1, wherein the $V_2O_5.nH_2O$ gel comprises a dopant selected from the group consisting of Mn, Fe, Ni, Co, Cr, Ag, Ti, Zn, Sn, and combinations thereof.

10. The method of claim 1, wherein the $V_2O_5.nH_2O$ gel comprises an impurity selected from the group consisting of Fe, C, Cr, Na, K, Ca, $VO^{3-}$, $Cl^-$, $V^{3+}$, $V^{4+}$, and combinations thereof.

11. The method of claim 1, wherein the substrate is selected from the group consisting of fluorine-doped tin oxide, titanium, platinum, copper, aluminum, and stainless steel.

* * * * *